US010329194B2

(12) United States Patent
Barthelat et al.

(10) Patent No.: US 10,329,194 B2
(45) Date of Patent: Jun. 25, 2019

(54) METHODS AND SYSTEMS RELATING TO ENHANCING MATERIAL TOUGHNESS

(71) Applicant: The Royal Institute for the Advancement of Learning / McGill University, Montreal (CA)

(72) Inventors: Francois Barthelat, Montreal (CA); Seyed Mohammad Mirkhalaf Valashani, Montreal (CA); Ahmad Khayer Dastjerdi, Montreal (CA)

(73) Assignee: THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 855 days.

(21) Appl. No.: 14/633,655

(22) Filed: Feb. 27, 2015

(65) Prior Publication Data

US 2015/0274587 A1    Oct. 1, 2015

Related U.S. Application Data

(60) Provisional application No. 61/946,279, filed on Feb. 28, 2014.

(51) Int. Cl.
*B23K 26/00*   (2014.01)
*C03C 23/00*   (2006.01)
(Continued)

(52) U.S. Cl.
CPC .......... *C03C 23/0025* (2013.01); *B23K 26/00* (2013.01); *B23K 26/0624* (2015.10);
(Continued)

(58) Field of Classification Search
CPC . C03C 23/0025; C03C 17/322; B23K 26/389; B23K 26/0624; B23K 26/38;
(Continued)

(56) References Cited

U.S. PATENT DOCUMENTS 6,896,321 B2 * 5/2005 Vishey ................. B29C 43/203
                                                              29/897.2
8,646,182 B2 * 2/2014 Weber .................... B29C 70/72
                                                                156/257
(Continued)

FOREIGN PATENT DOCUMENTS

EP        0972632        1/2000
EP        0982121        3/2000
(Continued)

OTHER PUBLICATIONS

R.K. Chintappali, M. Mirkhalaf, A.K. Dastjerdi and F. Barthelat, "Fabrication, testing and modeling of a new flexible armor inspired from natural fish scales and osteoderms", Bioinspiration and Biomimetics, vol. 9, Mar. 11, 2014.

(Continued)

*Primary Examiner* — Rick K Chang
(74) *Attorney, Agent, or Firm* — Norton Rose Fulbright Canada

(57) ABSTRACT

Highly mineralized natural materials often boast unusual combinations of stiffness, strength and toughness currently unmatched by today's engineering materials. Beneficially, according to the embodiments of the invention, these unusual combinations can be introduced into ceramics, glasses, and crystal materials, for example by the introduction of patterns of weaker interfaces with simple or intricate architectures, which channel propagating cracks into toughening configurations. Further, such deliberately-introduced weaker interfaces, such as exploiting three-dimensional arrays of laser-generated microcracks, can deflect and guide larger incoming cracks. Addition of interlocking interfaces and flexible materials provide further energy dissipation and toughening mechanism, by channeling cracks into interlocking configurations and ligament-like pullout mechanisms.

(Continued)

Such biomimetic materials, based on carefully architectured interfaces, provide a new pathway to toughening hard and brittle materials.

5 Claims, 37 Drawing Sheets

(51) Int. Cl.
| | |
|---|---|
| *C03C 17/32* | (2006.01) |
| *B23K 26/38* | (2014.01) |
| *C03B 33/02* | (2006.01) |
| *B23K 26/082* | (2014.01) |
| *B23K 26/53* | (2014.01) |
| *B23K 26/0622* | (2014.01) |
| *C03B 33/04* | (2006.01) |
| *B32B 17/06* | (2006.01) |
| *B23K 26/382* | (2014.01) |
| *B23K 103/00* | (2006.01) |

(52) U.S. Cl.
CPC ............ *B23K 26/082* (2015.10); *B23K 26/38* (2013.01); *B23K 26/389* (2015.10); *B23K 26/53* (2015.10); *B32B 17/064* (2013.01); *C03B 33/0222* (2013.01); *C03B 33/04* (2013.01); *C03C 17/322* (2013.01); *B23K 2103/30* (2018.08); *B23K 2103/50* (2018.08); *B23K 2103/54* (2018.08); *Y10T 29/49826* (2015.01)

(58) Field of Classification Search
CPC .. B23K 26/53; B23K 26/082; B23K 2203/50; B23K 2203/54; B23K 2203/30; C03B 33/04; C03B 33/0222; Y10T 29/49826; B32B 17/064
See application file for complete search history.

(56) References Cited

U.S. PATENT DOCUMENTS

| | | |
|---|---|---|
| 2006/0249553 A1 | 11/2006 | Ukrainczyk |
| 2010/0291353 A1 | 11/2010 | Dejneka et al. |
| 2014/0144689 A1 | 5/2014 | Yuan et al. |
| 2014/0147624 A1 | 5/2014 | Streltsov et al. |

FOREIGN PATENT DOCUMENTS

| | | |
|---|---|---|
| WO | 2013178412 | 12/2013 |
| WO | 2013181505 | 12/2013 |
| WO | 2013154894 | 5/2014 |

OTHER PUBLICATIONS

M. Mirkhalaf, A. Khayer Dastjerdi and F. Barthelat, "Overcoming the brittleness of glass through bio-inspiration and micro-architecture", Nature Communication; vol. 5, 3166, Jan. 28, 2014.
R.K. Chintappali, S. Breton, A.K. Dastjerdi and F. Barthelat, Strain rate hardening: A hidden but critical mechanism for biological composites?, Acta Biomaterialia, Aug. 29, 2014.
International Search Report issued in PCT/CA2015/000362 dated Sep. 4, 2015.

* cited by examiner

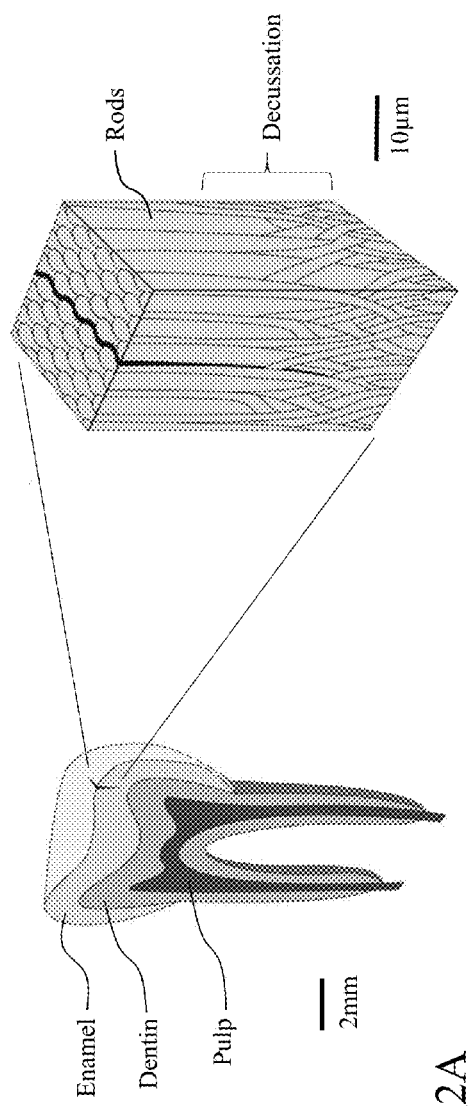
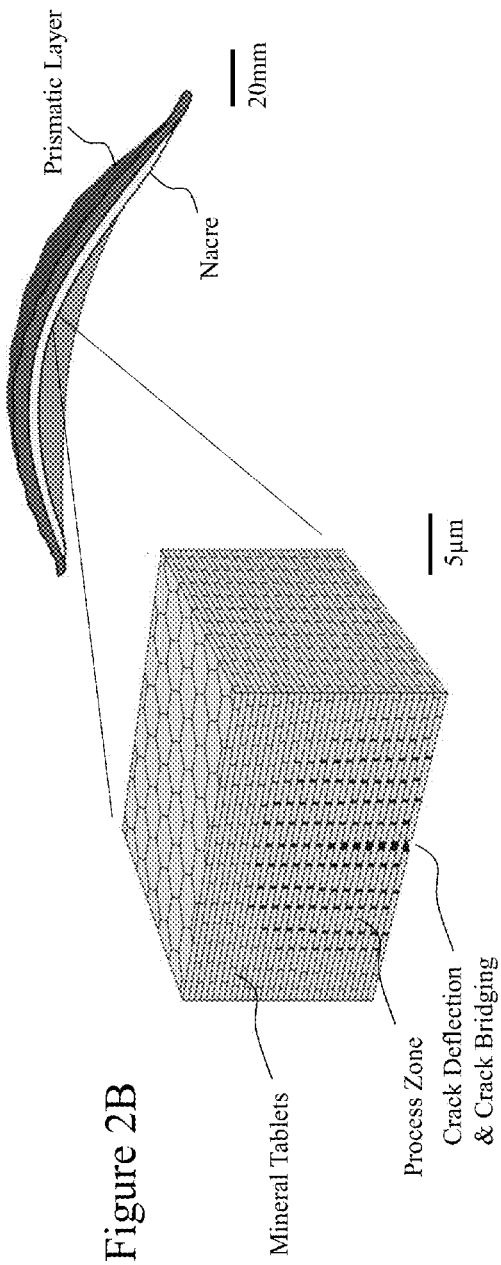
Figure 2A
Figure 2B

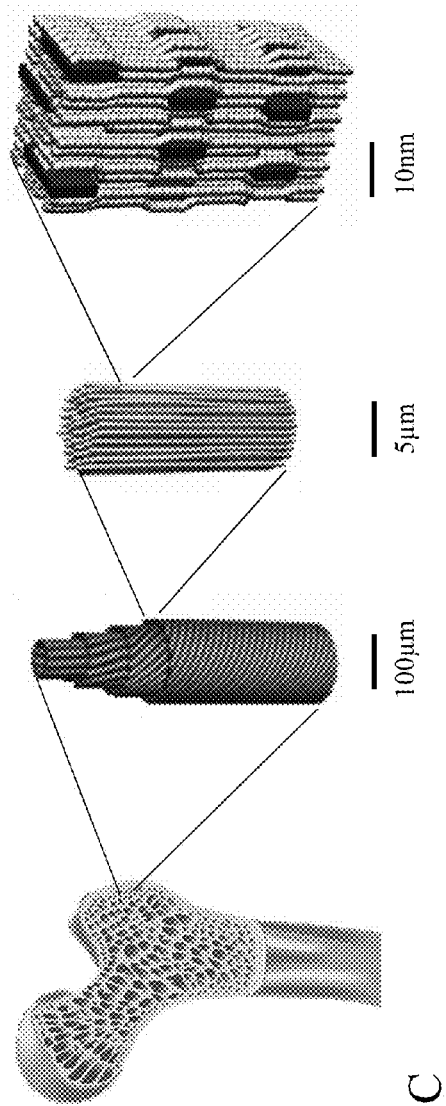
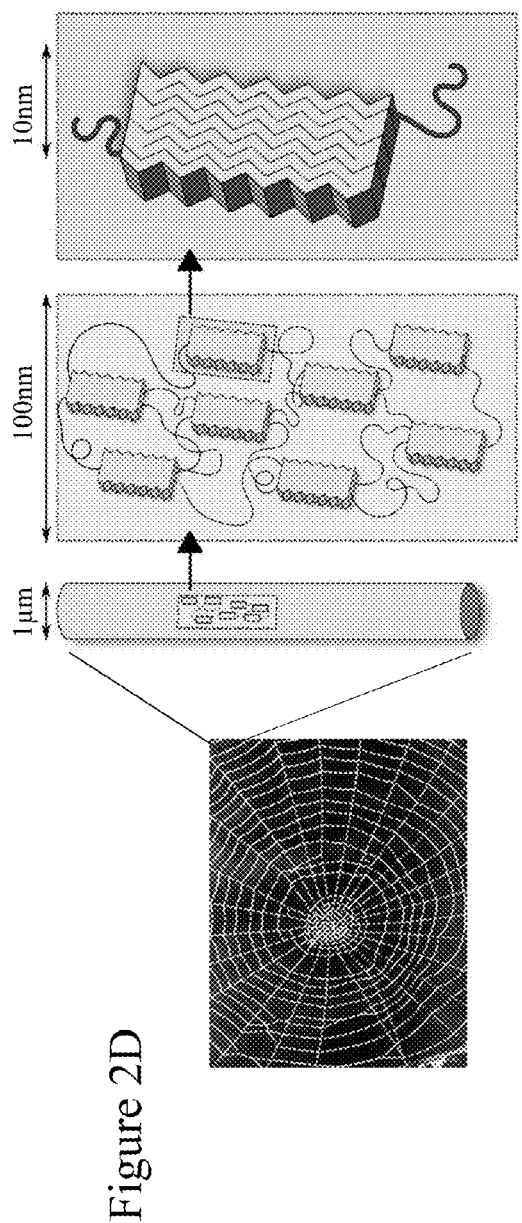
Figure 2C
Figure 2D

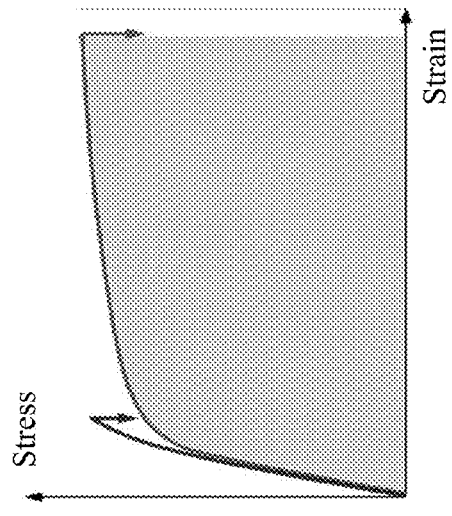
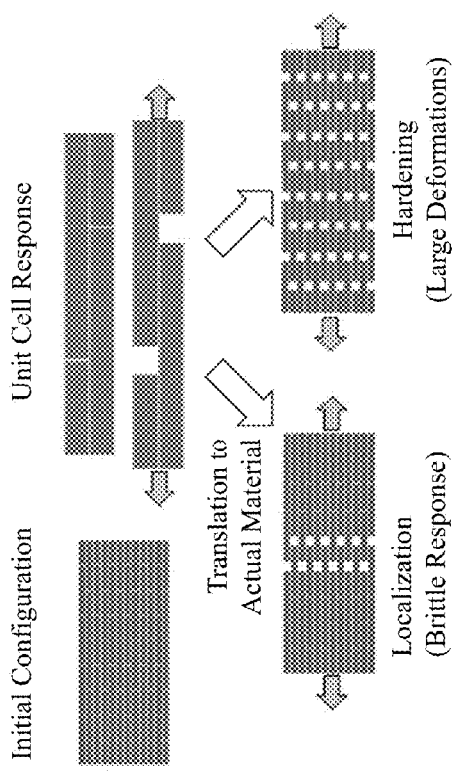
Figure 3A
Figure 3B
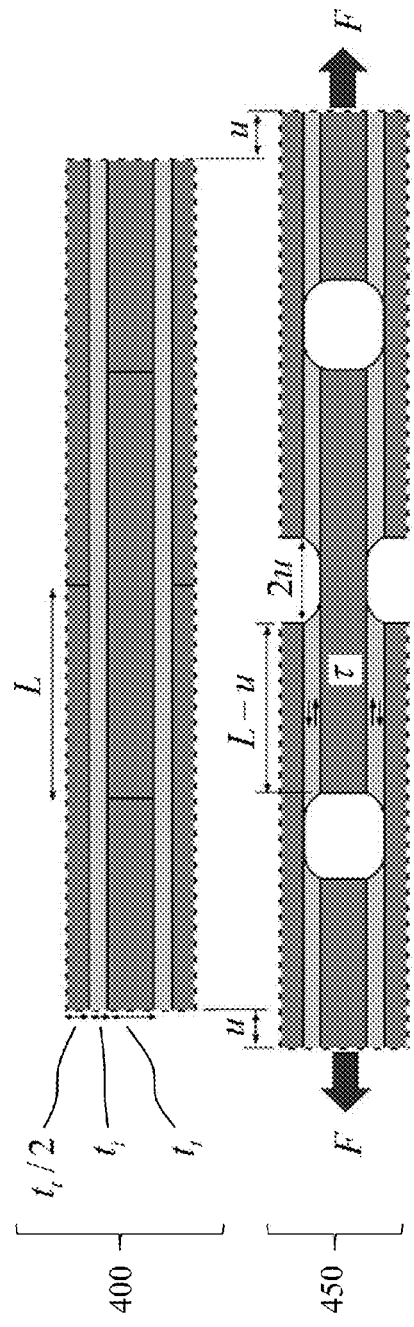
Figure 4

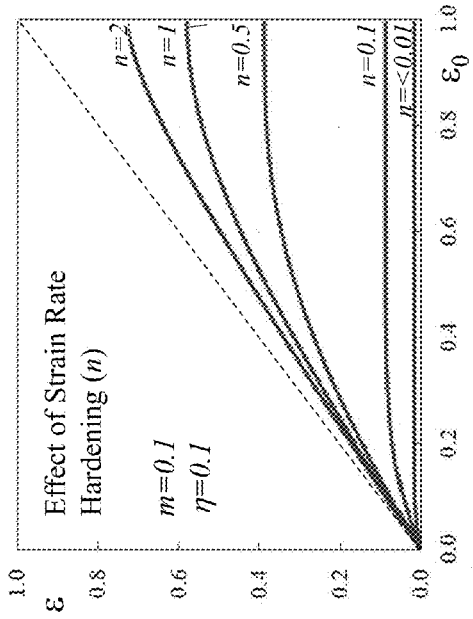
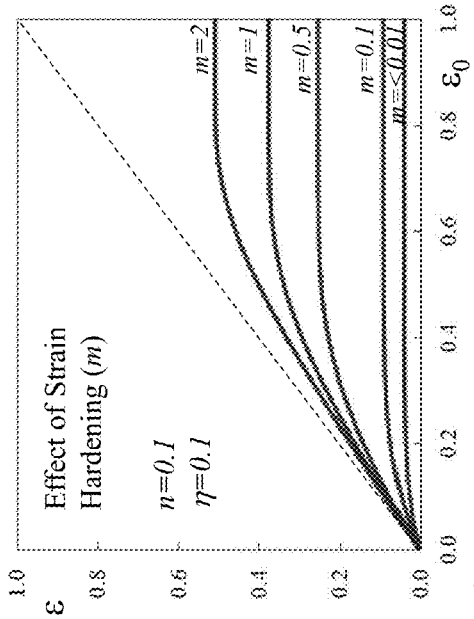
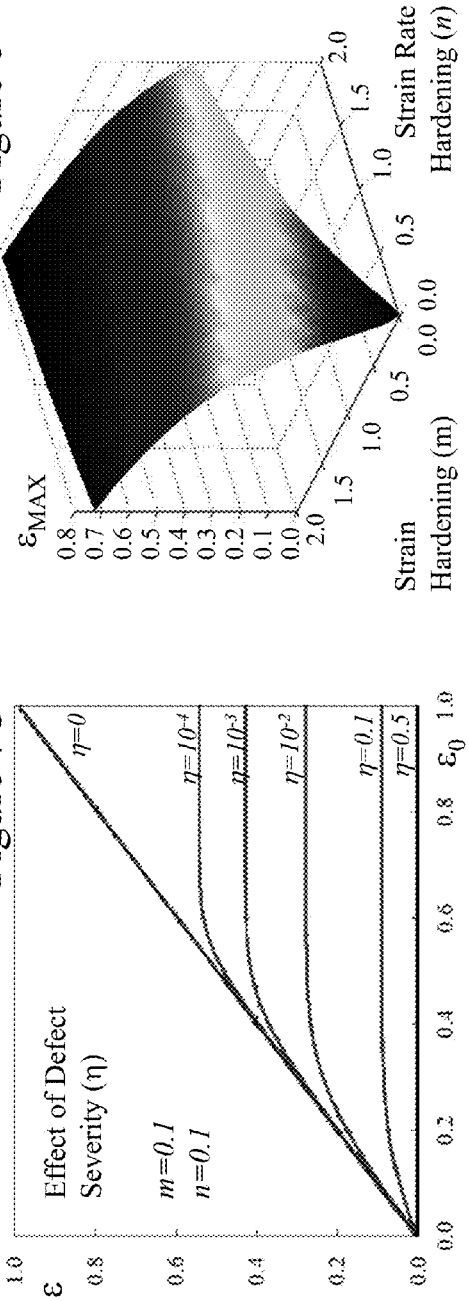
Figure 7A
Figure 7B
Figure 7C
Figure 8

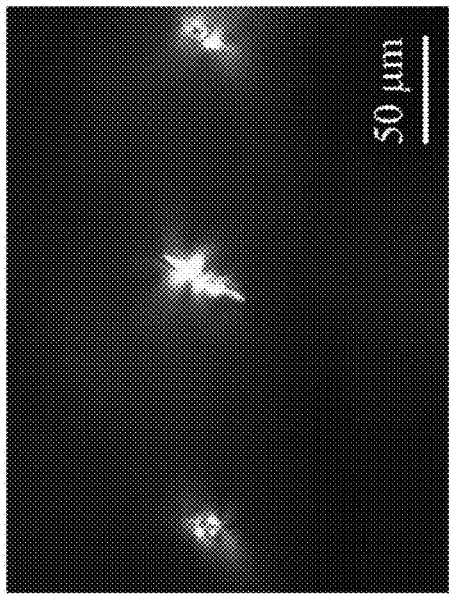
Figure 9C
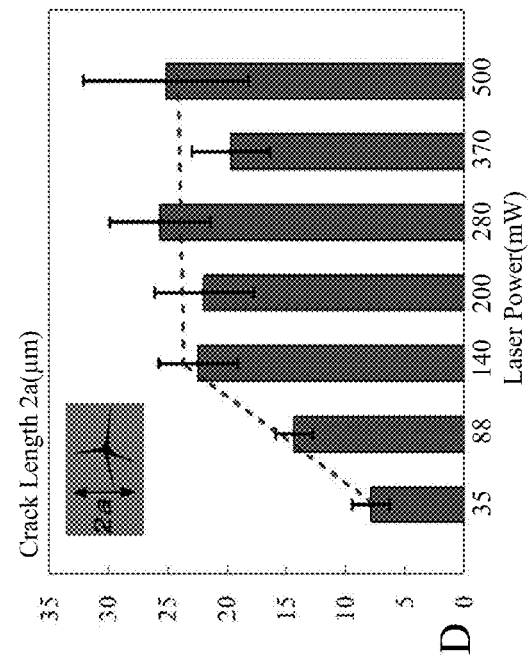
Figure 9D
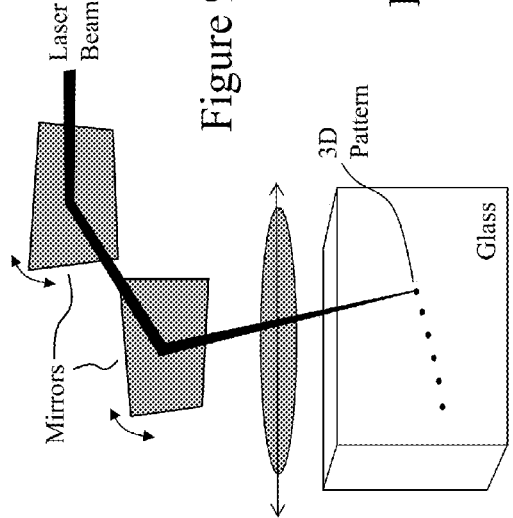
Figure 9A
Figure 9B

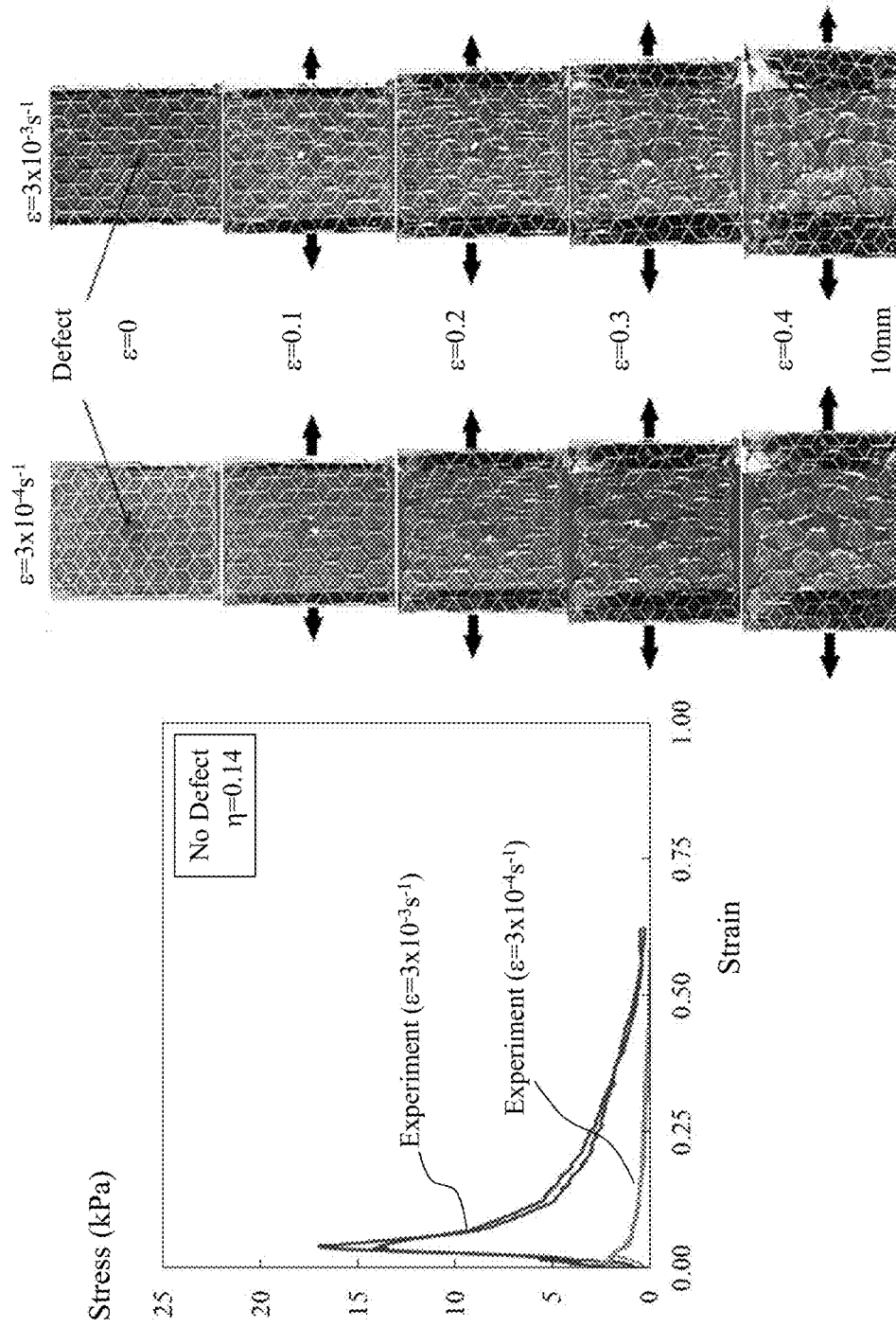
Figure 13B
Figure 13C
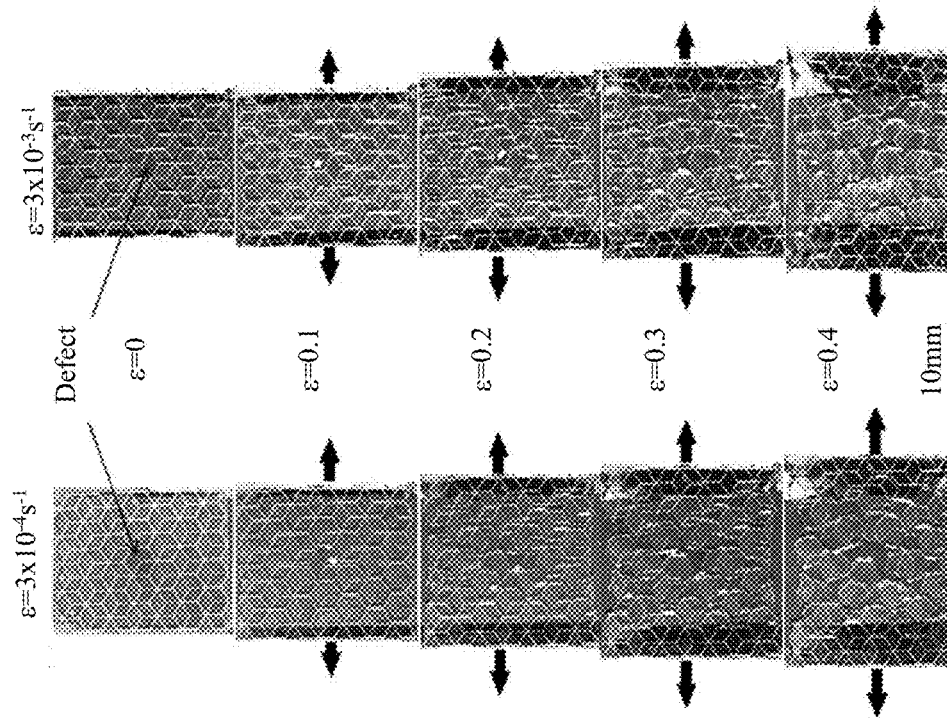
Figure 13A

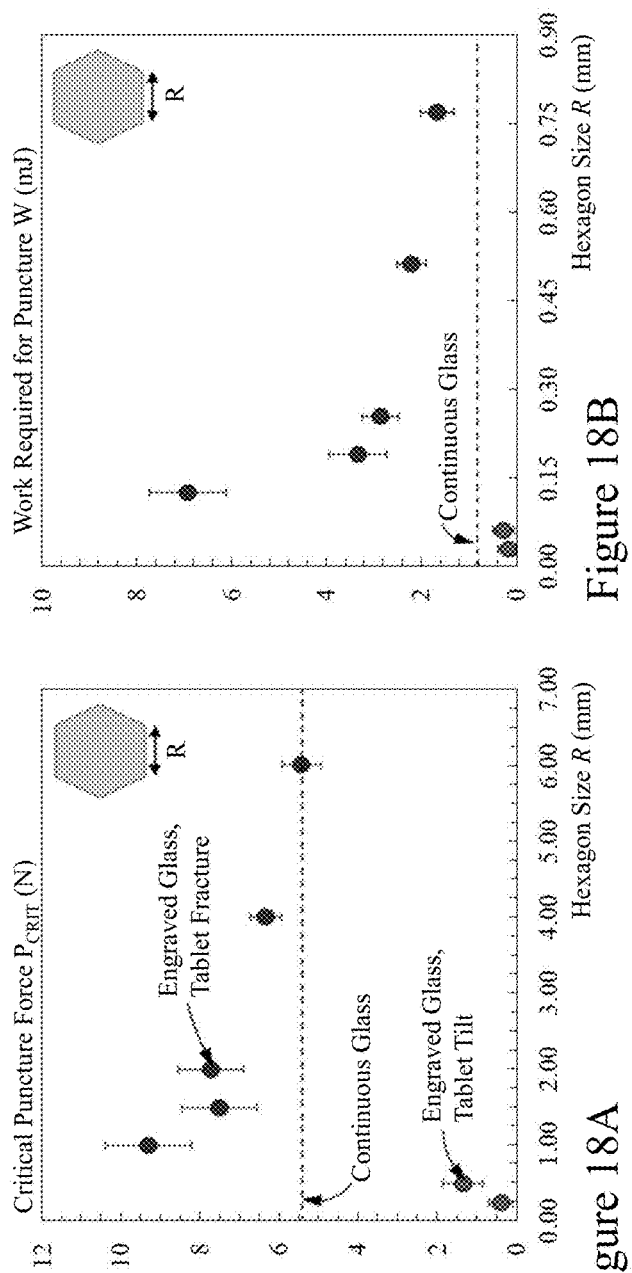
Figure 18A
Figure 18B
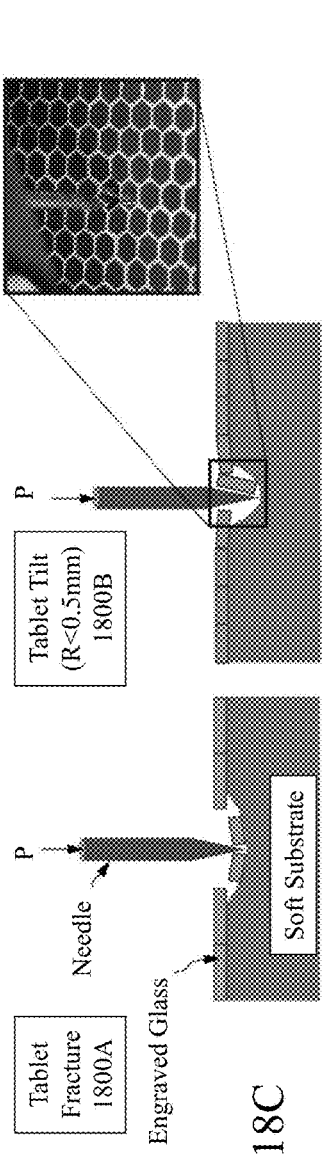
Figure 18C

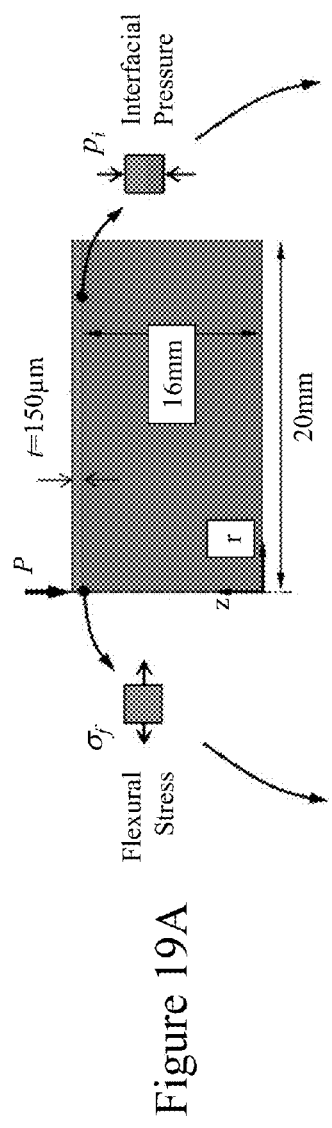
Figure 19A
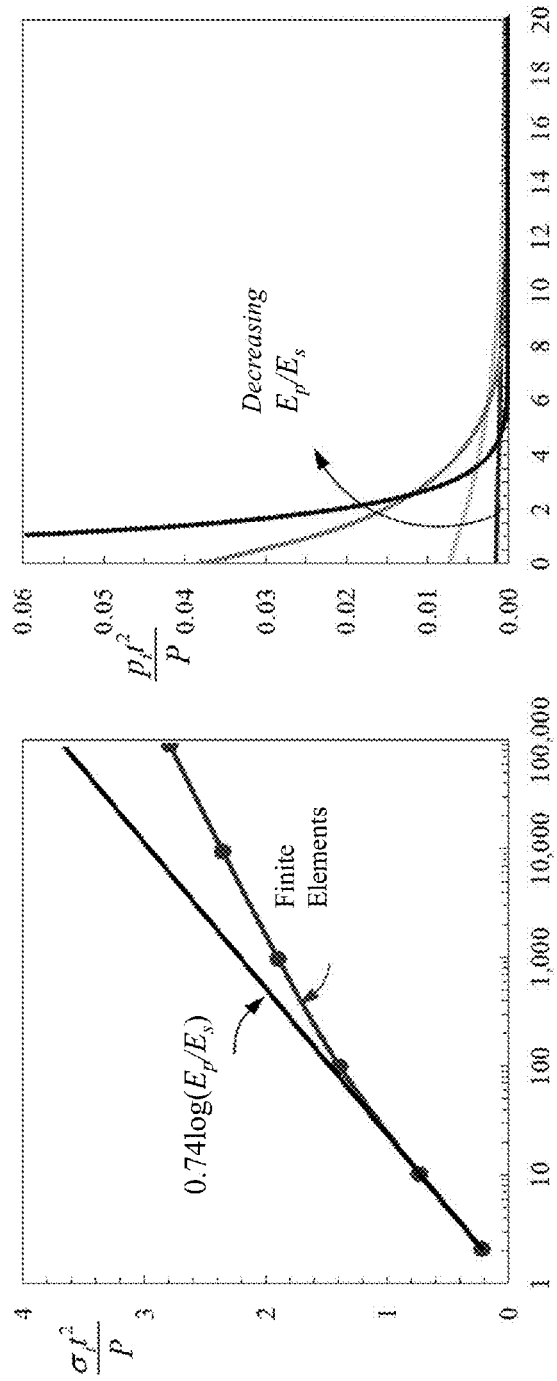
Figure 19B
Figure 19C

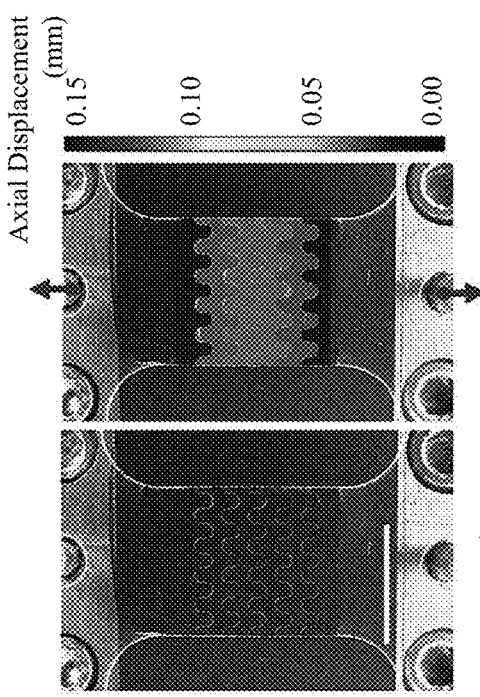
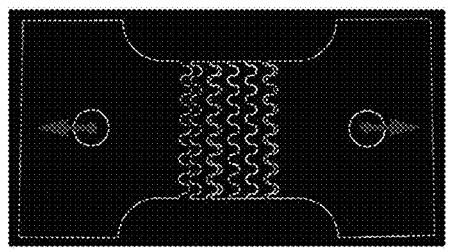
Figure 29A
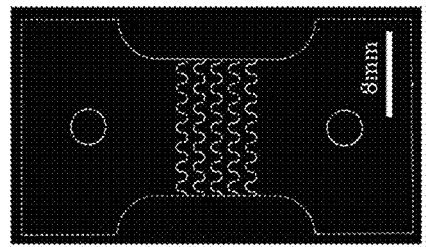
Figure 29B
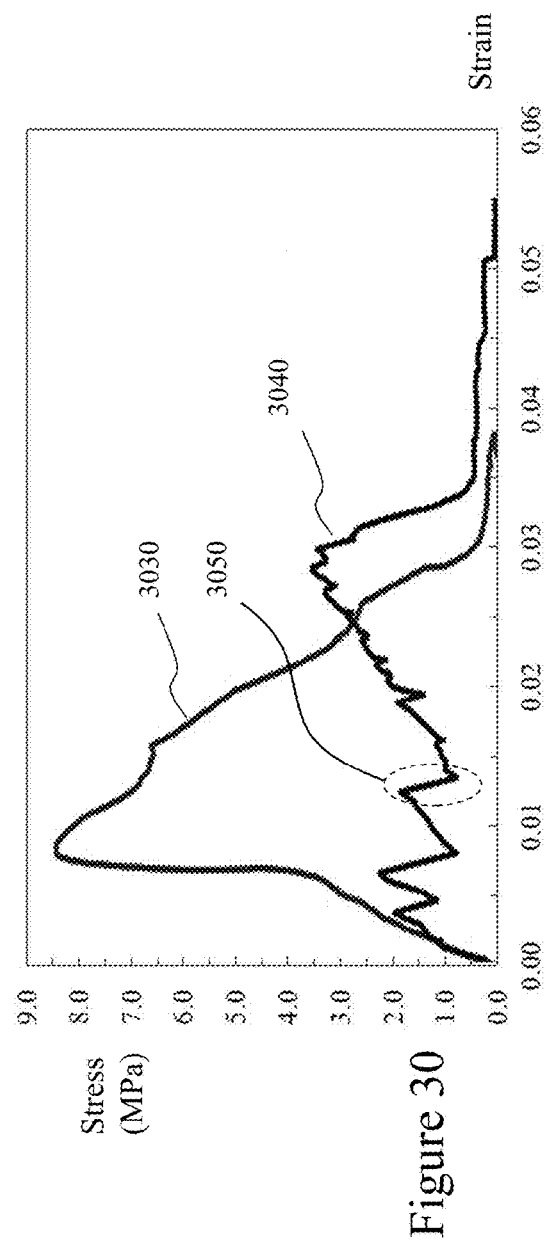
Figure 30

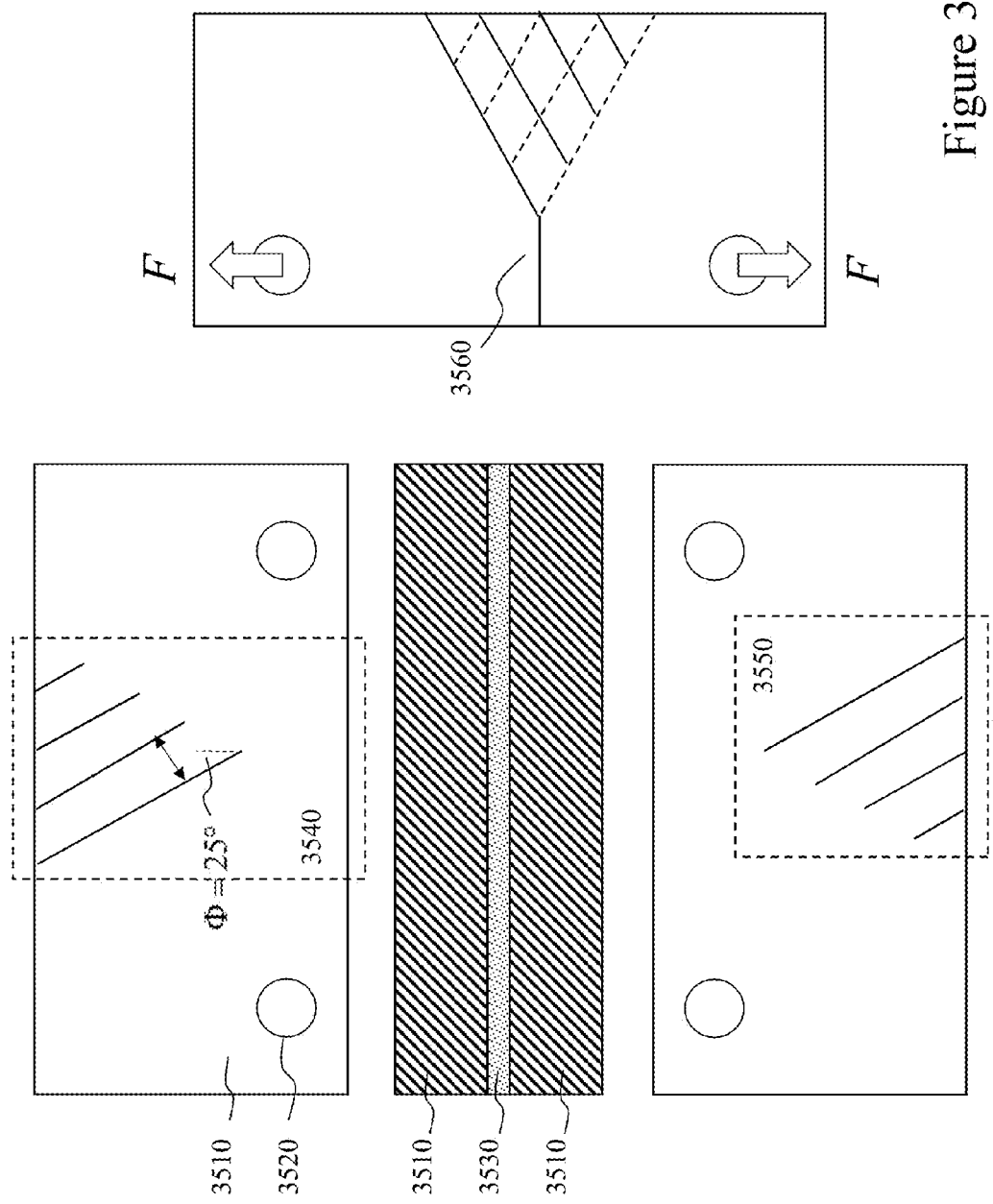

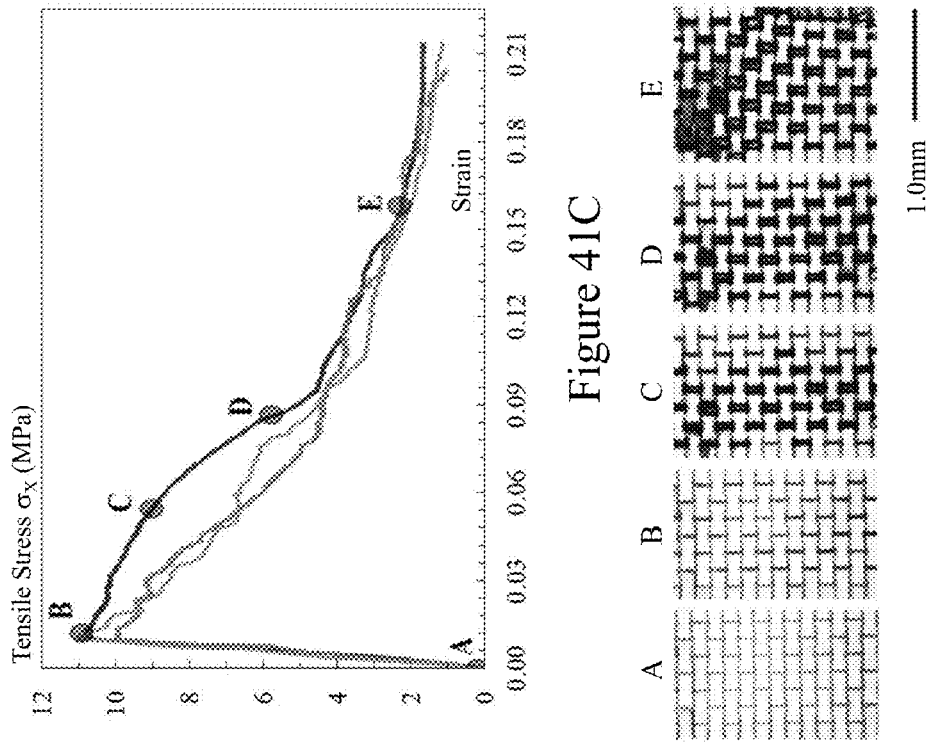
Figure 41C
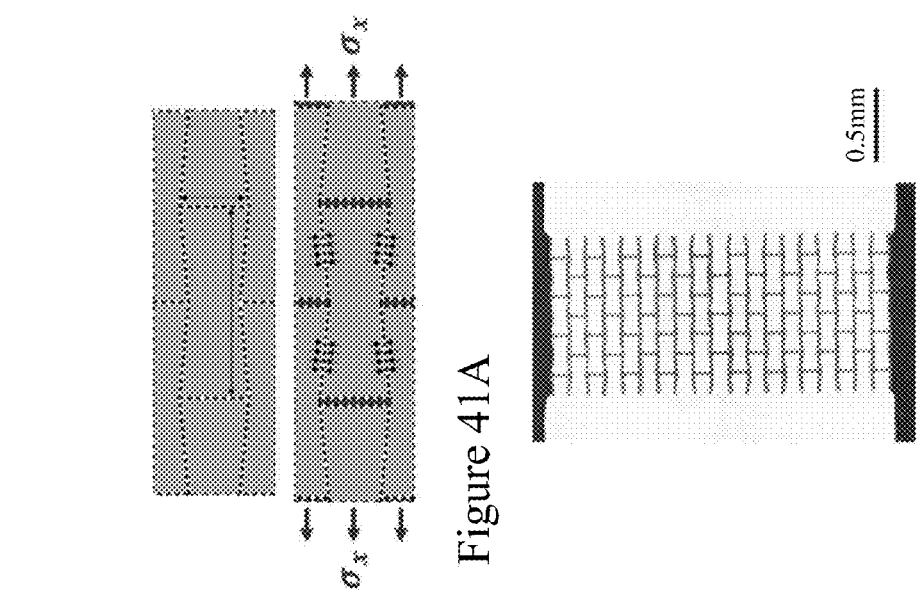
Figure 41A
Figure 41B

METHODS AND SYSTEMS RELATING TO ENHANCING MATERIAL TOUGHNESS

CROSS-REFERENCE TO RELATED APPLICATIONS

This patent application claims the benefit of U.S. Provisional Patent Application 61/946,279 filed Feb. 28, 2014 entitled "Methods and Systems relating to Enhancing Material Toughness", the entire contents of which are incorporated herein by reference.

FIELD OF THE INVENTION

This invention relates to materials and more particularly to methods and systems for increasing their toughness and resistance to impact.

BACKGROUND OF THE INVENTION

Many structural materials found in nature incorporate a large fraction of minerals to generate the stiffness and hardness required for their function (structural support, protection and mastication). In some extreme cases, minerals form more than 95% of the volume of the material, as in tooth enamel or mollusk shells. With such high concentrations of minerals, one would expect these materials to be fragile, yet these materials are tough, durable, damage-tolerant and can even produce 'quasi-ductile' behaviours. For example, nacre from mollusk shells is 3,000 times tougher than the mineral it is made of (in energy terms) and it can undergo up to 1% tensile strain before failure, an exceptional amount of deformation compared to monolithic ceramics. The question of how teeth, nacre, conch shell, glass sponge spicules, arthropod cuticles and other highly mineralized biological materials generate such outstanding performance despite the weakness of their constituents has been pre-occupying researchers for several decades.

Accordingly, it would be beneficial for brittle materials to be modified into tough/deformable materials. The inventors have established that the introduction of well-designed interfaces within the same material can completely change its mechanical response. In this manner, the inventors have established that brittle materials, for example glass the archetypal brittle material, can be engineered into a tough and deformable material.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to synthetic materials and more particularly to methods and systems for increasing their toughness and resistance to impact.

In accordance with an embodiment of the invention, there is provided a method comprising engineering a predetermined property of a material by the introduction of weak interfaces into the material.

In accordance with an embodiment of the invention, there is provided a method comprising engineering a predetermined property of a material by the introduction of weak interfaces into the material, wherein the weak interface is formed by at least one of providing a three-dimensional pattern comprising a plurality of defects formed within the body of the material and providing at least a two-dimensional pattern comprising surface modifications upon at least a surface of the material.

In accordance with an embodiment of the invention, there is provided a method of engineering a predetermined property of a material by the introduction of weak interfaces into the material and the addition of at least one of an elasto-plastic material and an elastic material to a predetermined portion of the material having the introduced weak interfaces.

In accordance with an embodiment of the invention, there is provided a method of engineering a composite material comprising a first layer of a first material having first material properties, a second layer of a second material having first material properties disposed upon the first layer, and a third layer of material having third material properties disposed upon the second layer such that the second layer is disposed between the first and second layers, and introducing weak interfaces into predetermined portions of the first and second layers, wherein the composite material has predetermined properties.

In accordance with an embodiment of the invention, there is provided a method of protecting an object comprising providing a first layer having elastic properties and attaching upon the first layer a plurality of elements of a predetermined material and predetermined geometry within a predetermined pattern.

In accordance with an embodiment of the invention, there is provided a method of protecting an object comprising providing a first layer having elastic properties and attaching upon the first layer a plurality of elements of a predetermined material and predetermined geometry within a predetermined pattern, wherein the predetermined geometry is defined such that an impact to at least an element of the plurality of elements results in displacement of the element of the plurality of elements rather than a tilting of the element of the plurality of elements and that the force required for each element of the plurality of elements to destroy the mechanical integrity of each element of the plurality of elements is higher than the corresponding force for a continuous sheet of the predetermined material.

Any one or more of the methods described above may also include, partially or fully, in any combination, the following additional step and/or features:

the elastic material upon the predetermined portion of the material having the introduced defects under tensile extension of the material acts as ligaments increasing the at least one of the roughness and ductility;

the weak interface is formed by at least one of: providing a three-dimensional pattern comprising a plurality of defects formed within the body of the material; and providing at least a two-dimensional pattern comprising surface modifications upon at least a surface of the material;

the weak interfaces further comprising interlocking features;

the interlocking features comprising a tab on one side of the interlocking feature and a socket on the other side of the feature such that increased force is required to separate the interlocking features;

the interlocking features after separation contribute to increasing the predetermined property through at least one of friction and ligament formation; and the predetermined property is at least one of toughness and ductility and the weak interfaces allow fracture propagation by at least one of progressive sliding, crack bridging, crack deflection, and branching.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of examples only, with reference to the attached Figures, wherein:

FIGS. 2A and 2B depict crack propagation, crack channeling, and toughening mechanisms in tooth enamel and nacre respectively;

FIGS. 2C and 2D depict the hierarchal structure of biological materials with respect to cortical bone and spider silk respectively;

FIGS. 3A and 3B depict strain concentration and localization in staggered composites leading to brittle behavior for biomimetic materials according to embodiments of the invention;

FIG. 4 depicts a representative volume element (RVE) at rest and deformed in tension;

FIGS. 7A to 7C depict tensile strain in the material as function of strain in the defect region for biomimetic materials according to embodiments of the invention;

FIG. 8 depicts a surface plot of ultimate strain for biomimetic materials according to embodiments of the invention;

FIG. 9A depicts a 3D laser engraving system configuration;

FIG. 9B depicts the generation of a micro-defect within a transparent material via laser energy absorption for biomimetic materials according to embodiments of the invention;

FIG. 9C depicts an optical image of an array of micro-defects engraved into glass for biomimetic materials according to embodiments of the invention;

FIG. 9D depicts the variation of micro-defect size with laser power for biomimetic materials according to embodiments of the invention;

FIGS. 13A to 13C depict stress-strain curves of a staggered composite with a defect for biomimetic materials according to embodiments of the invention and images of samples at increasing strain;

FIGS. 18A to 18C depict puncture resistance and work required for puncture as a function of hexagonal plate size for biomimetic materials according to embodiments of the invention;

FIGS. 19A to 19C depict an axisymmetric finite element model for a continuous plate on a soft substrate subjected to a point force P and maximum flexural stress as a function of contrast of stiffness between the plate and substrate for biomimetic materials according to embodiments of the invention;

FIGS. 29A and 29B depict images of the tensile test samples exploiting embodiments of the invention at the start of the test and after application of the maximum tensile force;

FIG. 30 depicts typical stress-strain curves for engraved and engraved-infiltrated glass materials according to embodiments of the invention;

FIG. 35 depicts a fracture test sample exploiting weakened interfaces according to an embodiment of the invention with glass-polymer-glass cross-section for crack deflection;

FIGS. 41A to 41C and 42A to 42C depict the performance of nacre-glass with varying angle for bowtie nacre elements for biomimetic materials according to embodiments of the invention;

FIGS. 44A and 44D depict the performance of nacre-glass for FIG. 40 depicts the performance of nacre-glass with varying aspect ratio for biomimetic materials according to embodiments of the invention.

DETAILED DESCRIPTION

The present invention is directed to materials and more particularly to methods and systems for increasing their toughness and resistance to impact.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

1. Principles of Biomimetic Materials

Figures 1A, 1B:
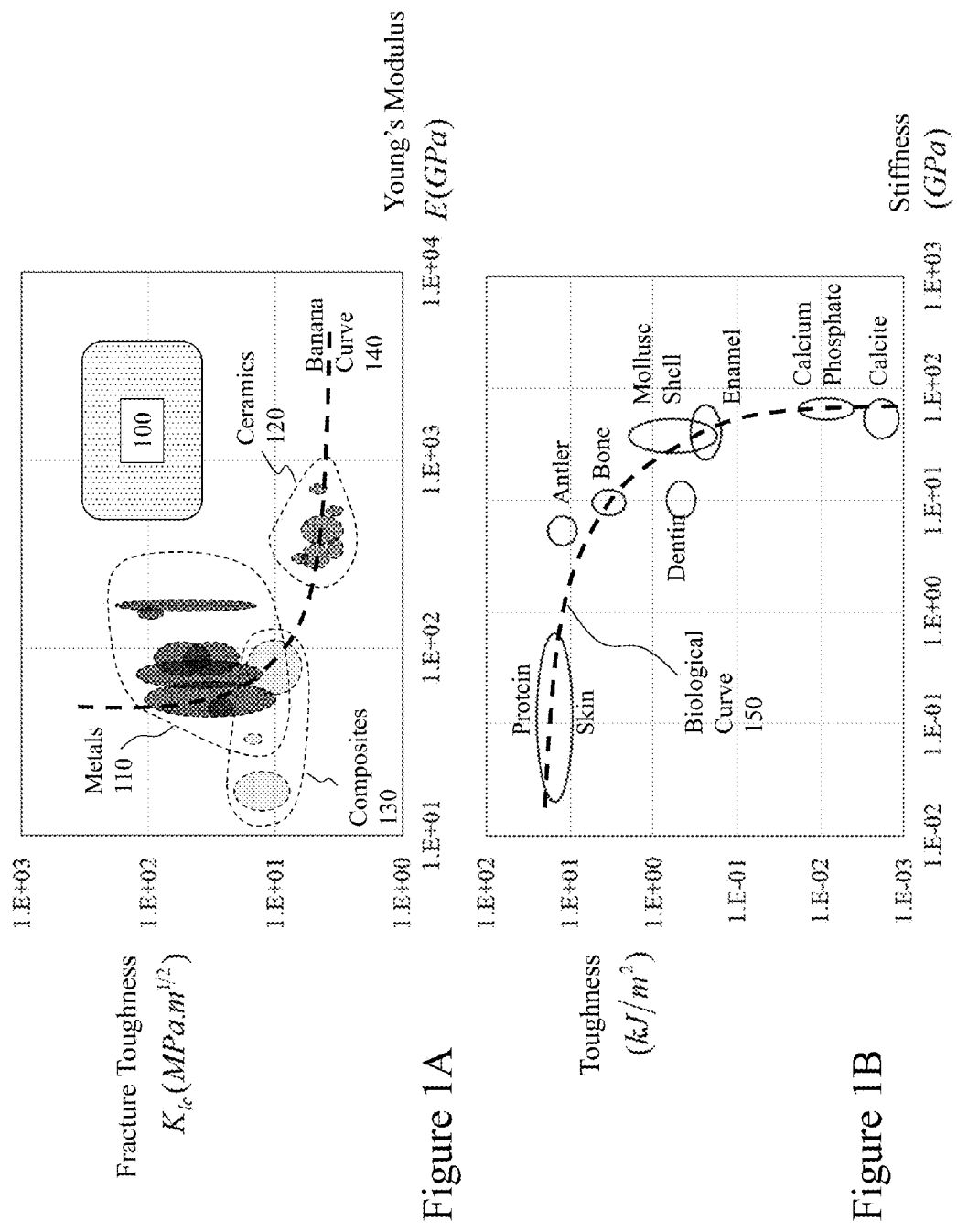
FIG. 1A depicts graphically toughness versus stiffness values for synthetic materials.
FIG. 1B depicts graphically toughness versus stiffness values for a number of biological materials.

Bio-inspired concepts within the prior art may open new pathways to enhancing the toughness of engineering ceramics and glasses, two groups of materials with very attractive properties, but whose range of applications is still limited by their brittleness. Further, a number of synthetic composite materials inspired from biological materials have been reported, based upon a wide range of fabrication techniques, including ice templating, layer-by-layer deposition/assembly, self-assembly, rapid prototyping and manual assembly. These new materials demonstrate that bio-inspired strategies can be harnessed to achieve both strength and toughness, two properties which are typically exclusive as shown in FIG. 1A where high toughness materials such as metals 110 have low Young's modulus whilst higher Young's modulus materials such as ceramics 120 have low toughness. For example, the strength of steel can be increased by cold working or increased carbon content, but this strengthening invariably comes with a decrease in ductility and toughness. Likewise, engineering ceramics are stiffer and stronger than metals, but their range of applicability is limited because of their brittleness.

Despite the impressive properties displayed by some of these new bio-inspired materials, the level of "toughness" amplification observed in natural materials is yet to be duplicated in synthetic composites 130. Such composites 130 tend to occupy a position of low toughness and low Young's modulus and hence do not sit within the region 100 of desirable engineered materials with both high strength and high toughness. Referring to FIG. 1B, the toughness and strength of a range of natural biological materials are presented demonstrating that high strength and high toughness can be achieved concurrently within the same material. It is evident from FIG. 1B that their properties follow a very different curve, biological curve 150, to the so-called "banana curve" 140 of ceramics, composites, and metals depicted in FIG. 1A.

As such these high-performance natural materials such as nacre, teeth, bone and spider silk boast outstanding combinations of stiffness, strength and toughness which are currently not possible to achieve in manmade engineering materials. For example, dragline silk from spiders surpasses the strength and toughness of the most sophisticated engineering steels, while collagenous tissues such as bone, tendons or fish scales display powerful toughening mechanisms over multiple length scales. Nacre from mollusk shells is 3000 times tougher than the brittle mineral it is made from and it is one of the toughest materials amongst other mollusks shell materials and other highly mineralized stiff biological materials such as tooth enamel. An examination of the structure and mechanics of these materials reveals a "universal" structural pattern consisting of stiff and hard inclusions embedded in a softer but more deformable matrix. The inclusions are elongated and are parallel to each other, and aligned with the direction of loading within their biological environment. Such structures are particularly well suited to uniaxial or biaxial tensile loads. In one-dimensional fibers and "ropes" such as spider silk or tendons, uniaxial tension is the only loading configuration. However, more "bulky" materials, such as nacre and bone, undergo multi-axial loading modes but, since these materials are quasi-brittle, tensile stresses are always the most dangerous stresses. Increasing tensile strength is therefore critical to the performance of these materials.

The fundamental mechanism of tensile deformation is the gliding or sliding of the inclusions on one another. In this mechanism the inclusions remain linear-elastic, but the interface dissipates a large amount of energy through viscous deformation. The resulting stress-strain curves display relatively large deformation before failure and, as a result, the material can absorb a tremendous amount of mechanical energy (area under the stress-strain curve). Energy absorption is a critical property for materials like bone, nacre and spider silk, which must absorb energy from impacts without fracturing. Interestingly, the staggered structure has recently been shown to be the most efficient in generating optimum combinations of stiffness, strength and energy absorption by the inventors.

Referring to FIGS. 2A and 2B, tooth enamel and nacre are depicted. As evident, the structure of these materials is organized over several distinct hierarchical length scales, from the nanoscale to the macroscale. Considering tooth enamel then as depicted in FIG. 2A, this is composed of long rods perpendicular to the surface of the tooth and 4-8 μm in diameter and held together by a small fraction of proteins (approximately 1% by volume). Similarly, nacre, as depicted in FIG. 2B, is made of microscopic tablets of calcium with proteins and polysaccharides holding the structure together. While these materials display features over several length scales, it appears that cracks within them preferentially interact with their microscopic features. For example, a crack in nacre (FIG. 2A) propagates along the interfaces, circumventing the microscopic tablets, and generates typically a tortuous path, thereby dissipating more energy.

Referring to FIGS. 2C and 2D, similar multi-scale organizational structure is evident in bone and spider silk. Considering initially macroscopic bone (FIG. 2C) then this is composed of Haversian osteons, of dimensions in the order of tens of micron, which are composed of several layers of parallel collagen fibers. Each collagen fiber is itself a bundle of collagen fibrils having dimensions of several microns, each collagen fibril itself being composed essentially of collagen molecular packing with minerals that are disposed at a period of approximately 67 nm within a fibril of approximately 1.5 nm lateral width. Similarly spider silk (FIG. 2D) comprises a fiber of diameter approximately one micron which is comprised from a plurality of crystalline regions of dimensions of approximately a hundred nanometers separated by amorphous linkages. These crystalline regions are themselves comprised of crystalline sheets of thickness approximately a nanometer thick.

It is the ability to guide and deflect cracks which is fundamental to the performance of these materials, and it is only possible if the interfaces are weaker than the building blocks themselves. Typically, the presence of weak interfaces within a material is perceived as detrimental to the performance of the material, but in fact it enables their powerful toughening mechanisms. In tooth enamel, cracks typically emanate from the surface because of repeated contact or impact stresses. Initially, the cracks are channeled away from the surface and along the parallel rods, preventing further chipping of the enamel surface. Deeper within the enamel, the rods bend and crisscross, forming a complex decussation, which impedes further crack growth (FIG. 2A). More severe stresses may propagate the crack through the enamel layer where they meet another line of defence, the dentino-enamel junction and underlying dentin. Similarly, a crack propagating in nacre will be systematically deflected by the microscopic mineral tablets (FIG. 2B). Behind the crack tip, the tablets are still in contact and interact through the highly deformable interfaces and associated nanoscale features, exerting closure forces, which hinder crack propagation. Furthermore, the wavy shape of the tablets generates progressive interlocking and progressive hardening at the local scale, so that tablet sliding propagates over large volumes around defects and cracks. These so-called "process zones" dissipate a tremendous amount of mechanical energy, which produces additional toughness.

Within bone, the mineral elements are retained between arrays of elastic fibrils, and within silk the hard crystalline elements are dispersed within elastic semi-amorphous regions. In these materials it is the interplay between hard crystalline materials and elastic materials that give bone, notably cortical bone, and silk their properties. Mechanisms similar to those found in teeth enamel, nacre, cortical bone, and silk have also been observed in other materials, including glass sponge spicules and conch shells, where crack deflection along microscopic features (e.g., osteons, lamellae and cross plies) dominate their toughening mechanisms.

Accordingly, the inventors within embodiments of the invention exploit such hierarchal structures to modify existing materials to implement biomimetic materials that offer characteristics not present within their founding base material.

2. Theoretical Model of Biomimetic Material Strain Rate Hardening

Within nacre and bone the sliding mechanism of inclusions has been captured within the prior art in theoretical models employing closed-form solutions and finite elements. These theoretical models can predict the modulus, strength and energy absorption of the materials as functions of the properties of the constituents and the morphology of the microstructure (aspect ratio of the inclusions, arrangement and interface thickness). Materials such as nacre and collagen fibrils display remarkable periodicities from the nanoscale to the microscale and accordingly, the general approach for micromechanical models is usually based on the mechanical response of a periodic unit cell. This "representative volume element" (RVE) approach greatly simplifies computations, and it is based on the assumption that the mechanics and properties of the unit cell are representative of the entire material. However, the powerful mechanisms observed at the unit cell level can translate to the macroscale only if these mechanisms spread over large volumes within the material, which requires some type of hardening mechanism as depicted within FIG. 3A that thereby yields material performance as depicted in FIG. 3B. When a material is deformed, nonlinear deformations may accumulate near initial defects, flaws and other stress concentrators within the material. A hardening mechanism ensures that further deformations within these regions require an increasing amount of stress, so that other regions of the material may also start accumulating nonlinear deformations. Hardening mechanisms therefore promote the spreading of nonlinear deformations, and maximize the effect of beneficial mechanisms such as energy dissipation. Without some types of hardening mechanism, the benefits of nonlinear deformations would be confined to small volumes within the material. In this localization scenario, a unit cell taken within the defect region behaves differently from a unit cell outside of the defect region, so that the assumption of the unit cell being representative of the material breaks down. In effect, high strain concentration and early localization lead to small macroscale strain and to a brittle mechanical response for the material.

The sliding mechanism of the inclusions on one another also has implications in terms of fracture mechanics. If the interfaces between the inclusions are sufficiently weak, propagating cracks will be deflected and will circumvent the inclusions. The subsequent pullout of the inclusions produces toughening by way of crack bridging, the tablets exerting a closure force on the crack faces. In a material like nacre, however, it was demonstrated that bridging only provides a small fraction of the overall toughness and that a larger portion of toughening comes from the spreading of nonlinear deformations over large volumes. This mechanism dissipates a tremendous of energy, which contributes to the toughness of the material. Here again, the formation of a large process zone around propagating cracks relies on some type of hardening mechanism in the material. In summary, even if the mechanism of tablet sliding is optimized and produces attractive properties at the level of the unit cell, these mechanisms will only translate to a poor material if they do not propagate throughout the material.

In natural nacre, an important mechanism for the spreading of nonlinear deformations is associated with the microscopic waviness of the inclusions, which generates progressive locking and "geometric strain hardening" at the local scale. However, in other material systems, such as collagen fibrils and spider silk, the inclusions are relatively flat and do not display any waviness, and the origin of hardening and large deformations in these materials therefore remains elusive. Some of the proteins present at the interfaces of nacre or bone show remarkable deformation mechanisms and large deformations, but it is unclear whether these proteins can produce enough strain hardening to translate to large deformations at the macroscale. What is known, however, is that the proteins and biopolymeric matrices found in natural materials are rate sensitive, exhibiting viscoelastic and viscoplastic responses.

Accordingly, the inventors have established through theoretical modelling and experimental correlation that strain rate hardening at the interfaces in biological materials allows for generation of large inelastic deformations within these materials and their resulting high material performances. Accordingly, the inventors have established biomimetic materials from existing low strength, high brittleness materials that perform in similar regimes to biological materials.

Strain rate hardening materials require more stress to deform at higher rates of deformations, with implications on spreading deformation which are similar to strain hardening. When a concentration of strain appears at initial defects, the rate of deformation increases faster than in the rest of the material, which in turn requires more stress. As a result, other regions of the material will also accumulate nonlinear deformations, which then spread over large volumes. Strain rate hardening has already been demonstrated, theoretically and experimentally, to be a potent mechanism to delay necking instabilities in ductile metals. However, the inventors through their theoretical model have established the conditions for supporting large deformations in staggered composites, incorporating the effects of strain hardening and strain rate hardening at the interfaces.

2.1 Representative Volume Element Modeling: Viscoplastic Response

The shear-tension model employed by the inventors is depicted in first image 400 in FIG. 4 based upon prior art shear lag models for composites, and is typically used to predict the mechanical response of biological and biomimetic composites. Within this two-dimensional model, the inclusions (referred to hereinafter as "tablets", to be consistent with the terminology used for nacre) are aligned with the direction of loading, and as a result they carry stress in tension while the interfaces undergo shear stresses and channel the loads between the tablets. For simplicity, the modelling presented relates to the case where the tablets overlap over half of their length. The tablets are modeled as linear-elastic and the interface is modeled as linear elastic or as elastic-perfectly plastic. The inventors further consider that the interfaces are formed from a viscoplastic material with rate dependence which follows the general constitutive Equation (1) where $\tau$ and $\gamma$ are the true shear stress and true shear strain at the interface, and $\dot\gamma$ denotes the time derivative of the shear strain, or the shear strain rate. K is the strength index, m is the strain hardening coefficient and n is the strain rate sensitivity (K, m and n are material properties). This general model can capture strain hardening as well as rate effects, and it can capture the behavior of a large variety of materials, including plastic solids and rheological fluids. The tablets are typically much stiffer than the interfaces, and therefore they are modeled as rigid. This assumption is reasonable, considering that the inclusions in biological and biomimetic composites are typically at least one order of magnitude stiffer than the interface. The assumption of rigid tablets is verified by the inventors within the experimental section. A direct implication of this assumption is that the distribution of shear stress and shear strain along the interface is uniform, and that the only non-zero strain at the interface is the shear strain $\gamma$. As the tablets slide and pull out, and as the relative sliding of the tablets u/L increases, the load-carrying surface of the tablets decreases. The viscoplastic interfaces flow to accommodate this effect and maintain the cohesion between tablets, albeit over a reduced length L−u, as evident in second image 450 in FIG. 4. This geometric softening is similar to the reduction of the load-bearing area from plastic deformations occurring in metals under tension.

$$\tau = K\gamma^m \dot\gamma^n \quad (1)$$

The overall tensile stress within this model is given by considering the equilibrium of a half-tablet. The tensile force carried by each the tablet is that given by Equation (2) where F is the tensile force, 2L is the length of the tablet, u is the sliding distance at each interface and $\tau$ is the shear stress transmitted through each interface. The macroscopic tensile stress per unit width of the composite is then given by Equation (3) where $t_t$ and $t_i$ are the thicknesses of the tablets and interfaces respectively. Using the volume fraction of the tablets as $\phi = (t_t/(t_t+t_i))$ (0<$\phi$<1), the overlap ratio of the tablets $\rho = (L/t_t)$ ($\rho$>0), and the average shear stress per unit width at the interface $\tau = (F/L)$, then Equations (2) and (3) become Equation (4).

$$F = 2(L-u)\tau \quad (2)$$

$$\sigma = \frac{F}{2(t_t + t_i)} \quad (3)$$

$$\sigma = \phi\rho\left(1 - \frac{u}{L}\right)\tau \quad (4)$$

$$\gamma = \frac{u}{t_i} \quad (5)$$

$$\varepsilon = \frac{u}{L} = \frac{t_i}{L}\gamma = \left(\frac{1-\phi}{\phi}\right)\frac{1}{\rho}\gamma \quad (6)$$

$$\sigma = \phi\rho(1-\varepsilon)\tau \quad (7)$$

$$\sigma = K\phi\left(\phi\frac{\phi}{1-\phi}\right)^{m+n}\rho^{m+n+1}(1-\varepsilon)\dot{\varepsilon}^n \quad (8)$$

Meanwhile, the deformation of the RVE can be easily captured, recalling that tablets are considered rigid and that the interfaces are in a state of uniform simple shear. The true shear strain is given simply by Equation (5). In order to characterize the tensile deformation of the RVE, the inventors have used the engineering strain definition (true strains could have also been used, without changing the main results of the model). Since the tablets are assumed to be rigid, the tensile strain of the RVE is then written Equation (6). Combining Equations (4) and (5) we can also write the stress as Equation (7).

Figure 5:
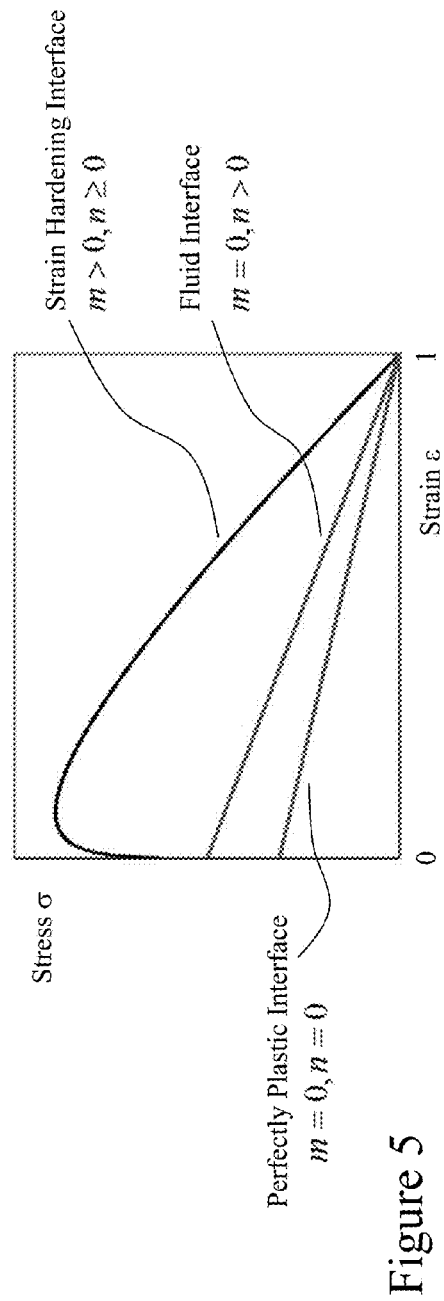
FIG. 5 depicts qualitative responses of an RVE with different types of materials at the interface for biomimetic materials according to embodiments of the invention.

In order to model the tensile response of a material deformed at a constant rate, the inventors write the strain as $\varepsilon = \dot{\varepsilon}t$ where $\dot{\varepsilon}$ is the constant macroscopic tensile strain rate imposed on the material and t denotes time. Accordingly, by combining Equations (1), (6) and (7) we obtain the general mechanical response of the RVE in Equation (8). Equation (8) shows that macroscale tensile stress results from two competing effects: an intrinsic material effect where the interface produces more stress as deformation is increased and a geometrical softening effect where the tablets lose contact as deformation increases. To illustrate this result, FIG. 5 depicts the qualitative response of the RVE with three different types of materials at the interface. For the cases where m=0 (no material strain hardening), the geometric softening effect always prevails and the stress decreases linearly with strain until the tablets lose contact at ε=1. This case includes rate-independent plastic solids (n=0) and viscous fluids (for n>0). When strain hardening is present at the interface (m>0 and n≥0), strain hardening at the RVE level initially prevails until a maximum value for stress, after which softening from the geometric effects overcome material effects. This case corresponds to a strain hardening solid with rate dependence (if n>0) or with rate-independent plasticity (if n=0).

2.2 Modelling Real Materials—Strain Concentration and Localization at Pre-Existing Defects The model presented in Section 2.1 assumes that a single microstructural element, or unit cell, is representative of the entire material. This assumption is typically made to model nacre, bone and other similar natural or biological materials. In reality, these materials contain defects which can raise stresses locally and generate strain concentrations, which may eventually turn into localization, large cracks and macroscopic brittle behavior. In the event where strain concentration or localization occurs, using a simple unit cell as an RVE is not appropriate since the deformations in the defect region have become significantly larger than anywhere else in the material. Localization and failure may be delayed by strain hardening, as seen in the previous section, but the single-cell RVE model also shows how softening rapidly prevails when large deformations are considered.

Figure 6:
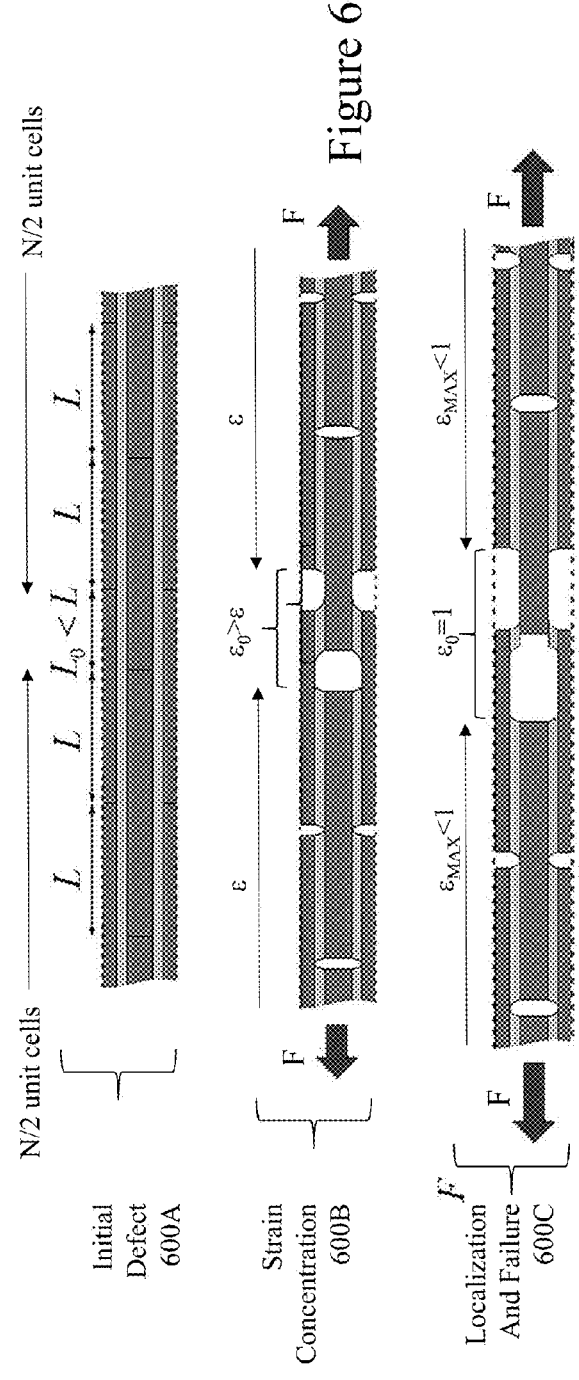
FIG. 6 depicts a chain of N unit cells with overlap containing an initial "defect" under increasing tension for biomimetic materials according to embodiments of the invention.

Accordingly, the inventors extended their model in order to capture the strain concentration at defects by considering a larger RVE which is made of a chain of N unit cell models, where N>>1 for a typical material, e.g., first image 600A in FIG. 6. The RVE contains a defect, which we model as a region where the overlap between the tablets is smaller than everywhere else in the material ($L_0$<L). The RVE is periodic along the vertical direction (across the direction of the tablets) so that the defect it contains actually represents a line defect within the material. As a result of the defect, stretching the model by a macroscopic strain ε will result in tensile strains $\varepsilon_0$>ε in the defect region, see second image 600B in FIG. 6. When stretching is continued, the material eventually fails at the defect, third image 600C in FIG. 6, where the tablet is entirely pulled out and $\varepsilon_0$=1. The strain in the rest of the material is then $\varepsilon_{MAX}$<1, and represents its macroscopic strain at failure $\varepsilon_{MAX}$. Accordingly, $\varepsilon_{MAX}$ can therefore be used as a measure of the brittleness or ductility of the material such that now the objective of the inventors' model is to predict $\varepsilon_{MAX}$ as a function of the severity of the defect and of the material behavior at the interface.

$$\rho_0 = \frac{L_0}{t_t} \quad (9A)$$

$$\rho = \frac{L}{t_t} \quad (9B)$$

$$\eta = \frac{\rho - \rho_0}{\rho_0} \text{ with } 0 \le \eta \le 1 \quad (10)$$

$$\sigma_0 = \sigma \quad (11A)$$

$$(L_0 - u_0)\tau_0 = (L - u)\tau \quad (11B)$$

$$\varepsilon_0 = \frac{u_0}{L_0} \quad (12A)$$

$$\varepsilon = \frac{u}{L} \quad (12B)$$

Accordingly, we initially define a pair of overlap ratios as given by Equations (9A) and (9B). The relative difference of overlap lengths between the defect and the rest of the material provides a non-dimensional measure of the severity of the defect, which can be written as Equation (10). Within Equation (10), η=0 represents a material with no defects and η=1 represents the extreme case where the defect splits the material before it is even loaded. For continuity of tensile stress between the defect and the rest of the material, one must have the conditions defined by Equations (11A) or (11B) where $\tau_0$ is the shear stress at the interface in the defect region and τ is the shear stress in the rest of the interfaces. The engineering tensile strains in each of the regions are then given by Equations (12A) and (12B). Combining Equations (11A) or (11B) with (12A) and (12B) gives Equation (13). Note that initially, the deformations are small and $\varepsilon \approx \varepsilon_0 \approx 0$, so that $\tau_0 \approx (1/(1-\eta))\tau$, and therefore $\tau_0 \approx \tau$.

$$(1-\varepsilon_0)\tau_0 = \frac{1}{1-\eta}(1-\varepsilon)\tau \quad (13)$$

Now, as expected, yielding and flow will therefore occur first at the interfaces located at the defect. In the absence of strain hardening or strain rate hardening (perfect plasticity), only the defect region will yield and the material will localize at the central region of the model. This is a detrimental case which leads to a brittle mechanical response. Accordingly, the inventors examined the conditions necessary to delay or even suppress localization in the presence of the defect. Accordingly, following the methodology described supra the interfaces were modeled with a viscoplastic hardening material as defined by Equation (14A) and (14B) with shear strains and strain rates at the interfaces defined by Equations (15A) and (15B) respectively. These can be re-written as Equations (16A) and (16B).

$$\tau = K\gamma^m \dot{\gamma}^n \quad (14A)$$

$$\tau_0 = K\gamma_0^m \dot{\gamma}_0^n \quad (14B)$$

$$\gamma = u/t_i \quad (15A)$$

$$\gamma_0 = u_0/t_i \quad (15B)$$

$$\left. \begin{array}{l} \gamma = (1/(1-\phi))\rho\varepsilon \\ \gamma_0 = (1/(1-\phi))\rho_0\varepsilon_0 \end{array} \right\} \quad (16A)$$

$$\left. \begin{array}{l} \dot{\gamma} = (1/(1-\phi))\rho\dot{\varepsilon} \\ \dot{\gamma}_0 = (1/(1-\phi))\rho_0\dot{\varepsilon}_0 \end{array} \right\} \quad (16B)$$

Now, combining Equations (10), (13), (14A/14B) and (16A/16B) gives Equation (17) wherein, in order to eliminate the strain rate terms, the inventors used $\dot{\varepsilon}=dz/dt$ and $\dot{\varepsilon}_0=dz_0/dt$ to obtain the incremental form given in Equation (18) which may then be integrated using the initial conditions of $\varepsilon(0)$ and $\varepsilon_0(0)=0$ to yield Equation (19).

$$(1-\varepsilon)\varepsilon^m \dot{\varepsilon}^n = (1-\eta)^{m+n+1}\left((1-\varepsilon_0)\varepsilon_0^m \dot{\varepsilon}_0^n\right) \quad (17)$$

$$(1-\varepsilon)^{1/n}\varepsilon^{m/n} d\varepsilon = (1-\eta)^{m+n+1/n}((1-\varepsilon_0)^{1/n}\varepsilon_0^{m/n})d\varepsilon_0 \quad (18)$$

$$\int_0^z (1-s)^{1/n} s^{m/n} ds = (1-\eta)^{m+n+1/n} \int_0^{\varepsilon_0} (1-s)^{1/n} s^{m/n} ds \quad (19)$$

Accordingly, Equation (19) can be used to compute the tensile strain $\varepsilon$ in the bulk of the material as a function of the tensile strain $\varepsilon_0$ in the defect region. Note that for the extreme case $\eta=0$ there is no defect and Equation (19) correctly predicts $\varepsilon=\varepsilon_0$. On the other hand, $\eta=1$ corresponds to the case where the defect splits the material in half before any load is applied, and in this case Equation (19) predicts $\varepsilon=0$. It is also important to note that Equation (19) does not contain any rate-dependent terms, with the important implication that the strain at failure is rate independent. Accordingly, Equation (19) was integrated numerically to compute the tensile strain in the bulk of the material $\varepsilon$ as a function of the strain in the defect region $\varepsilon_0$. FIGS. 7A to 7C respectively depict the effects of m, n, and $\eta$ on the evolution of the resulting strains. Failure occurs in the defect region and therefore when the material is stretched to failure the strain at the defect goes from $\varepsilon_0=0$ (initial configuration) to $\varepsilon_0=1$ (failure at the defect region). The results depicted in FIGS. 7A to 7C respectively show that in the early stages of deformation the strains in the defect and in the rest of the material are the same, but they eventually diverge from one another with $\varepsilon<\varepsilon_0$ as the deformations localize.

FIG. 7A shows the response of the material in the presence of a relatively large defect ($\eta=0.1$) and with strain rate hardening ($n=0.1$). As expected, the strain at failure increases with interfaces with more strain hardening. FIG. 7B shows that strain rate hardening has a similar effect on distributing strains and can be a powerful approach to increasing the ultimate strain of the material. This result will be further developed and discussed subsequently by the inventors. Finally, FIG. 7C shows the effect of the severity of the defect $\eta$. For $\eta=0$ the strain is uniform throughout the material (no strain concentration) and $\varepsilon=\varepsilon_0$. However, the ultimate strain for the material drops significantly when a defect is introduced and the theoretical models show that, for the set of material properties shown here (m=n=0.1), $\eta$ as small as $10^{-4}$ results in an approximately 50% loss of strain at failure for the material.

The maximum value of e therefore represents the strain at failure for the entire material, and can be used to assess whether the material is brittle or ductile. FIG. 8 depicts $\varepsilon_{MAX}$ as a function of m and n and for a relative defect size $\eta=0.1$ (results for other defect sizes are not shown here, but they show the same trends as the functions of m and n). For m=0 and n=0, localization is immediate and the material does not produce any deformation ($\varepsilon_{MAX}=0$), which corresponds to brittle behavior. The ultimate strain can be increased by increasing the strain hardening and/or by increasing strain rate hardening at the interface, the highest strains at failure occurring when both mechanisms operate simultaneously. High strains at failure can be obtained, as expected, from pure strain hardening (m>0, n=0) but also, more unexpectedly, from pure strain rate hardening (m=0, n>0). This result implies that an interface behaving as a viscous rheological fluid may produce sufficient strain rate hardening to spread deformations in the presence of defects. The values m=0 and n>0 correspond to a viscous fluid, which is dilatant for n>1 and thinning for n<1. The case m>0 and n=1 represents a Newtonian fluid where K is the viscosity. Interestingly, if m=0, a closed form solution for the ultimate strain can be obtained from Equation (17) as given by Equation (20) which after some mathematical manipulation can be re-written as Equation (21).

$$(1-\varepsilon_0)\dot{\varepsilon}_0^n = \frac{1}{(1-\eta)^{n+1}}(1-\varepsilon)\dot{\varepsilon}^n \quad (20)$$

$$\int_0^{\varepsilon_0}(1-t)^{1/n} dt = \frac{1}{(1-\eta)^{n+1}} \int_0^{\varepsilon}(1-t)^{1/n} dt \quad (21)$$

$$\varepsilon = 1 - \left(1 - (1-\eta)^{\frac{n+1}{n}}[1-(1-\varepsilon_0)^{1+1/n}]\right)^{\frac{n}{n+1}} \quad (22)$$

$$\varepsilon_{MAX} = 1 - \left(1 - (1-\eta)^{\frac{n+1}{n}}\right)^{\frac{n}{n+1}} \quad (23)$$

$$\varepsilon_{MAX} = 1 - \sqrt{\eta(2-\eta)} \quad (24)$$

Direct straight integration of Equation (21) yields Equation (22). The material fails when $\varepsilon_0=1$ and therefore the maximum strain in the material is given by Equation (23). Note again, that $\varepsilon_{MAX}=1$ only if $\eta=0$ (no defect). For a Newtonian liquid with n=1, then Equation (23) simplifies to Equation (24) which predicts that a complex rheological behavior is not required to achieve strain rate hardening, and that a simple Newtonian fluid at the interfaces is sufficient to spread deformations over large volumes. For example, Equation (24) predicts that a material with a Newtonian fluid at the interfaces and containing a relatively large defect with $\eta=0.1$ has a strain at failure $\varepsilon_{MAX}=0.56$.

More generally, the theoretical results above highlight strain rate hardening as a powerful mechanism for staggered composites, with profound implications in the mechanics of natural and biomimetic staggered composites. Natural materials such as nacre, bone and spider silk exhibit significant rate dependence, because their interfaces are rich in rate-dependent proteins. Strain rate hardening could therefore play a significant role in generating large deformations and damage tolerance. It is, however, difficult to assess the role of strain rate hardening in these materials, because elastic and strain hardening components also contribute to the overall response. Accordingly, as described below in respect of Section 3.2 the inventors took another approach to validate the results of our model wherein a "model staggered composite material" was fabricated and tested with experiments focused exclusively on the effects of strain rate hardening, and therefore a viscous fluid was used as the interfaces.

Figure 9E:
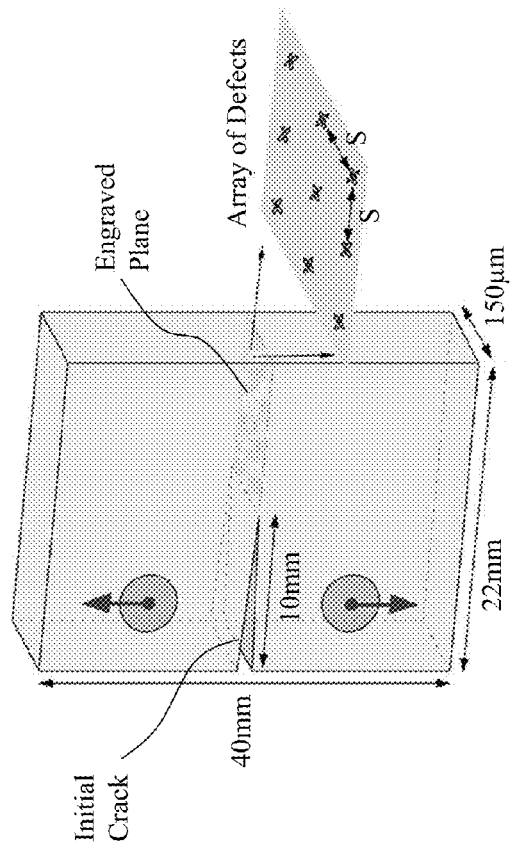
FIG. 9E depicts a compact tension fracture specimen configuration used to measure fracture toughness for biomimetic materials according to embodiments of the invention.

3. Experimental Results of Biomimetic Material Strain Rate Hardening 3.1 Engraving Weak Interfaces within Bulk Glass Lasers have been widely used in the past to alter the structure of materials and to generate useful structures such as microfluidic devices or waveguides at small scale and with high accuracy and low surface roughness. Within embodiments of the invention described within this specification, a 3D laser engraving technique was employed, although it would be evident that other techniques to form the structures within the materials may be employed without departing from the scope of the invention. 3D laser engraving as depicted in FIG. 9A consists of focusing a laser beam at predefined points by using a set of two mirrors and a focusing lens. The UV laser beam (355 nm) used here travels in glass with little absorbance, and can be focused anywhere within the bulk of the material.

When the system is appropriately tuned, the energy of the unfocused laser beam does not induce any structural changes in glass. However, the heat absorbed at the focal point is sufficient to generate radial microcracks from the hoop stresses associated with thermal expansion as depicted in FIG. 9B. These cracks only propagate over short distances, because the hoop stresses decrease rapidly away from the focal point. With a pulsed laser system, complex 3D arrays of thousands of defects can be engraved in a short period of time and with sub-micrometer precision. Three such defects in an array are depicted in FIG. 9C. The size of the defects can also be tuned by adjusting the power of the laser. For the combination of the glass material and the laser employed in proof-of-principle trials (see Methods section below), a minimum average power of 35 mW was required to generate defects, as shown by the first data point in FIG. 9D. Increasing the laser output power generated larger cracks, following a linear relationship over the range from 35 mW to 140 mW, after which defect size plateaued with the generated defects being of approximately constant size, about 25 μm. This is depicted in FIG. 9D and provided a window sufficiently large to tune the size of the microcracks.

Figure 9F:
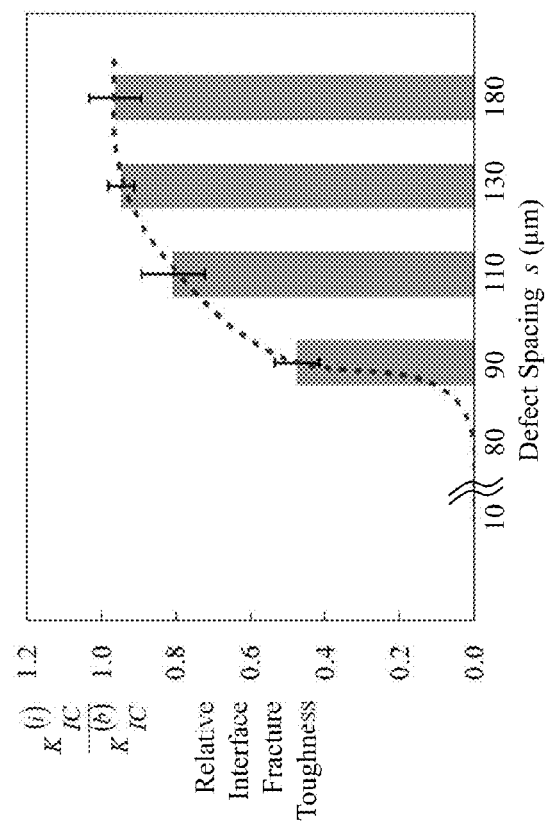
FIG. 9F depicts the impact of defect spacing on the fracture toughness of the engraved interface for biomimetic materials according to embodiments of the invention.

Arrays of such defects were then generated within the bulk of the glass, effectively creating weaker interfaces. Once the weaker interfaces are engraved, the application of an external load may grow the microcracks until they coalesce, effectively channeling the propagation of long cracks. Furthermore, the toughness of the interface can be tuned by adjusting the size or spacing of the defects. To demonstrate these concepts, compact tension fracture samples were prepared containing a pre-notch and an array of equally spaced defects along the anticipated path of crack propagation. Depicted schematically in FIG. 9E, the 22×40× 0.15 mm samples had a 10 mm long notch cut at one side together with two mounting holes for the test jig to apply the force to the sample. Then from the end of this notch, an array of defects was formed in the plane of the notch. This geometry was used to measure the apparent toughness of the interface as a function of defect size and spacing. Referring to FIG. 9F, the effect of defect spacing on the toughness of the interface can be seen for an average defect size of 25 μm. When these defects were very close to each other, spacings of 80 μm and lower, they coalesced on engraving without the application of any external load, effectively cutting the sample in half and giving an apparent toughness of zero. The apparent toughness being defined as the fracture toughness of the interface, $K_{IC}^{(i)}$, normalized by the fracture toughness of bulk glass, $K_{IC}^{(b)}$. Increasing the spacing between the defects increased the toughness of the interface, up to a spacing of 130 μm. Defects more than 130 μm apart did not interact on application of an external load, and in these cases the apparent toughness was close to the toughness of the intact bulk glass, i.e., glass within which no interface was created. Accordingly, these experiments show that 3D laser engraving can provide a fast and simple approach in generating weak interfaces of tunable toughness within glass.

3.2 Guiding Cracks Along Engraved Interfaces

Figure 10A:
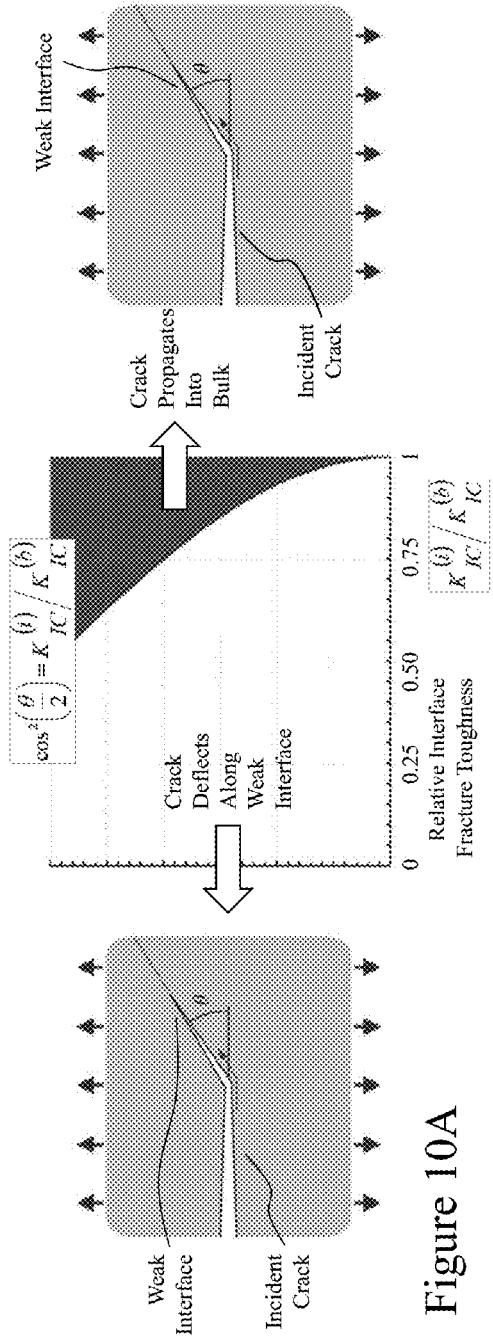
FIGS. 10A and 10B depict the design space for the angle between an incident crack and a weaker interface allowing the incident crack to be deflected depending upon the relative interface toughness for biomimetic materials according to embodiments of the invention.
Figure 10B:
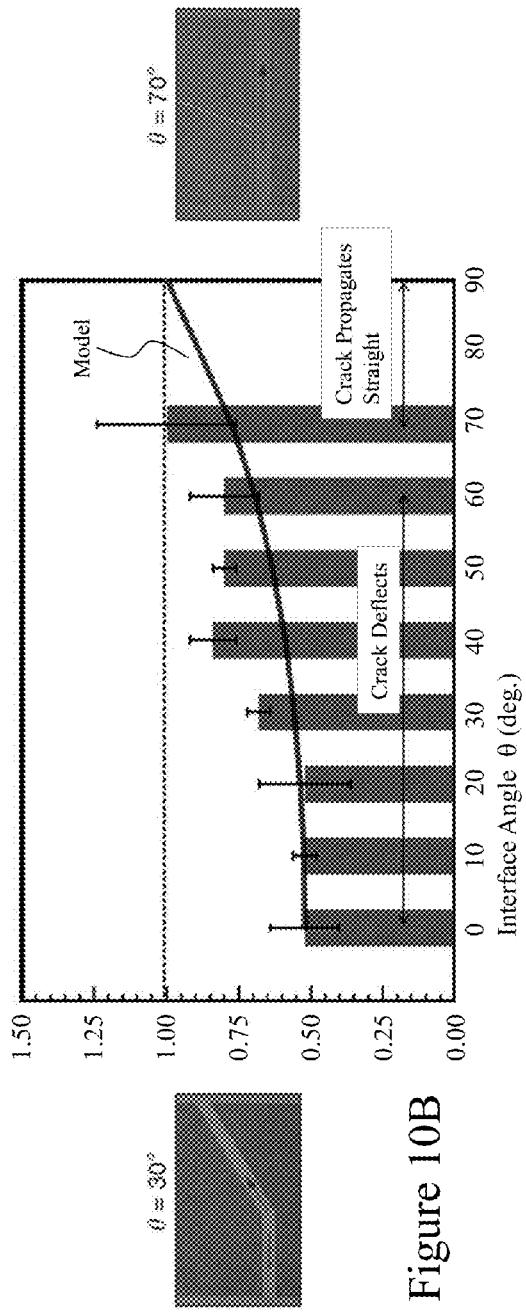

The next step in generating the required material properties is to exploit these weak interfaces in order to deflect and channel cracks along predefined paths. Theoretical fracture mechanics predicts that an incident crack propagating in mode I (opening) and intersecting a weak interface at an angle θ may either deflect along the interface or proceed into the bulk of the material as depicted in FIG. 10A. The condition for the crack to propagate and deflect into the weak interface may be written in energy terms as given by Equation (25).

$$\frac{G^{(i)}}{G^{(b)}} > \frac{G_C^{(i)}}{G_C^{(b)}} \quad (25)$$

Where, $G^{(i)}$ and $G^{(b)}$ denote the energy release rate of the weak interface and the bulk material, respectively, and $G_C^{(i)}$ and $G_C^{(b)}$ denote the critical energy release rates for the interface and the bulk of the material, respectively. $G_C^{(i)}$ and $G_C^{(b)}$ are material properties, which are measured experimentally. These are given by Equations (26A) and (26B) where E'=E for plane stress and E'=E/(1−v²) for plane strain. E and v denote the Young's modulus and Poisson's ratio of the material, respectively. $K_{IC}^{(i)}$ and $K_{IC}^{(b)}$ are the critical stress intensity factors (fracture toughness) of the interface and the bulk of the material, respectively. The incident crack is in mode I and its stress intensity factor is denoted by $K_I$. The inventors only consider pure mode I for the incident crack so that $K_{II}$=0. The associated bulk strain release rate is then given by Equation (27).

$$G_C^{(b)} = \frac{K_{IC}^{(b)2}}{E'} \quad (26A)$$

$$G_C^{(i)} = \frac{K_{IC}^{(i)2}}{E'} \quad (26B)$$

$$G^{(b)} = \frac{K_I^2}{E'} \quad (27)$$

Meanwhile, since this interface is slanted it undergoes mixed mode loading, with stress intensity factors given by Equation (28) such that the associated strain energy release rate is then given by Equation (29). Combining Equations (25), (26A), (26B), (28) and (29) yields the condition for the crack to propagate into the interface which is given by Equation (30).

$$\begin{cases} k_I(\theta) = \frac{1}{4}\left[3\cos\left(\frac{\theta}{2}\right) + \cos\left(\frac{3\theta}{2}\right)\right]K_I \\ k_{II}(\theta) = \frac{1}{4}\left[\sin\left(\frac{\theta}{2}\right) + \sin\left(\frac{3\theta}{2}\right)\right]K_I \end{cases} \quad (28)$$

$$G^{(i)}(\theta) = \frac{k_I^2(\theta) + k_{II}^2(\theta)}{E'} = \frac{K_I^2}{E'}\cos^4\left(\frac{\theta}{2}\right) \quad (29)$$

$$\cos^2\left(\frac{\theta}{2}\right) > \frac{K_{IC}^{(i)}}{K_{IC}^{(b)}} \quad (30)$$

This criterion is illustrated in FIG. 10A where crack deflection can now be achieved if the toughness of the interface is sufficiently low relative to the toughness of the bulk material, and provided that the deflection angle θ is not too large. If the crack indeed propagates along the interface, then the crack enters a mixed mode condition, which will lead to an increase in apparent toughness $K_C$ as given by Equation (31).

$$\frac{K_C}{K_{IC}^{(b)}} = \frac{1}{\cos^2(\theta/2)}\frac{K_{IC}^{(i)}}{K_{IC}^{(b)}} \quad (31)$$

Within the embodiment of the invention presented, these principles are demonstrated by deflecting cracks into weak interfaces engraved in glass. The fracture specimens consisted of an initial crack and an engraved plane of equi-spaced defects ahead of the crack tip, tailored to have half the toughness of bulk glass. The interface was positioned at different angles θ from the initial crack plane. In the experiments, the interface could deflect the crack up to an angle of θ=60° as depicted in FIG. 10C. At θ=70° and above, the crack propagated straight into the bulk of the material. As predicted by the model, the apparent toughness increased with higher angles, from half of the toughness of glass at θ=0° up to the toughness of glass at θ=90°, per FIG. 10C.

3.3 Model Composite Material with Viscous Interfaces—No Defect

Having established a method of forming weak interfaces within the body of a material according to embodiments of the invention, the inventors then proceeded to confirm experimentally that strain rate hardening is by itself sufficient to spread deformations over large volumes and to promote energy dissipation. To this end, they fabricated a model material with a nacre-like microstructure made of millimeter size glass tablets held together by a highly viscous polydimethylsiloxane (PDMS) at the interface, namely an ultrahighmolecular-weight PDMS (UHMW-PDMS). This PDMS is composed of very long polymeric chains which are not cross-linked, so the material behaves like a fluid with very high viscosity. PDMS also has a good chemical affinity with glass, ensuring good adhesion between the PDMS film and the glass tablets. The viscosity of the UHMW-PDMS was measured using a parallel plate rheometer under a controlled shear rate with a frequency sweep of 0.02-100 Hz, corresponding to a range of shear rates of $3\times10^{-4} \leq \dot{\gamma} \leq 10^{-1}(s^{-1})$. The radius of the parallel plates was 12.5 mm and the gap between the plates was set to 1 mm for all tests which were performed at a temperature of 25° C.

Figure 11A:
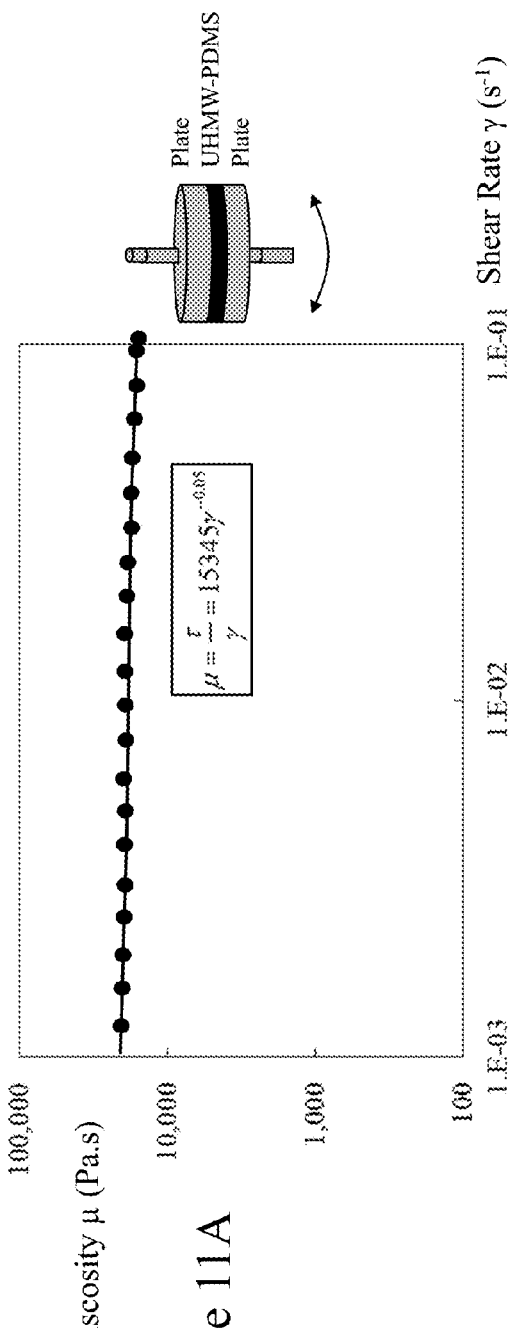
FIGS. 11A to 11C depict viscosity as a function of shear rate at room temperature UHMW-PDMS employed for biomimetic materials according to embodiments of the invention.
Figure 11C:
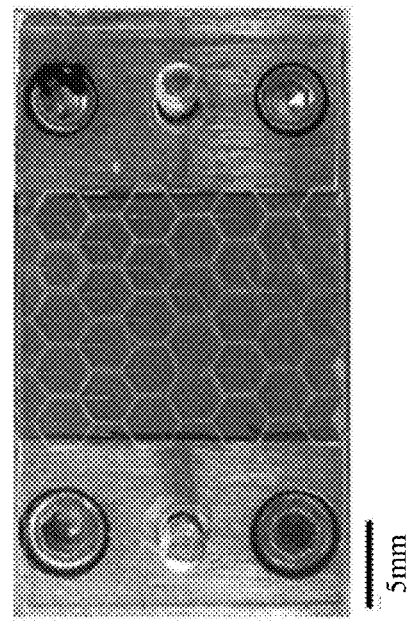
Figure 11B:
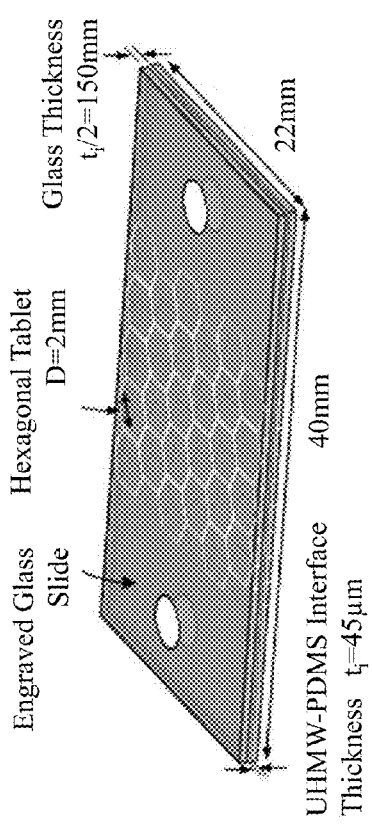

The results of the rheological tests are depicted in FIG. 11A and show a viscosity in the 20 kPa range, with a slight decrease in viscosity with shear rate ("shear thinning" behavior). The viscosity $\mu=\tau/\dot{\gamma}$ was fitted with a power law model over the strain rates examined ($10^{-3} \leq \dot{\gamma} \leq 10^{-1}(s^{-1})$), yielding $\mu=15345 \cdot \dot{\gamma}^{-0.05}$ ($R^2=0.4$). The parameters for the constitutive Equation (1) were then K=15,345, m=0, and n=0.95. The uncross-linked PDMS therefore exhibits a quasi-Newtonian behavior over this range of strain rates. The hard tablets were fabricated by cutting hexagonal patterns in thin borosilicate glass slides (22×40 mm; 150 μm thick) with a three-dimensional laser engraver, following the methods described by the inventors. Periodic patterns of hexagons with a size D=2 mm were engraved across the width of the glass slide, as shown in FIG. 11B. The assembly of the model material started by applying a small amount of PDMS mixed with microscopic glass beads 30-50 μm diameter (99 wt. % PDMS and 1 wt. % beads) between two engraved glass slides. The assembly was pressed together, and the glass beads in the PDMS ensured that the interface was of uniform and well-controlled thickness. Independent experiments (not presented here) showed that 1 wt. % of glass beads were sufficiently small not to affect the mechanical response of the interface. The engraving and the assembly of the two glass slides was designed to generate overlap between the hexagons of the upper and lower slides, generating a staggered arrangement for the hexagonal plates. This offset being visible in FIG. 11C of an actual assembled sample. Two pinholes were finally cut with the laser at the ends of the sample, in order to transmit tensile forces with the miniature tensile testing machine. The final sample (FIG. 11C) therefore consisted of a two-layer nacre-like structure with stiff hexagonal glass tablets of thickness $t_t/2=150$ μm held together by a $t_i=45\pm3$ μm thick layer of UHMW-PDMS. The corresponding tablet concentration was ϕ=0.87.

Figures 12A, 12B, 12C:
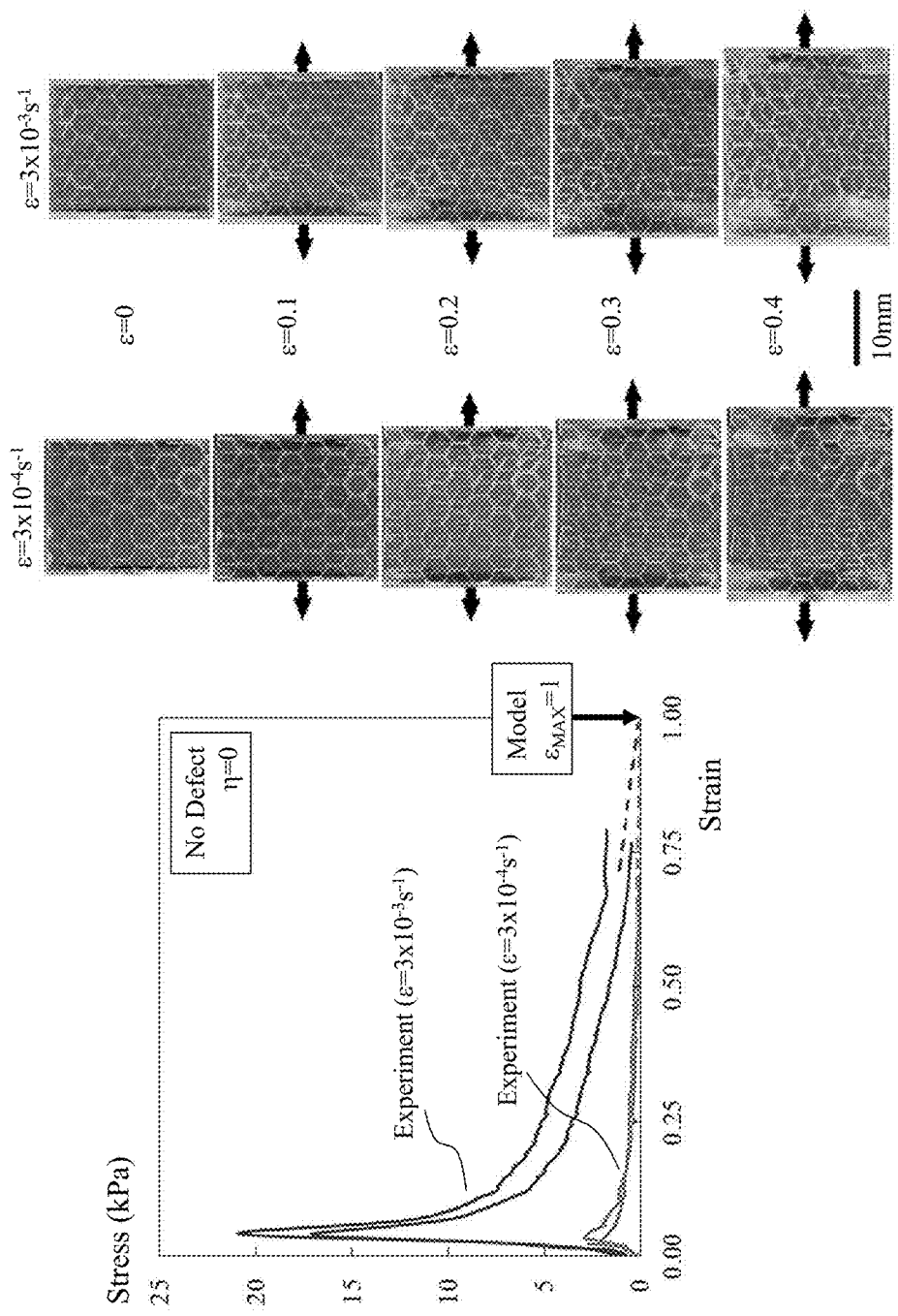
FIGS. 12A to 12C depict stress-strain curves of a staggered composite with no defects for biomimetic materials according to embodiments of the invention and images of samples at increasing strain.

The nacre-like glass-UHMW-PDMS composite samples were tested under tension using a miniature loading stage equipped with a linear variable differential transformer and a 0.2N load cell. During the test, high-resolution images of the samples were captured at regular time intervals. Samples were tested at a "slow" strain rate of $\dot{\varepsilon}=3\times10^{-4}$ s$^{-1}$ and a faster strain rate of $\dot{\varepsilon}=3\times10^{-3}$ s$^{-1}$. FIG. 12A depicts the set of tensile stress-strain curves obtained at these two different strain rates for no defects, η=0. The curves initially show a rapid rise in stress with strain up to a peak stress, followed by a gradual decrease to zero stress at $\varepsilon_{MAX}\approx1$, which we considered to be the failure point for the material. The initial sharp increase in the stress was attributed to a possible transient response of the interface and to the PDMS flowing within the junctions between the tablets (gaps between the hexagonal tablets belonging to the same layer). As the tablets separated, the junctions played a lesser role and the response was dominated by the interfaces. Stresses were higher for the samples tested at higher strain rates because the response of the composite is governed by the viscous response of the interface. The overall shape of the curves was however the same at the slow and fast strain rates. The stress-softening behavior observed on the stress-strain curves following the transient peak stress is consistent with the model (FIG. 5, viscous fluid case) and can be explained by geometric softening. However, despite this continuous decrease in stress, snapshots of deforming samples at two different strain rates, FIGS. 12B and 12C, clearly show that the sliding of the tablets spread over the entire sample, ensuring a quasi-uniform distribution of deformation within the material. To compare the experimental results with the model, the inventors used Equation (24), since the interface is a Newtonian fluid. Equation (24) predicts $\varepsilon_{MAX}=1$ since $\eta=0$ (defect-free material), in agreement with the experiment. Moreover, the amount of spreading in the material does not appear to change with strain rate, which is also consistent with the predictions of the model.

The inventors also verified that in these experiments the glass tablets can be considered rigid compared to the PDMS interfaces. The maximum stress experienced by the composite material is 20 kPa (FIG. 12A). Considering that the tensile stress in the tablets is roughly twice the tensile stress in the tablets (FIG. 4), the maximum stress experienced by the glass tablets was approximately 40 kPa. Considering the modulus of glass is approximately 60 GPa, the maximum strain in the glass tablets is approximately $7 \times 10^{-7}$. Now looking at the interfaces, using Equation (6) with $\varepsilon \approx 0.05$ (tensile strain at the peak stress), $\phi=0.87$, and $\rho \approx 13$ from the geometry of the hexagon gives $\gamma \approx 4$, which are very large strains since the PDMS essentially behaves like a fluid at the interface. The deformations at the interfaces are therefore seven orders of magnitude larger than in the glass tablets, so that the tablets can be assumed to be rigid compared to the interfaces.

3.4 Model Composite Material with Viscous Interfaces— No Defect

Next the inventors investigated the tensile behavior of a staggered composite governed by a viscous response and containing a large defect of controlled size and geometry. The type of sample we used was the same as above, but now the inventors introduced a large defect by removing one tablet from the top layer, see FIGS. 13B and 13C. These samples were tested in tension using exactly the same procedure as above in Section 3.2. The corresponding stress-strain curves had shapes similar to the sample with no defect, but the strength was slightly less (because of the stress concentration at the defect) and the strain at failure was significantly lower (because of the strain concentration at the defect).

Imaging of the deforming sample depicted in FIGS. 13B and 13C showed a larger strain in the area of the defect, but also showed that large strains were not confined to the defect region, but instead spread throughout the entire sample. This experiment confirmed that strain rate hardening can lead to large deformations even in the presence of a large defect. This behavior was observed at both the slow and fast loading rates, confirming that the evolution of strain around and away from the defect is a rate-independent process. Referring to FIG. 12, the intact sample tested here contained seven overlap regions across the width. After removing the hexagon there are only six overlap regions across the width in the defect region, corresponding to a defect severity of $\eta=(7-6)/7=0.14$. With the value n=0.95 from the parallel plate experiment, Equation (24) predicts $\varepsilon_{MAX}=0.49$. Referring to FIG. 6, the number of unit cells along the RVE is N. As discussed above, N>>1 for actual materials where the microstructure size is much smaller than the size of the component, but this condition does not apply to our model material where N=10. In this case, the contribution of the defect region to the total elongation of the sample is given by Equation (25) where u is the elongation of each unit cell in the bulk of the material and $u_0$ is the elongation at the defect region. Using Equation (25) together with Equations (10) and (12) gives the macroscopic strain in the material through Equation (26). Accordingly, the macroscopic strain at failure, $\varepsilon_{TMAX}$ was computer using Equation (26) with $\varepsilon=\varepsilon_{MAX}$ and $\varepsilon_0=1$ thereby yielding Equation (27).

$$u_T = Nu + u_0 \quad (25)$$

$$\varepsilon_T = \frac{\varepsilon}{1+(1-\eta)/N} + \frac{\varepsilon_0}{1+N/(1-\eta)} \quad (26)$$

$$\varepsilon_{TMAX} = \frac{\varepsilon_{MAX}}{1+(1-\eta)/N} + \frac{1}{1+N/(1-\eta)} \quad (27)$$

Using $\varepsilon_{MAX}=0.49$, $\eta=0.14$, and N=10 gives $\varepsilon_{TMAX}=0.52$. This predicted value is very close to the strain at failure measured experimentally, FIG. 13A. The assumption that the PDMS behaves as a Newtonian fluid (i.e. constant viscosity and n=1) leads to very similar results. Using Equations (26) and (27) predict $\varepsilon_{TMAX}=0.53$, which differs from the result above by only 2%. The slight shear thinning behavior of the PDMS the inventors employed at the interface had little impact on the strain at failure for the composite. The combination of model and experiments therefore confirms that strain rate hardening is a powerful mechanism to minimize the impact of defects as well as to increase the strain at failure and energy dissipation. No particular rheology is required at the interface, and the strains at failure were rate-independent.

4. Biomimetic Segmented Armour

Figure 14:
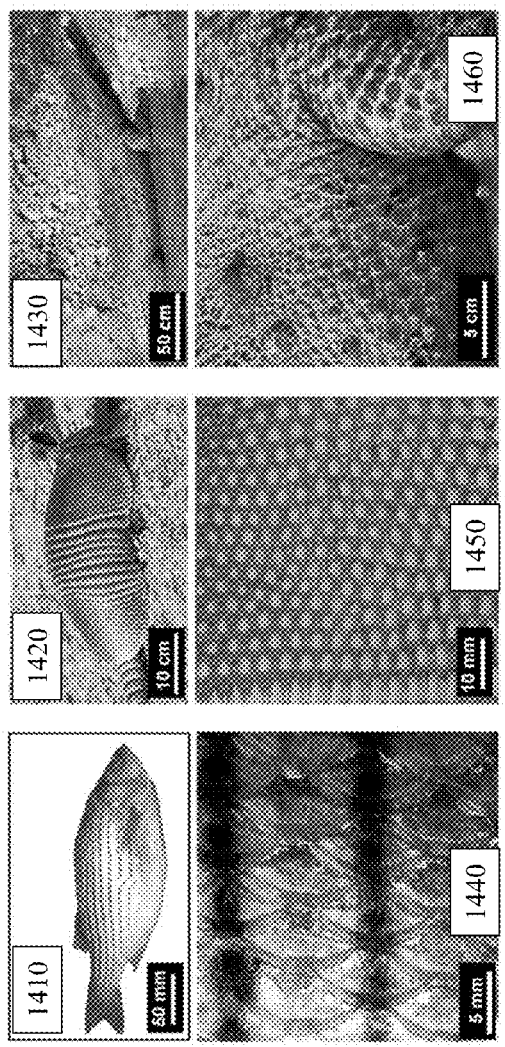
FIG. 14 depicts examples of segmented natural armour.

As a result of the 'evolutionary arms race' between predators and prey, many animals have developed protective systems with outstanding properties. The structure and mechanics of these natural armours have attracted an increasing amount of attention from research communities, in search of inspiration for new protective systems and materials. Nature has developed different strategies for armoured protection against predators. While some protective systems are entirely rigid (e.g., mollusk shells) or with only a few degrees of freedom (e.g., chitons), a large number of animals use segmented flexible armours in which the skin is covered or embedded with hard plates of finite size (typically at least an order of magnitude smaller than the size of the animal). Examples of such segmented flexible armours include scale of fish, snakes, etc. as depicted in first and fourth images 1410 and 1440 in FIG. 14, and osteoderms (bony plates embedded in the skin) in armadillo, crocodiles, etc. as depicted in second and third images 1420 and 1430 together with fifth and sixth images 1450 and 1460 in FIG. 14. Compared to rigid protective shells, segmented armours allow for much greater flexibility of movement, and are therefore commonly found in animal species with relatively fast locomotion. Within segmented armour, individual hard plates provide resistance to puncture, and prevent the teeth of potential predators from penetrating the soft underlying tissues and vital organs. To fulfil this function, individual segments display highly efficient structures and mechanisms.

Natural armours have probably served as inspiration for personal armours throughout human history. More recently, segmented armour and fish-scale-like armour have been proposed consisting of individual segments made of monolithic or composite material with predefined shape and size, held together by a flexible fabric or enveloped between two high tensile strength layers. However, the interplay of hard protective plates on a soft substrate has received little attention despite mimicking the typical environment of natural animal armour. Accordingly, the inventors have extended the concepts discussed supra in respect of biomimetic materials to flexible biomimetic segmented armour consisting of transparent hexagonal glass plates on a soft substrate.

4.1 Biomimetic Segmented Armour—Overview and Fabrication

The aim of the inventors was to convert natural segmented armours, such as osteoderms and fish scales, into a synthetic biomimetic segmented armour system. The key attributes selected by the inventors for the biomimetic system consisted of hard protective plates of well-defined geometry, of finite size and arranged in a periodic fashion over a soft substrate several orders of magnitude less stiff than the plates. These attributes generate interesting capabilities such as resistance to puncture, flexural compliance, damage tolerance and "multihit" capabilities.

Figure 15A:
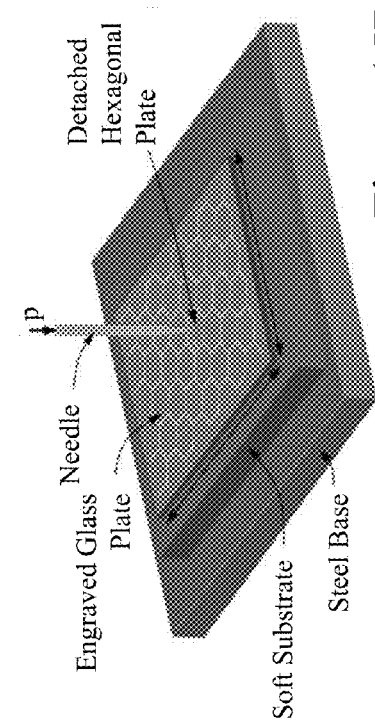
FIGS. 15A and 15B depict a pattern for biomimetic materials according to embodiments of the invention and puncture test configuration.

As previously described, the fabrication technique selected enables the rapid and easy implementation of these attributes with a high level of geometrical control and repeatability. Accordingly, the initial model was based upon 150 μm thick hexagonal borosilicate glass plates as armour segments. The advantages of glass are its hardness and stiffness. Glass is also transparent, a property the inventors exploited here to generate hexagonal patterns by laser engraving but also allowing optical transparent armour to be considered. As depicted in FIG. 15A hexagonal patterns of laser induced microcracks were formed within the glass slide, each line of the pattern consisting of a plane across the thickness of glass and made of hundreds of microcracks 5 μm apart. As presented supra at laser powers above 35 mW, the minimum required to generate defects, result in defects of dimensions as shown of $2a \approx 8$ μm. Increasing the laser output power generated larger cracks, following a linear relationship over the range from 35 mW to 140 mW, after which defect size plateaued with the generated defects being of approximately constant size, about $2a \approx 25$ μm.

Accordingly, following the concept of "stamp holes", the inventors adjusted the strength of the engraved lines by tuning the size and spacing of the defects. The resulting engraved lines were strong enough to prevent their fracture during handling, but weak enough for the hexagonal plates to detach during the puncture test. Hexagonal plates of different sizes were engraved, ranging from an edge length (R) between $0.25 \text{ mm} \leq R \leq 6.00 \text{ mm}$. Once engraved, the plate was placed on a block of soft silicone rubber substrate which simulated soft tissues. The inventors chose a relatively flexible rubber with a modulus of 1 MPa (measured by ball indentation), which is approximately 63,000 times less stiff than the glass plate. In this manner the inventors' synthetic armour system therefore duplicated the main attributes of natural segmented protective system: hard and stiff individual plates of well-controlled shape and size, resting on a soft substrate several orders of magnitude softer than the plate.

4.2. Biomimetic Segmented Armour Puncture Tests

Figure 15B:
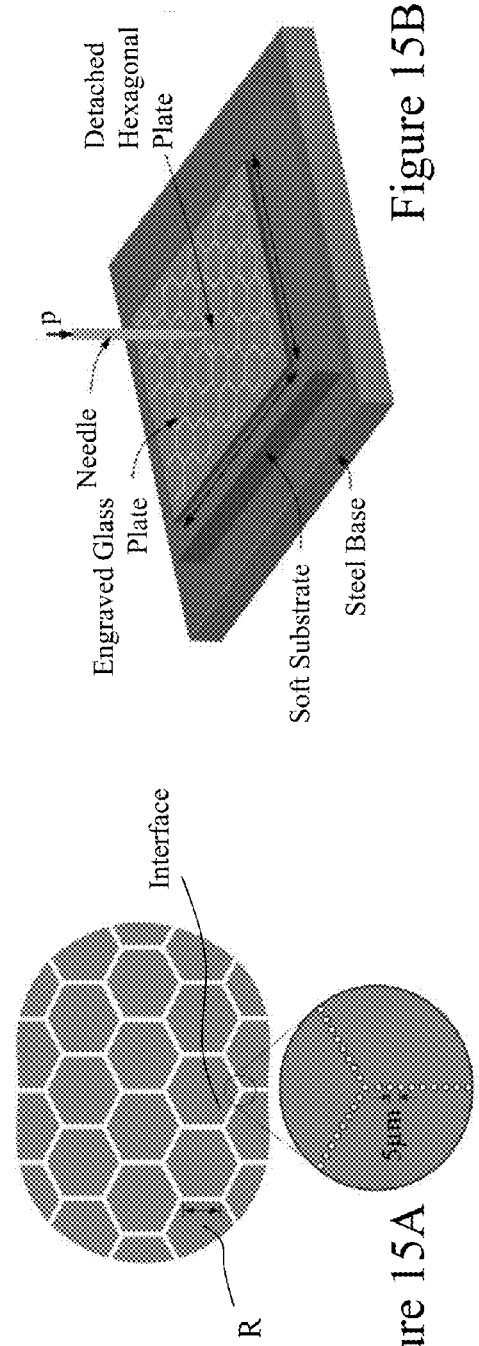

The puncture resistance of the glass layer was assessed with a sharp steel needle with a tip radius of 25 μm that was attached to the crosshead of a miniature loading stage equipped with a linear variable differential transformer and a 110N load cell as depicted in FIG. 15B. The sample was positioned so that the steel needle would contact the plate in the central region of a hexagon before the steel needle was driven into the engraved glass at a rate of $0.005 \text{ mm} \cdot \text{s}^{-1}$ until the needle punctured the glass layer, a sudden event characterized by a sharp drop in force. As a reference, continuous glass (non-engraved) was also tested for puncture resistance under similar loading conditions. The silicon rubber used as a substrate had negligible resistance to sharp puncture.

Figure 16A:
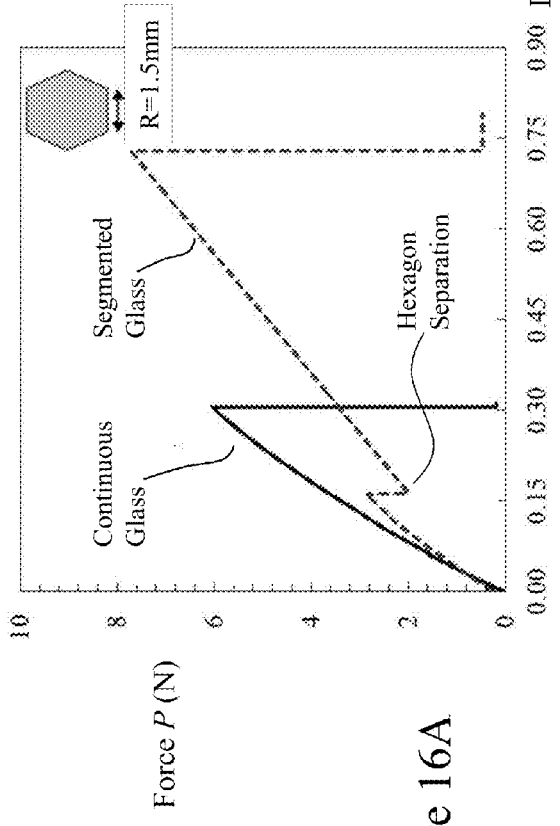
FIGS. 16A to 16E depict puncture force-displacement responses for a continuous glass plate and for segmented glass plate with R=1.5 mm for biomimetic materials according to embodiments of the invention.
Figures 16B, 16C, 16D, 16E:
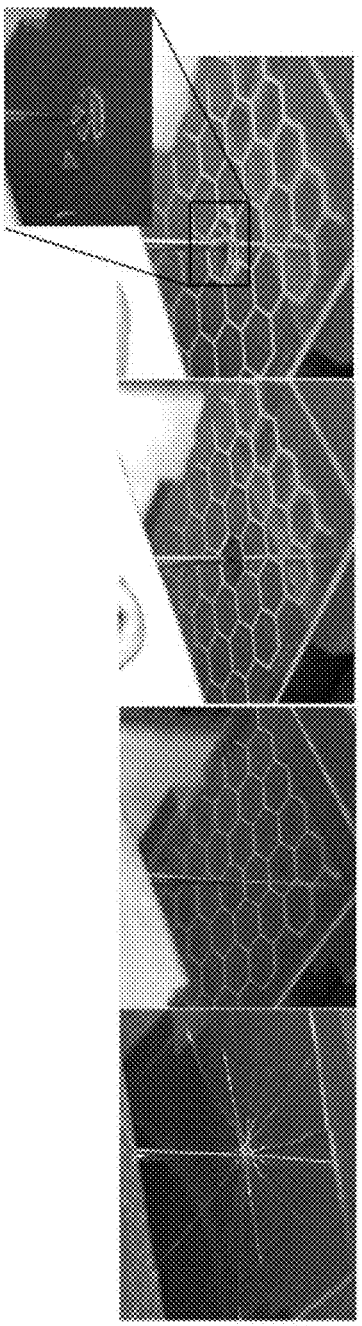

Referring to FIG. 16A there are depicted typical results for the continuous glass plate, and for a segmented glass plate with hexagonal patterns (R=2 mm). The continuous glass slide shows a linear puncture force-displacement behavior up to a critical force of approximately $P_{CRIT}=6N$, where the glass layer fractures abruptly. The glass plate shows several long radial cracks emanating from the tip of the needle, many of them reaching the edge of the plate as depicted in FIG. 16B. This type of crack behavior is a characteristic of a flexural failure of the glass plate. Under the point force imposed by the needle the glass plate bends, and flexural stresses increase. Tensile stresses are maximized just under the needle tip and at the lower face of the plate. In this region of the plate, the flexural stresses consist of radial and hoop tensile stresses, which are equal in magnitude. The hoop is responsible for generating the radial cracks observed in FIG. 16B. As the puncture system consisted of a thin plate on a soft substrate, failure from flexural stresses always prevailed over failure from contact stress. This was confirmed by interrupting a few puncture tests prior to the flexural fracture of the plate. No surface damage (indent, circumferential or conical cracks) was detected at and around the contact region, indicating that for all cases the fracture of the glass occurs from flexural stresses only.

The response to puncture of the segmented glass plate (hexagon size R=2 mm) was quite different from the continuous plate as evident in FIG. 16A. The initial response is identical, with a similar stiffness. At a force of about P=2.5 nm a small drop in force is observed, corresponding to the fracture of the engraved contours of the punctured hexagon. After this drop the hexagon is entirely detached from the rest of the plate, and is being pressed into the substrate by the needle. Further displacement requires increased force, but compared to the initial stage the stiffness is lower because it is "easier" to push an individual hexagon into the substrate compared to the continuous plate. Eventually, the hexagon failed from flexural stress, developing multiple radial cracks. As opposed to the continuous plate, the cracks were all confined within the contour of the hexagonal plates. Interestingly, the critical force required to puncture the individual hexagon ($P_{CRIT}=7.5N$) was higher than that for the continuous glass plate. This sequence being depicted in FIGS. 16C to 16E, respectively.

The reason for this increase in puncture resistance is the result of the interplay between the soft substrate and reduced span. In addition, the work to puncture, measured as the area under the force-displacement puncture curve, was seven times greater for the case of the segmented glass plate. The work required to fracture the glass plate is relatively small, so the increase of work is generated by the deformation of the softer substrate. For the continuous glass plate, the puncture force is distributed over a wide area at the plate-substrate interface, resulting in relatively small stresses and deformation in the substrate. In contrast, once the hexagon detaches from the segmented glass the puncture force is transmitted over a smaller area, with higher stresses transmitted to the substrate, resulting in larger deformations. In addition, the hexagon plate fractures at a higher force compared to continuous glass, further delaying fracture and leading to even more deformations in the substrate. For the case shown in FIG. 16A the displacement at failure is three times larger for the engraved glass compared to the intact glass. Higher force and displacement to failure lead to a much greater work to puncture, which is highly beneficial for impact situations.

Figure 17:
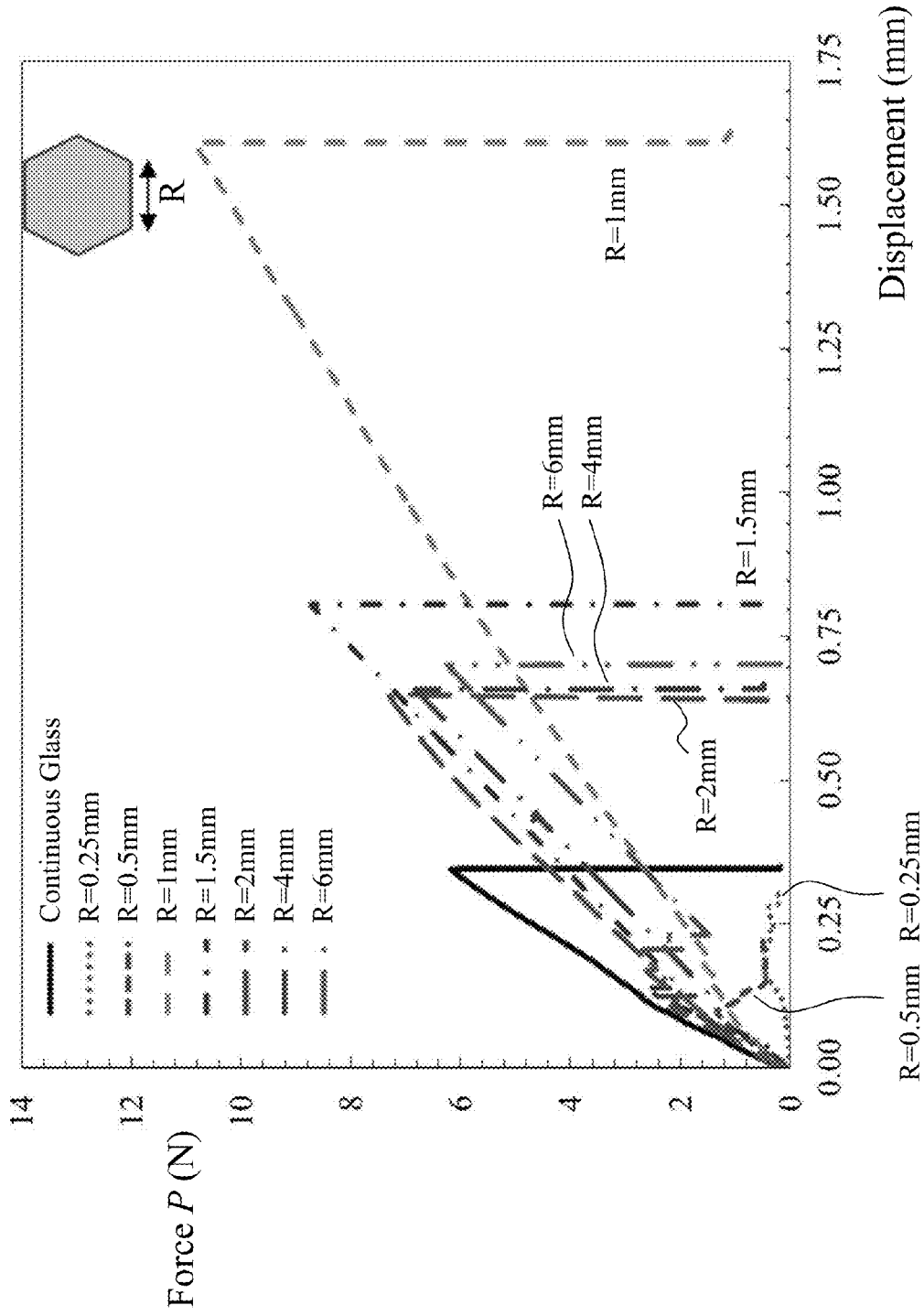
FIG. 17 depicts typical force-displacement responses for continuous glass plate and for segmented glass plates for biomimetic materials according to embodiments of the invention.

Referring to FIG. 17 there are depicted typical puncture force-displacement curves for continuous glass and for the segmented glass with different hexagonal plate sizes ranging from R=0.25 mm to R=6 mm. As expected, the stiffness of the system after the hexagon was detached was lower for the smaller hexagonal plate size. The critical puncture force is of particular interest, and it is shown in FIG. 18A as a function of hexagonal plate size based upon six samples for each size of hexagon. Most of the hexagonal plates failed by flexural cracking, see FIG. 18C. Also plotted in FIG. 18B is the work required to puncture as a function of hexagonal plate size.

The results show that increasing the size of the hexagonal plates reduced the puncture resistance and work required until it reached the resistance of the continuous plate ($P_{CRIT}$=6N, $W_P$=1 mJ), hexagonal plates of size 6 mm and larger essentially behaved like a continuous plate. On the other hand, as the hexagonal size was reduced the critical puncture force and work required were increased up to a maximum of $P_{CRIT}$=9N, $W_P$=7 mJ for R=1 mm. This represents a 70% improvement over the puncture resistance of continuous glass. For hexagonal plates smaller than R=1 mm, another failure mode prevailed: the individual hexagon tilted around the needle and largely lost contact with the substrate (see FIG. 18C). This failure mode resulted in very low puncture force (P<1N) and it is therefore highly detrimental to the performance of the armour. The failure mode transition from the hexagon fracture to hexagon tilting at a size of about R=1 mm is probably governed by an interplay between the tablet size, substrate stiffness, adhesion between plates and substrate, and location of the puncture on the plate.

4.3. Biomimetic Segmented Armour—Modelling Flexural Stress

The inventors' starting hypotheses behind the increase in performance experimentally observed for smaller hexagonal plates were that (i) flexural deformations and stresses dominate in stiff plates on soft substrates and (ii) since smaller plates have a smaller flexural 'span' the flexural stresses are also smaller, and therefore smaller plates can undergo larger puncture forces before failing. To explore this scenario, the soft substrate and the stiff plate were modeled with finite elements wherein the hexagonal plates were approximated as circular plates, in order to make use of the axial symmetry about the line of action of the force. An axisymmetric formulation was used for the elements, with the axis of symmetry of the model corresponding to the axis of the needle as depicted in FIG. 19A. The first model consisted of a continuous plate (i.e. plate of infinite radius) resting on a soft substrate occupying a half-space. The system had a radius of 20 mm and the substrate was 16 mm thick, which we found was sufficiently large to model a continuous plate resting on a soft half-space (FIG. 19A). The plate (modulus $E_p$, Poisson's ratio $v_p$) has thickness t fixed at 150 μm (thickness of the actual glass plate) and was assumed to be bonded on a softer substrate (modulus $E_S$, Poisson's ratio $v_S$).

To investigate the effect of the contrast of properties between the plate and substrate, Poisson's ratios were fixed at $v_p$=$v_S$=0.2 and the contrast $E_p/E_S$ was adjusted. A mesh convergence study ensured that our results were not mesh sensitive. We also checked, using contact elements between the hard plate and the substrate, that the flexural stresses in the hard plate were not sensitive to the friction between the plate and substrate. The interface was therefore modeled as bonded to the substrate to save computational time. The effect of the needle on the plate was modeled as a point force, P, applied along the axis of symmetry (FIG. 19A). No attempt to capture the details of the contact stresses in the model was made as the experiments showed the absence of surface damage. Rather, the focus was on the maximum flexural stress in the plate, which is located on the lower side of the plate underneath the application of the point force (FIG. 19A). The flexural stresses in the plate did not depend on whether the force was transmitted through a sharp contact or through a point force. A point force was therefore chosen to model the needle, in order to save computational time.

Referring to FIG. 19B there are depicted the maximum flexural stress in the plate as a function of stiffness contrast between the plate and substrate. As expected, softer substrates provide less support for the plate, which leads to higher flexural deformations and stresses. In the range $1 < E_p/E_S < 100$ the simulation results corresponded to prior art simulations but for $E_p/E_S > 100$ the results deviated significantly from this prior art prediction. This first model therefore shows that flexural stresses are prominent in stiff plates on soft substrates, and provide a baseline for the case of a continuous plate. It is also interesting to consider the distribution of pressure at the interface plate/substrate for various stiffness contrasts between the plate and substrate (FIG. 19C). For stiff substrates (small $E_p/E_S$), the pressure is concentrated near the point force, while for soft substrate, the pressure is distributed over a much greater distance: the effects of the point force are "felt" over a larger area in the case of softer substrates. This effect has direct implication on the mechanics of finite plates on the soft substrate, and on the performance of segmented armour.

Figure 20A:
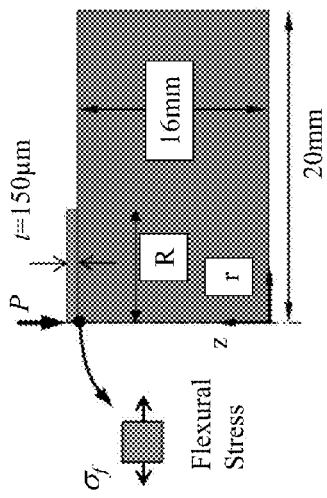
FIGS. 20A and 20B depict finite element model symmetry for a finite plate on a compliant substrate for biomimetic materials according to embodiments of the invention.
Figure 20B:
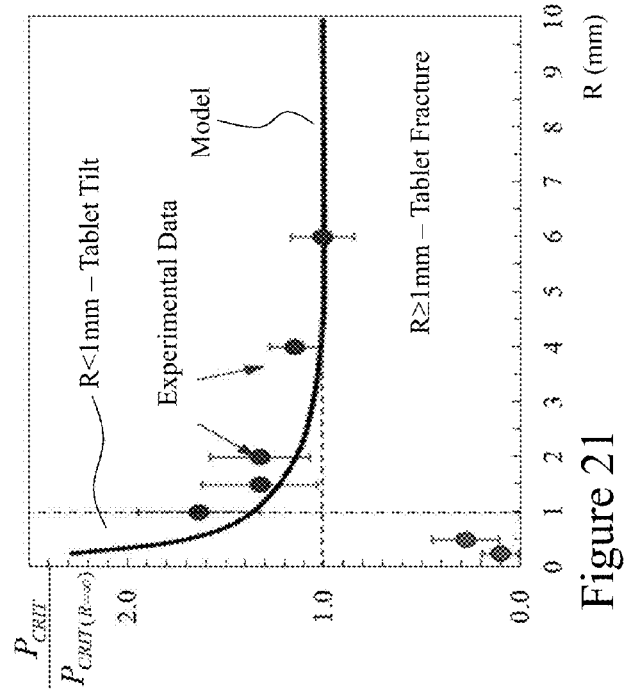

The inventors' second set of models consisted of a circular plate of variable radius R resting on a soft substrate (FIG. 20A). Again, focus was on the maximum flexural stress in the plate, which occurs on the lower face of the plate and underneath the force. FIG. 20B shows the normalized flexural stress as a function of normalized plate radius for four different contrasts between the modulus of the plate and the modulus of the substrate. The overall trend is similar to the behavior of the continuous plate. For a given plate thickness and applied force, P, the flexural stresses are higher for softer substrates (i.e., higher $E_p/E_S$). For all contrasts studied here, the results of the continuous plate are recovered for R/t>40.

Figure 21:
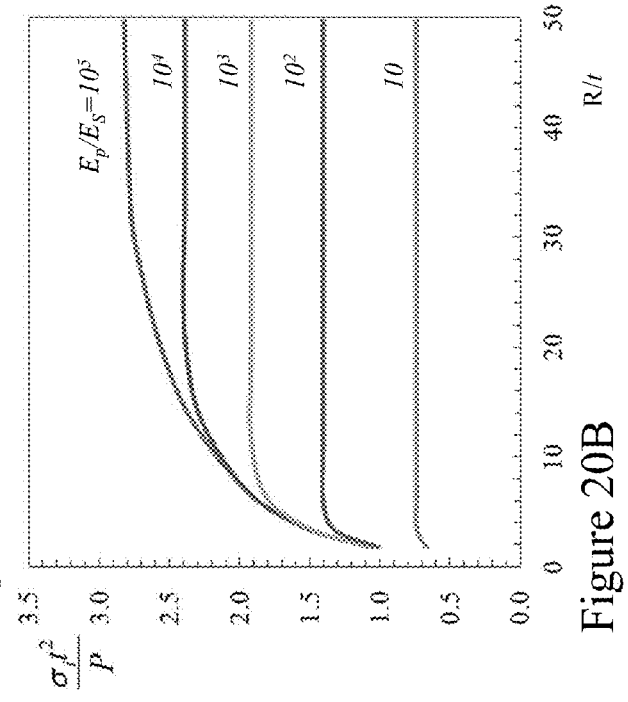
FIG. 21 depicts normalized critical load as a function of plate radius R for biomimetic materials according to embodiments of the invention.

The results also show that in some cases the flexural stresses are significantly reduced for smaller plates. For low contrast, the flexural stresses are barely affected by the size of the plate. This can be explained in light of the results for the continuous plate (FIG. 19C): if the substrate is stiff only a small area around the point force is affected by the point force. As a result, reducing the size of the plate to a disc of finite radius has little effect on the stresses. In contrast, a soft substrate leads to a strong effect of R on the flexural plate. A continuous plate on a very soft substrate "feels" the effects of a point force over a large area. Therefore, reducing the size of the plate has strong effects on the flexural stresses. Another way to interpret this result is by considering that reducing the size of the plate reduces its 'flexural span', in effect reducing bending moments and the flexural stresses. Finally, a last set of simulations was performed with the actual properties for the plate ($E_p$=63 GPa and $v_p$=0.2 for glass) and the substrate ($E_S$=1.3 MPa and $v_S$=0.49 for rubber). Within the modeling the rubber substrate was modelled with incompressible Neo-Hookean model (shear modulus G=0.65 MPa) that gave exactly the same results as depicted in FIG. 21 for the normalized critical load as a function of plate radius R (size of hexagon). Note the failure mode transition from tablet fracture (R>1 mm) to tablet tilt (R<1 mm). Here, it is useful to consider the critical force $P_f$ at which the plate fails in flexion. To examine the effect of plate size, we then considered the ratio $P_{CRIT}/P_{CRIT}(R=+\infty)$, which is the critical force normalized by the critical force for a continuous plate (R=+∞) of the same thickness and made of the same material. This ratio is plotted as function of R in FIG. 21, together with the experimental data.

The model clearly shows that the force required to fracture the hexagonal segment is higher with decreasing segment size, and agrees well with the experiments. This result therefore suggests that the improved performance of the segmented plate is due to the reduced flexural span of the small hexagonal segments. The results of this model (FIGS. 20A and 20B) can also be used as a guideline for the design and dimensioning of stiff and hard protective plates on a soft substrate.

4.4. Biomimetic Segmented Armour—Multiple Hit Performance and Flexibility

Figure 22B:
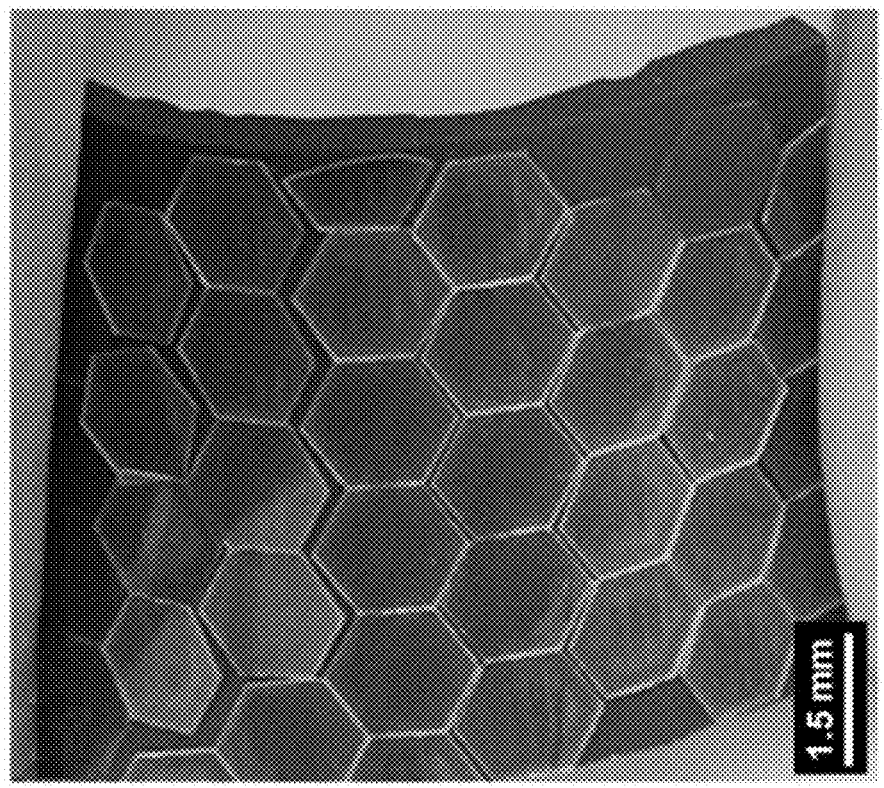
FIGS. 22A and 22B depict "multi-hit" and flexibility for biomimetic materials according to embodiments of the invention.
Figure 22A:
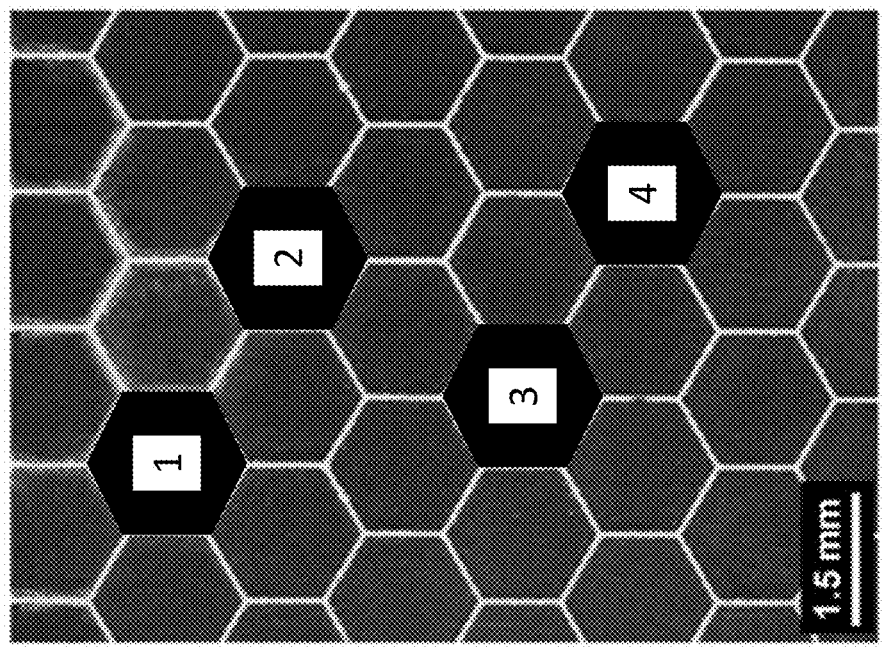

Important for armour is the ability to withstand "multiple hits." Referring to FIG. 22A, there is depicted a segmented plate (R=1.5 mm) which was punctured four times at different locations, with an equally high performance for each puncture. As opposed to a continuous plate, puncturing one hexagon on the segmented plate does not compromise the performance of the rest of the plate, since damage is confined to the hexagon which was punctured. Accordingly, the inventors can demonstrate how biomimetic segmented armour leads to high flexibility without compromising its puncture performance. A segmented glass plate was glued onto a 2 mm thick silicone rubber film with silicone glue. Applying a gentle bending to the composite film detached the hexagonal plates from one another. After this "breakdown" operation, the silicone sheet could be bent by a large extent, as depicted in FIG. 22B, demonstrating the flexibility of the segmented armour. Excessive bending led to the hexagonal plates detaching from the substrate, emphasizing the importance of a strong anchorage of the plates on the substrates for both natural and bio-inspired segmented armour.

Accordingly, it would be evident to one skilled in the art that biomimetic segmented armour according to embodiments of the invention provides a high strength, flexible and, depending upon the material of the individual plates, lightweight armour.

5. Architectured Biomimetic Materials

Within the preceding sections, biomimetic materials have been presented with what the inventors refer to as monolithic elements, namely an array of elements that form a sheet comprising multiple segments that "abut" each other. However, the concepts can be extended further with a range of biomimetic materials, which as illustrated in FIG. 1E, exhibit a toughness which varies with crack length, a/t that exceeds those materials described supra. The inventors refer to these materials as "architectured" materials. In contrast, monolithic brittle materials, such as ceramics for example, display a low toughness of constant value which does not change with the crack length, a/t. However, biomimetic architectured materials exhibit a toughness that varies with crack length, a/t.

Figure 23B:
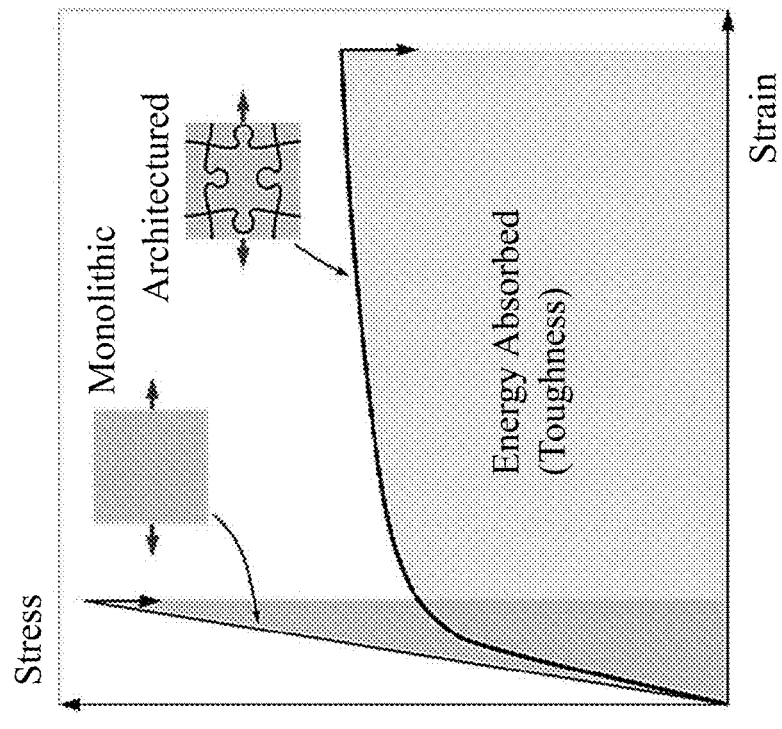
FIGS. 23A and 23B depict the generalized concept of using weaker interfaces and architectures to generate toughness and large deformation/energy absorption.
Figure 23A:
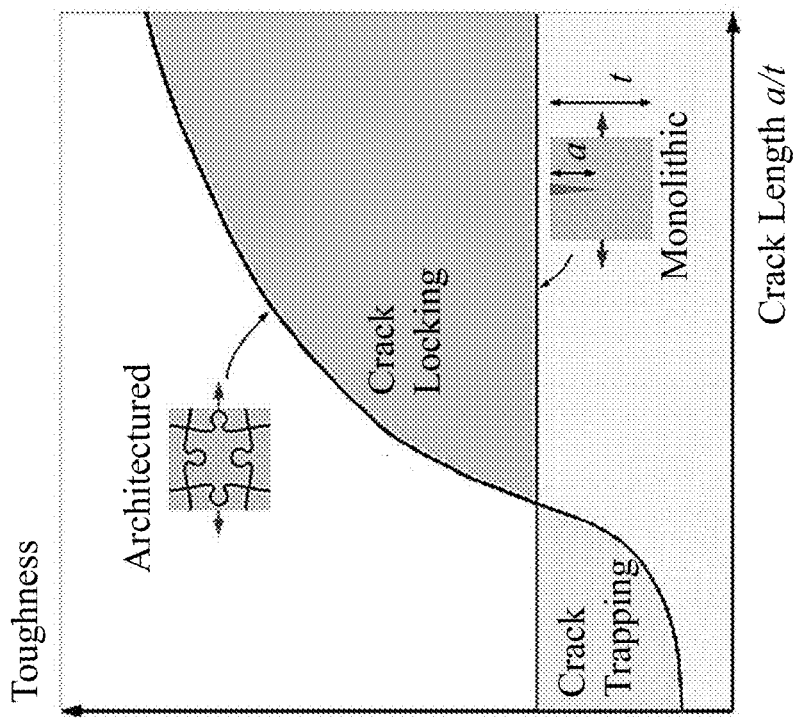

Based upon the analysis of natural materials, the inventors have established three elements to engineering tough, deformable material structures using fundamentally brittle materials. These three elements to overcoming brittleness are (1) stiff and hard building blocks delimited by (2) weaker interfaces arranged in (3) specific architectures. As a result, initial crack propagation is induced along weak interfaces and around the building blocks, requiring little energy. On propagation of the crack, a/t increases, see FIG. 23A, and cracks are eventually channeled into configurations where additional mechanisms impede their further propagation, effectively raising toughness, and trapping cracks into stable configurations. The ability of stabilizing cracks is important for damage and flaw tolerance, reliability and durability. This type of material can also be described as building blocks with well-defined shapes and bonded by weaker interfaces, and being a synthetic "architectured material." If the interfaces can sustain large deformations and dissipate energy, quasi-ductile behaviours may even be achieved in tension as observed in nacre and bone and, as depicted in FIG. 23B, these synthetic "biomimetic architectured materials" exhibit a non-linear strain-stress curve rather than the linear stress-strain profile of hard-brittle materials. In the deformation process, the interfaces play a central role, as they must absorb energy over large deformations.

According to an embodiment of the invention, these three elements for turning glass into a tough and deformable material are implemented by generating weak interfaces within the bulk of glass using three-dimensional (3D) laser engraving and infiltrating these interfaces with polyurethane such that the glass itself forms the stiff and hard building blocks delimited by these weaker interfaces. The specific architectures are defined through the 3D laser engraving sequence. Accordingly, these weak interfaces channel a crack towards toughening configurations, which impede its further propagation. Embodiments of the invention have demonstrated architectured glass that is 200 times tougher than standard non-engraved glass. Standard non-engraved glass, referred to as bulk glass within this specification, is itself not devoid of the surface defects typical to glass exposed to air.

5.1 Channeling Cracks into Toughening Configurations

Figure 24A:
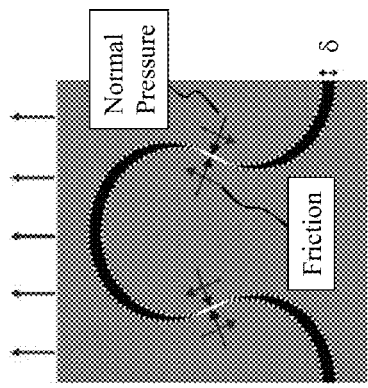
FIG. 24A depicts a jigsaw-like interface engraved in front of a main crack according to an embodiment of the invention.
Figure 24B:
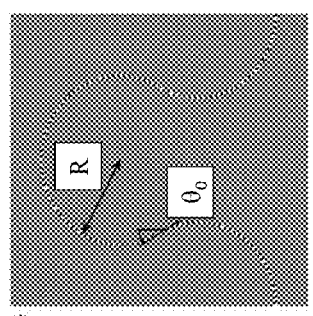
FIG. 24B depicts the basic geometrical motif of the jigsaw-like interface according to an embodiment of the invention characterized by the radius R, and the locking angle $\theta_0$.
Figure 24C:
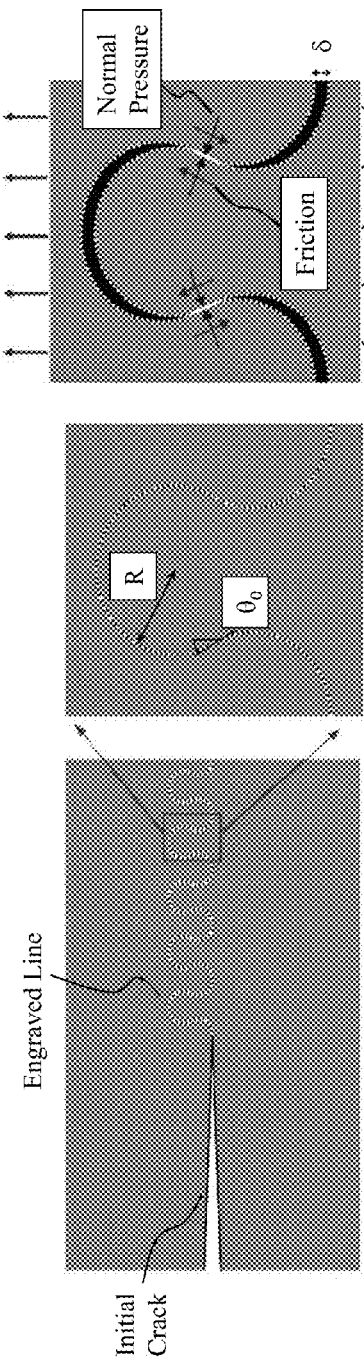
FIG. 24C depicts graphically how crack propagation evolves with the tab being pulled out by a distance $\delta$ and normal pressures and frictional tractions develop.

The ability to guide cracks within glass can be exploited to channel cracks into configurations where propagation becomes more difficult, which is the strategy observed in natural materials such as enamel and nacre. Accordingly, the inventors engraved a weak interface with jigsaw-like features ahead of an incident crack. This intricate line, reminiscent of sutures in some natural materials, consists of a periodic repetition of tabs with round features to limit stress concentrations as depicted in FIG. 24A. Arcs of circle (radius R) interpenetrated and formed re-entrant locking features with locking angle $\theta_0$ as depicted in FIG. 24B. By tuning the laser power (110 mW) and the spacing between the defects (see Methods section), the inventors ensured that the crack propagated through the engraved interfaces. This initial propagation, while relatively easy, revealed a second line of mechanism. As the tabs are pulled apart, they progressively interlock due to the design of the tabs and an increasing amount of traction is necessary to overcome the normal contact forces and friction as depicted in FIG. 24C.

Figure 24D:
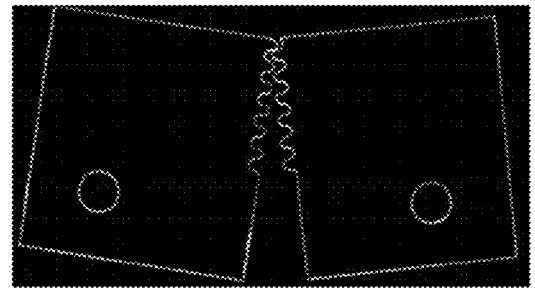
FIGS. 24D and 24E depict a glass facture sample at rest and after the test respectively.
Figure 24E:
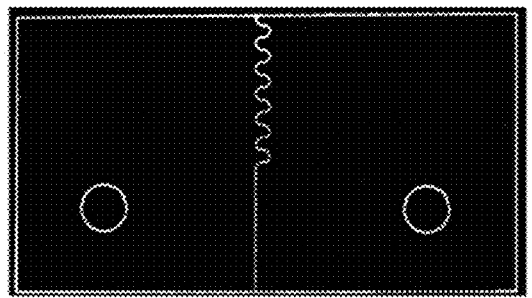
Figure 25:
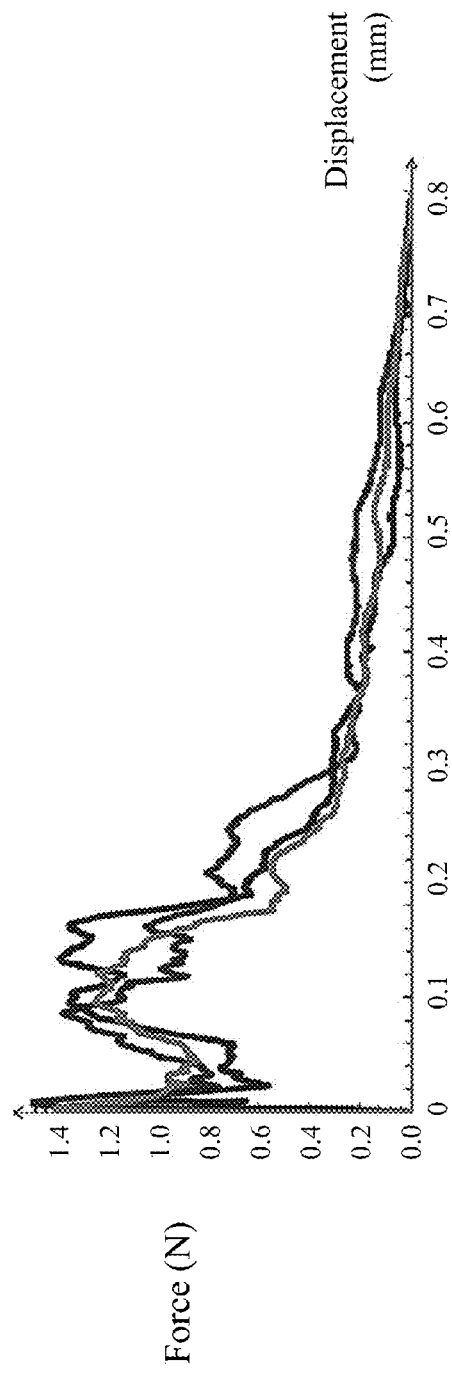
FIG. 25 depicts the force-displacement curves for the jigsaw-like interface showing stable crack propagation.
Figure 26:
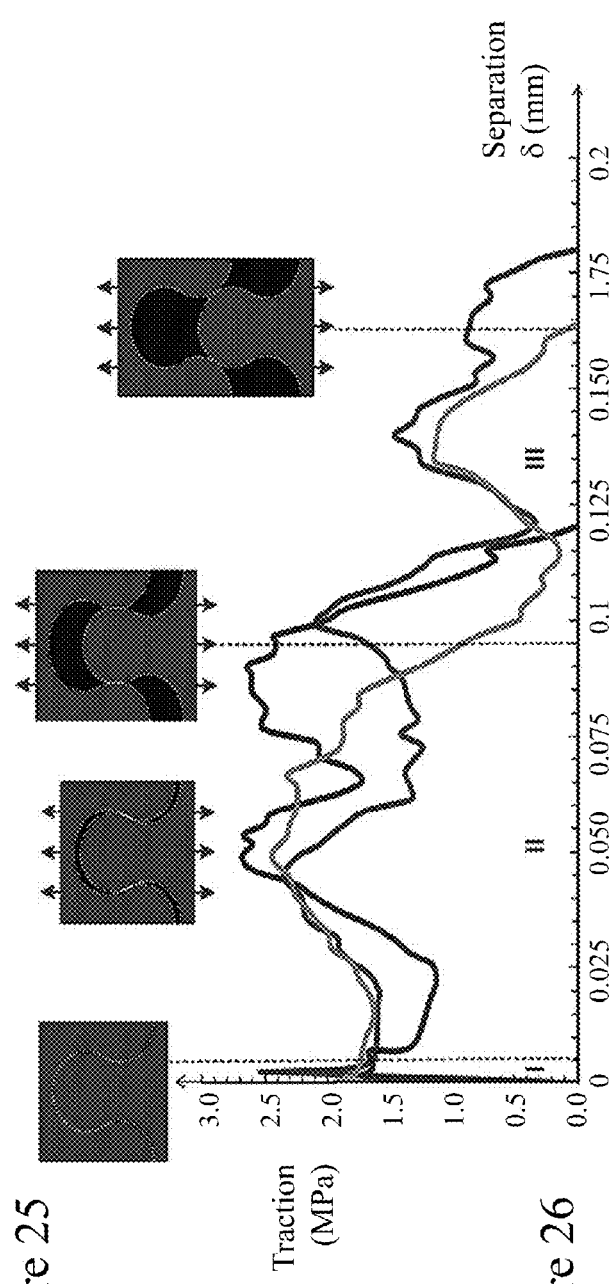
FIG. 26 depicts the traction-separation curves for the jigsaw-like interface derived from the force-displacement curves of FIG. 4F.

FIG. 24D depicts such an implemented jigsaw-like interface ahead of a crack in a glass sample with R=0.5 mm and $\theta_0=5°$. During testing, crack propagation was very stable, and dominated by the pullout of the jigsaw tabs as depicted in FIG. 24E. The corresponding force-opening curve as depicted in FIG. 25 exhibits a bell-shape behaviour, characteristic of stable crack propagation in tough materials. The inventors then used an integration method to obtain the traction-separation curve of the interface from the force-opening curve (see Methods section). The resulting typical traction-separation curves are depicted in FIG. 26 wherein the initial response (stage I) is linear elastic up to about 2 MPa, at which point the interface fails in a brittle fashion as depicted by a sudden drop.

The traction increases again but at a lower slope (stage II), corresponding to the progressive pullout and interlocking of the jigsaw features. When the traction reaches its maximum (2.5 MPa), the contact pressures are perpendicular to the pullout direction and therefore do not contribute to pullout resistance. There is still, however, a large resistance to pull generated by friction, so that the locking tabs still provide a decreasing but non-negligible traction (stage III). The traction finally vanishes when the two tabs are completely pulled apart, at a separation distance of about 0.15 mm.

Figures 27A, 27B, 27C:
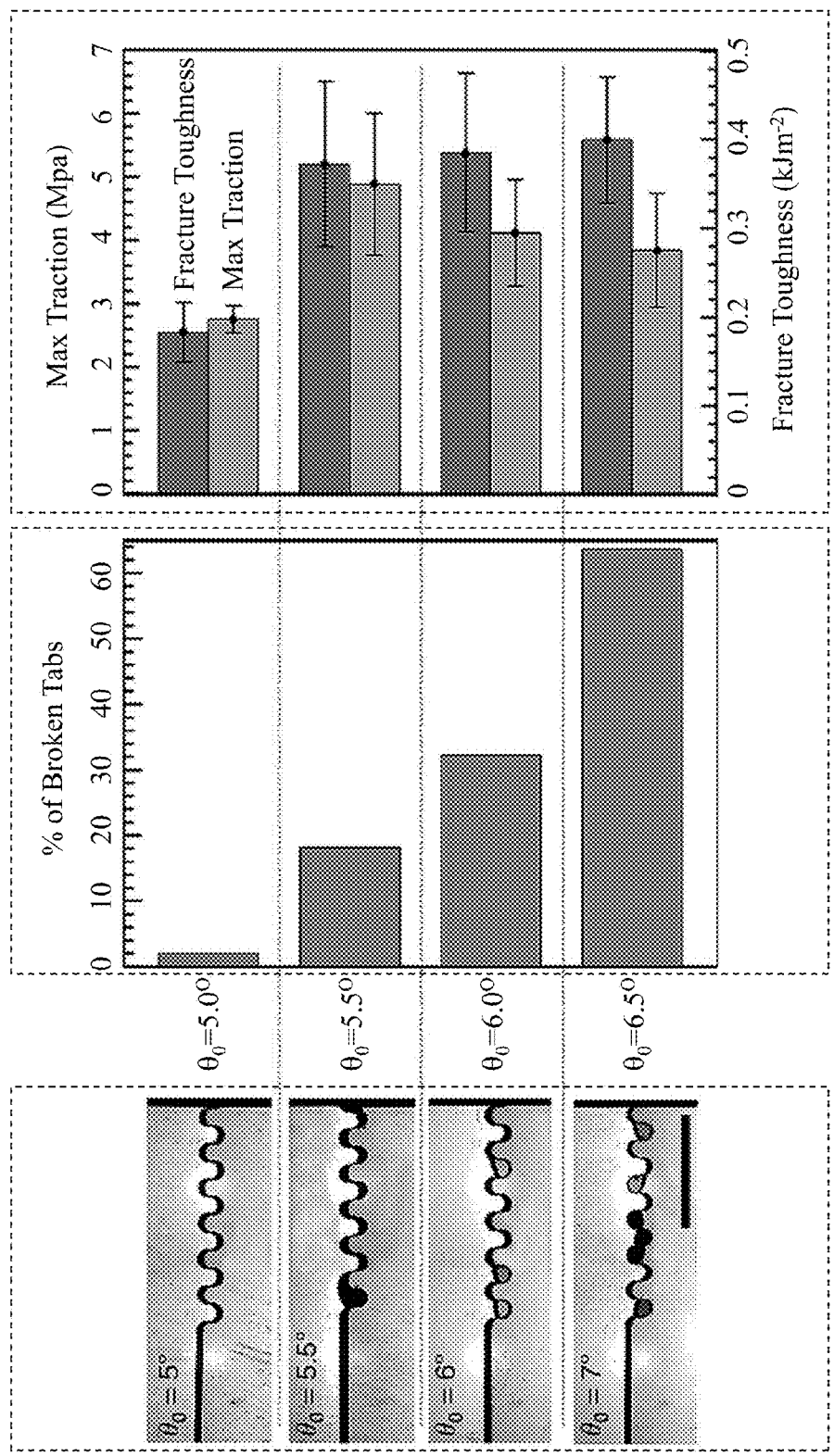
FIGS. 27A to 27C depict the results of tuning the locking angle for optimization of the material by improving its toughness amplification and strength with test samples exploiting embodiments of the invention.

The inventors then computed the toughness of the interface, which is given by the area under the traction-separation curve which, in this case, represents the energy dissipated by friction over the unit area of the crack. In this case, nonlinear dissipative mechanisms such as friction play an important role in generating toughness, and therefore the toughness measured corresponds to $J_{IC}$, a commonly used measure of toughness in nonlinear fracture mechanics. If the material is linear elastic, then $J_{IC}$ is equal to the strain energy release rate. The area under the traction-separation curve yielded a toughness of 200±17 Jm$^{-2}$ for a locking angle of $\theta_0$=5°. For comparison, intact glass has a toughness of only about 3 Jm$^{-2}$. The toughness of the engraved glass can be even further increased by increasing the locking angle as depicted in FIGS. 27A to 27C, where increasing $\theta_0$ from 5° to 7° initially increased the toughness and strength of the interface, and the highest toughness produced was 360±17 Jm$^{-2}$ at a locking angle of $\theta_0$=5.5°. This material is more than 100 times tougher than intact glass, an unprecedented amplification of toughness for this type of material. Beyond $\theta_0$=5.5°, the toughness decreases because of excessive damage to the glass tabs, as shown in FIGS. 27A and 27B.

5.2 Engraved Glass Infiltrated with Polyurethane

Within many natural material systems, organic materials form ligaments at the interfaces of natural materials. These act as a "soft cushion" reducing stress severity and holding elements together. The inventors have established an equivalent for these ligaments within the glass architectured interfaces through infiltration of the interfaces with a low-viscosity polyurethane material. The inventors measured the cohesive law of the polyurethane on a straight interface, depicted in FIG. 28A as first curve 2810, peaking at a separation of approximately 0.03 mm and maximum traction of approximately 7 MPa, corresponding to a fracture toughness of 200±17 Jm$^{-2}$. The inventors then measured the cohesive response of the engraved glass samples infiltrated with polyurethane, curve 2820 in FIG. 28A. The fracture toughness of the infiltrated samples is 600±110 Jm$^{-2}$, which is 200 times the toughness of the intact glass, approximately 1.6 times the toughness of the non-infiltrated engraved glass and three times the toughness of polyurethane on the straight interface.

Figure 28B:
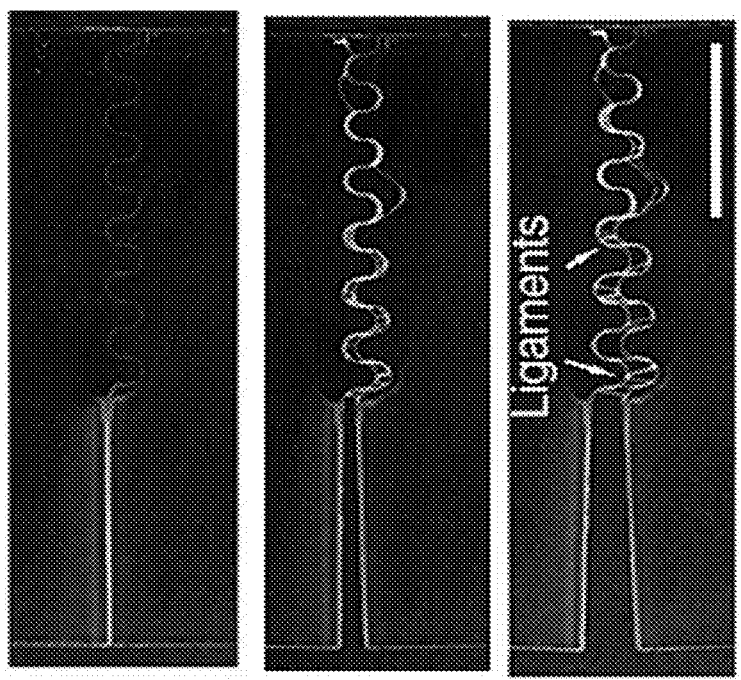
FIG. 28B depicts progressive opening of an engraved jigsaw-like interface infiltrated with polyurethane according to an embodiment of the invention and the ligament action of the polyurethane.
Figure 28A:
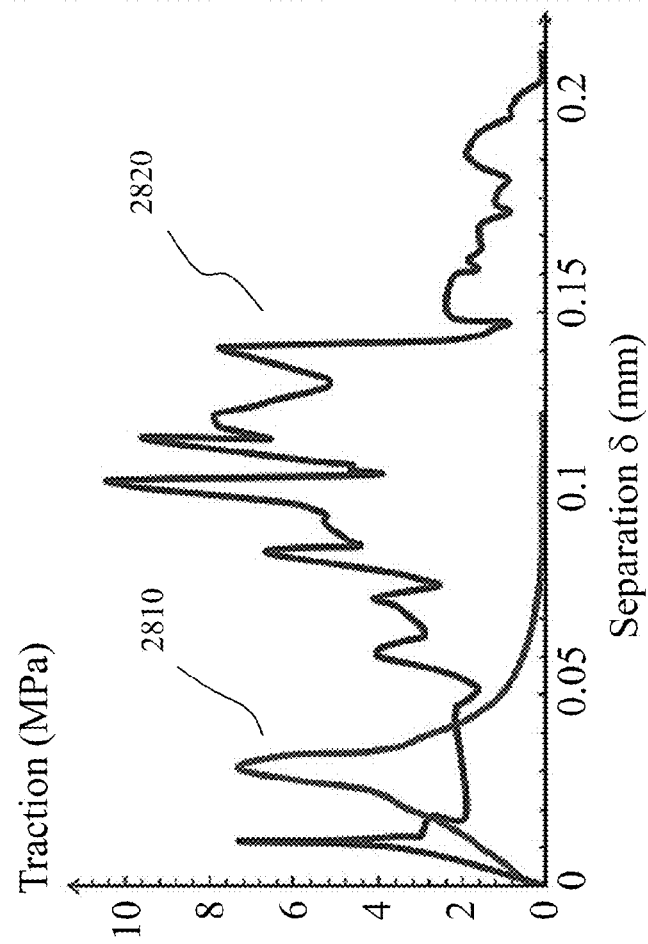
FIG. 28A depicts traction-separation curves for straight and engraved jigsaw-like interfaces, infiltrated with polyurethane according to embodiments of the invention.

Cross-linked polyurethane is an elastomer, which provides cohesive strength to the material over large opening distances, by the formation of ligaments reminiscent of the ligaments formed by organic materials at the interfaces of natural materials as evident from the images in FIG. 28B. The polyurethane adhesive finally serves as a "soft cushion" that reduces the severity of stresses at the contact region between the neighbouring tabs. Accordingly, the infiltrated architectured interfaces could therefore operate at an increased optimum angle, increased from 5.5° for the non-infiltrated interfaces to 7° for the interfaces infiltrated with polyurethane. This leads to a tensile strength of approximately 10 MPa. The inventors also established that the polymeric material should have properties commensurate with the requirement to form ligaments. For example, polydimethylsiloxane (PDMS), whilst an elastomeric polymer, is weakly bonding to the glass engraved surfaces and did not improve the performance of the material significantly. On the other hand, cyanoacrylate, whilst strong, has low elasticity and therefore, the crack did not follow the infiltrated interfaces, leading to a catastrophic failure.

5.3 Performance in Uniaxial Tension

The interfaces and the locking mechanisms according to the embodiments of the invention described above can be repeated periodically within the bulk of a material, e.g., glass, delaying localization and dissipating energy over large volumes. FIGS. 29A and 29B show a tensile glass sample with five jigsaw-like interfaces (R=0.5 mm, $\theta_0$=7°, spacing=1.75 mm) disposed sequentially along the central portion of a glass test sample. In each of FIGS. 29A and 29B, respectively, the left-hand image is the sample prior to testing and the right-hand image the sample after testing, wherein eventually every jigsaw feature is pulled out but as evident from the corresponding tensile stress-strain curves in FIG. 30, the stress kept increasing with deformation with small fluctuations in load associated with dry friction. Within FIG. 30, first curve 3040 depicts a typical result for an engraved glass sample in which transitions 3050 can be observed as weak interfaces break. In contrast, second curve 3030 is for the engraved glass infiltrated with polyurethane where transitions 3050 are absent and the maximum stress reaches approximately 8.5 MPa versus approximately 3.5 MPa for the material without infiltration.

For the case of non-infiltrated interfaces, the sudden drops denoted by transitions 3050 in stress correspond to an interface failing, followed by a rise in the stress due to the progressive locking mechanism. This locking is strong enough to raise the stress to a level sufficient to fail other interfaces in the material, thus propagating the pullout process over large volumes. Eventually, as depicted in FIGS. 29A and 29B, every jigsaw feature was pulled out and the stress kept increasing with deformation with small fluctuations in load associated with dry friction. This failure mode provides many of the desired features such as delocalization of deformations over large volumes, ductile-like deformation and damage tolerance. When the stress reached the maximum traction at one of the interfaces, the material became unstable, deformation eventually localized and the stress decreased with deformation. These weaker interfaces, properly designed and tuned, therefore turned brittle glass into a deformable material failing at almost 5% strain.

Infiltrating the engraved glass with polyurethane had two effects on the tensile response. The failure and pullout were smoother because of the "cushion effect" and the formation of ligaments discussed above, and the material was also significantly stronger, reaching a tensile strength of 8-9 MPa. The area under the stress-strain curve gives the energy dissipated by the material per unit volume, corresponding to 70 kJm$^{-3}$ and 130 kJm$^{-3}$ for the non-infiltrated and infiltrated materials, respectively. For comparison, four-point bending tests on the intact borosilicate glass slides used here revealed a strain at failure of 0.0017, about 20 times less than the strain at failure of the engraved material. Finally, the strain energy of the intact glass just before failure was 50-80 kJm$^{-3}$ but because of the catastrophic fracture of glass, only a small portion of the stored strain energy is actually consumed by the formation of cracks, most of the energy is dispelled in dynamic effects and other propagations to connective components.

The engraved glass has lower strength than intact glass, which was expected; an improvement in toughness and ductility is generally accompanied with a decrease in strength. In comparison, while the tensile strength of the mineral tablets in nacre has never been measured experimentally, it can be estimated using fracture mechanics using Equation (28). With $K_{IC}^{(m)}$≈0.39 MPa·m$^{1/2}$ as the toughness of the mineral and a≈30 nm as the size of the defects within the tablets one finds a tensile strength in the order of 1 GPa. For comparison, the tensile strength of nacre is about 10 times lower, in the order of 100 MPa. The strength of nacre is controlled by shearing of the soft interfaces between the tablets, and the apparent strength of the tablets is much lower than 1 GPa, because of stress concentrations arising from the staggered arrangement. The decrease in strength in nacre compared with pure mineral is therefore in the same order as the decrease in strength in our architectured material compared with intact glass.

$$\sigma_m \approx \frac{K_{IC}^{(m)}}{\sqrt{\pi a}} \quad (28)$$

Within the embodiments of the invention described supra the toughness of materials is increased by introducing weak interfaces. 3D laser engraving has been employed to generate a 3D array of defects within the glass. By tuning the toughness and structure of the interfaces, the inventors have demonstrated an increase in the toughness of glass by a factor of 200, and turned it into a deformable material failing at almost 5% strain. The locking angle of the tabs further acts as a significant parameter in the optimization of the material as whilst higher overall strength and toughness could be produced with larger angles, the angle must be kept within limits in order to prevent the fracture of the locking tabs themselves. The fracture toughness of the bulk material and the size of the defects generated by the engraving process are therefore important factors to take into account when applying the technique to other types of glasses, ceramics, etc. where these are to be considered as base materials.

5.4 Engraved Glass Infiltrated with Polyurethane—Fabrication

Fabrication of the fracture test samples was performed using 150 μm thick rectangular optical grade 263 M borosilicate glass slides which were engraved using a 3D laser engraver equipped with a pulsed UV laser operating at 355 nm, 0.5 W CW pumped, 4 kHz repetition rate with 4-5 ns pulse duration. The slides were cut down to a 22×40 mm plate using the laser in "cutting mode" with a power of 500 mW and defect spacing of 5 μm. Pin holes and initial notches were prepared using the same procedure. A weaker interface consisting of an array of defects was then engraved ahead of the initial notch. The toughness of the interface was tuned by adjusting the laser power and/or the spacing between the defects. For engraving the tilted weak interfaces ahead of the crack tip, power and defect spacing of 200 mW and 90 μm were used, respectively. This combination of power and defect spacing resulted in an interface with half the toughness of the bulk glass.

For engraving the weak jigsaw-like interfaces, the power of the laser was reduced to 110 mW. In order to improve the stiffness and strength of the tabs, the engraved patterns were divided into two regions: at contact regions between the neighbouring tabs where the locking and the friction occur, higher defect spacing of 2.75 μm was used. This approach decreased the amount of damage to the tabs at the contact regions, and increased the interface stiffness and strength. For the rest of the interface, a lower defect spacing of 2.5 μm was used so that the crack would be able to follow the interface. The defects were equi-spaced in both in-plane and out-plane directions. The sample geometry for the jigsaw-like fracture specimens and fracture specimens with tilted weak interfaces were the same. For the infiltrated samples, polyurethane adhesive, U-09FL by Loctite, was employed.

All samples were tested using a miniature loading machine at a displacement rate of 3 μm·s$^{-1}$ within an environment in which the humidity was controlled in the range of 30-35%. The tensile specimens were prepared using a similar method and by repeating the engraving jigsaw-like interfaces five times and across the entire width of the sample.

5.5 Determination of Traction-Separation Curves

Following the Rigid Double Cantilever Beam method and by considering negligible elastic deformation within the intact glass material, the interface separation δ and the traction t, which are generated through interlocking of jigsaw-like features, can be obtained using Equations (29A) and (29B).

$$t(\delta) = \left(\frac{L}{B(L-a_0)^2}\right)\left(2F + \Delta\frac{dF}{d\Delta}\right) \quad (29A)$$

$$\delta = \left(1 - \frac{a_0}{L}\right)\Delta \quad (29B)$$

Within Equations (29A) and (29B), L is the distance from the line of action of the pulling force F to the end point of the engraved line, B is the thickness of the glass specimen, $a_0$ is the initial crack length, and A is the opening at the loading line (see FIG. 24D). Equations (29A) and (29B) were used to obtain the traction-separation curves from the experimentally obtained force-displacement (F-Δ) data for the jigsaw-like interfaces.

6. Biomimetic Material Extensions and Options

Within the embodiments of the invention described supra in respect of Section 5 and other preceding sections, the toughness of materials was demonstrated as being increased by introducing weak interfaces into the material together with interlocking jigsaw-like features. However, one can also introduce other biomimetic structures and designs exploiting the principles established by the inventors either inspired by natural material designs or more complex structures that do not occur within nature.

Figure 32A:
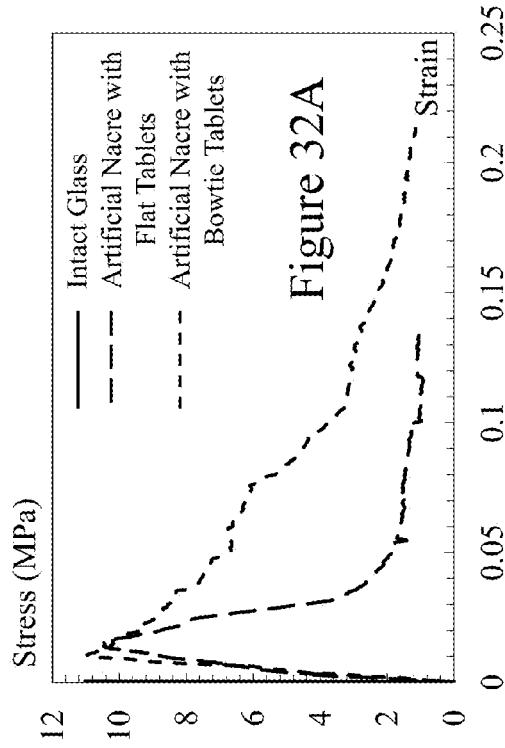
FIG. 32A depicts the tensile stress-strain curves for the designs depicted in FIGS. 31A to 31C according to embodiments of the invention.
Figure 32B:
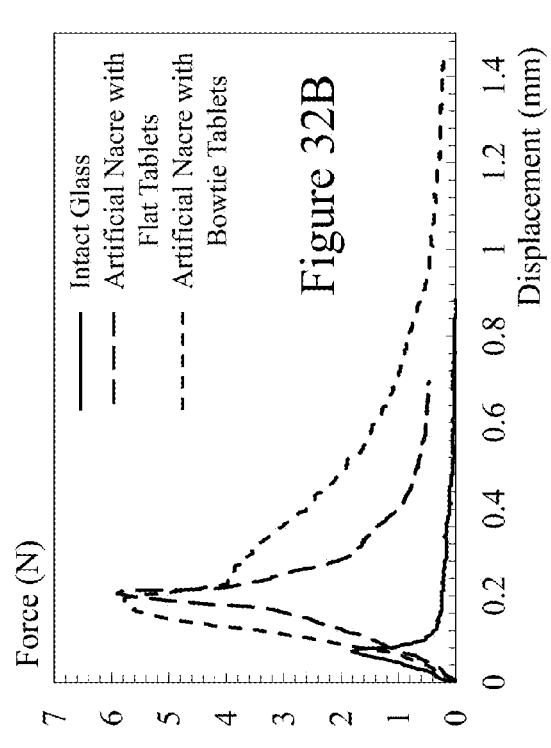
FIG. 32B depicts the force-displacement curves for fracture test samples exploiting the tablet designs of FIGS. 31B and 31C according to embodiments of the invention.
Figure 31A:
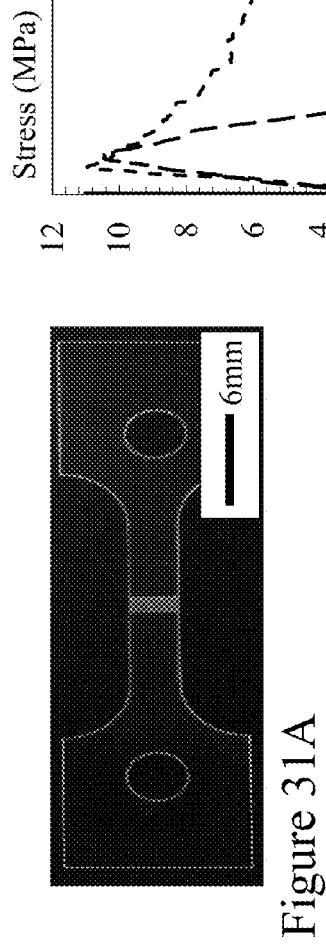
FIGS. 31A to 31C depict a tensile test sample together with images of straight and bowtie tablet elements forming weakened interfaces within the tensile test sample according to embodiments of the invention.
Figure 31B:
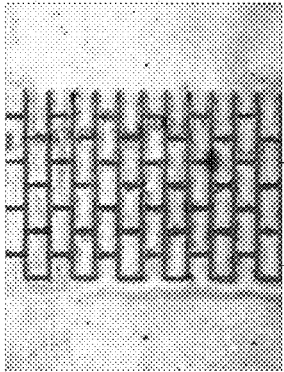
Figure 31C:
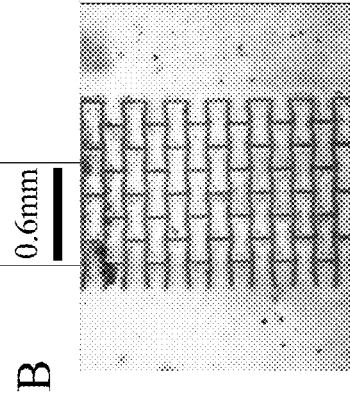
Figure 33:
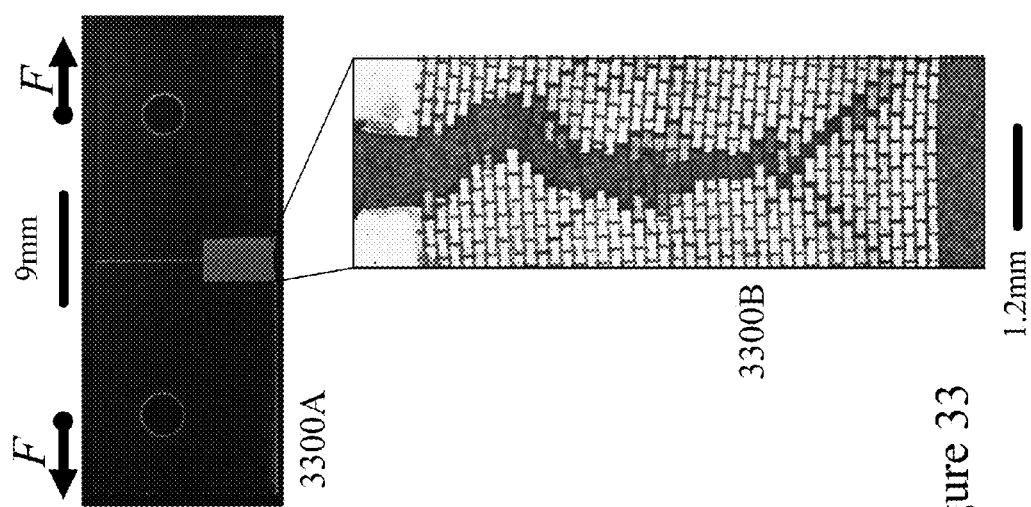
FIG. 33 depicts a fracture test sample used to assess the fracture toughness of the material exploiting weakened interfaces according to an embodiment of the invention and a micrograph of the material after stable crack propagation, demonstrating crack bridging defection, and branching.

Referring to FIG. 31A, there is depicted a tensile test slide exploiting laser generated structures according to the tablet concept identified within natural nacre. As depicted in FIGS. 31B and 31C, designs were implemented using straight and bowtie tablet designs, respectively. In each, the pitch of the interlocking tablet structures was 0.6 mm employing approximately 0.3 mm long tablets. Referring to FIG. 32D, results of these biomimetic structures against a standard test slide are depicted as tensile stress versus tensile strain. Referring to FIG. 32B, results of these biomimetic structures against a standard test slide are depicted as force versus displacement. Referring to FIG. 33, a fracture test slide is depicted in the first image, 3300A, exploiting bowtie tablets together with a magnified image of the crack propagation region in second image 3300B demonstrating that the fracture behavior of the material duplicates many of the features required for increased toughness such as progressive tablet sliding, crack bridging, crack deflection, and branching. The resulting biomimetic materials, whilst being composed of 97% glass, exhibit performance wherein they are 600 times tougher and break at strains as high as 20%, which is an extraordinary deformation for a material with such a high mineral content.

Figure 34:
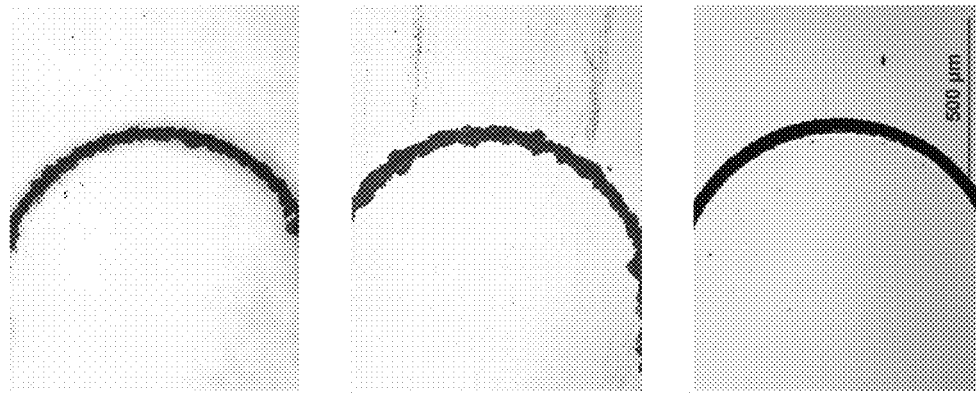
FIG. 34 depicts laser generated profiles for tabs within the jigsaw-like weak interfaces according to an embodiment of the invention upon several different materials such as glass, crystal and silicon.

It would be evident to one skilled in the art that these principles and concepts established by the inventors may be applied to a variety of other materials including, but not limited to, ceramics such as silicon (Si), polymers such as polylactic acid (PLA), glasses and crystals. Referring to FIG. 34, there are depicted first to third images 3400A to 3400C which depict high magnification images of the edge of the interlocking tab structure of the jigsaw-like interfaces which is engraved in glass, crystal, and silicon respectively. These were all engraved with the same conditions without tuning/optimization to each material. The pattern formed by laser engraving in the Si wafer is smoother than that of the glass and, accordingly, the contact stress concentrations would be less which thereby promises materials with even higher mechanical performance.

Referring to FIG. 35, there is depicted a slide sample configuration comprising two glass elements 3510, for example 150 µm sandwiching a thin layer of polyurethane 3530 and into which fracture test mounts 3520 were formed by laser cutting. Using the laser engraving process, first and second patterns 3540 and 3550, respectively, were formed into the upper and the lower slides, respectively, together with the main crack 3560 ahead of these patterns. The main crack was generated using an array of microcracks at 5 µm with a laser power of 280 mW. The angled patterns were formed on each side by engraving arrays of microcracks at 15 µm with a laser power of 280 mW at an angle of 25° to the main crack at two different line spacings of 500 µm and 2 mm. Testing was performed at a 5 µm/s displacement rate using a miniature loading stage.

Figure 36A:
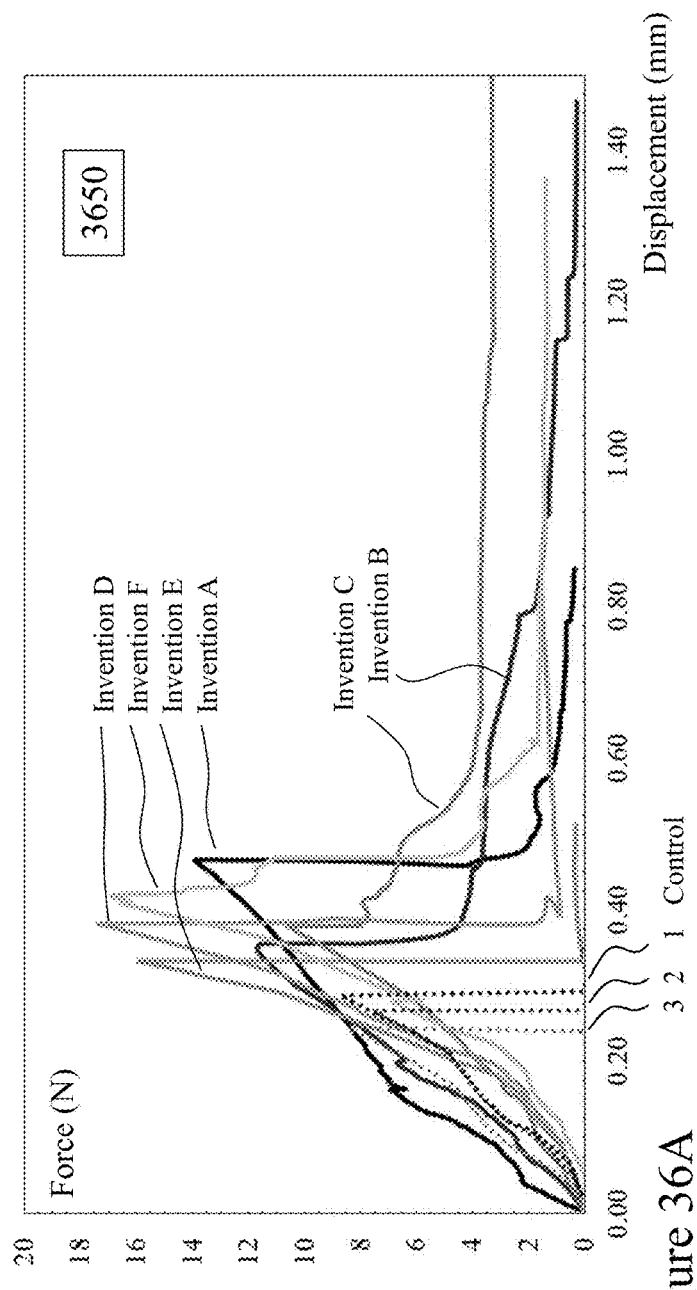
FIGS. 36A and 36B depict images of the fracture test sample exploiting 500 µm line spaced weakened interfaces according to an embodiment of the invention and standard untreated glass after application of the maximum tensile force together with the fracture force versus displacement curves for embodiments of the invention and standard untreated glass.
Figure 36B:
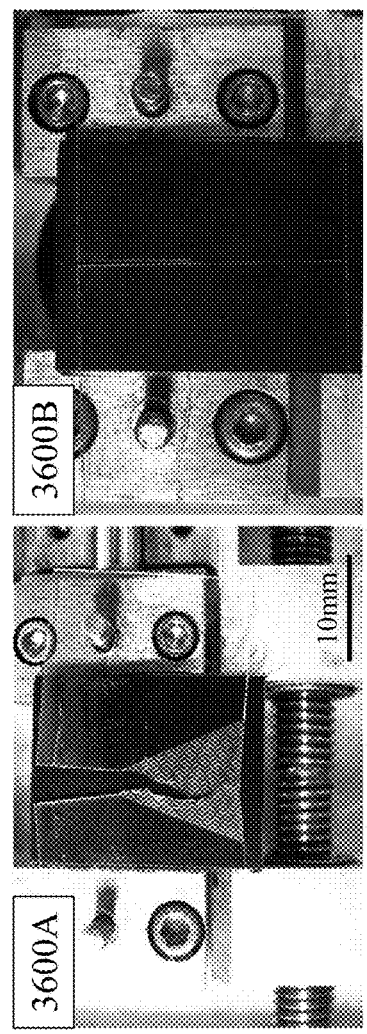
Figure 37A:
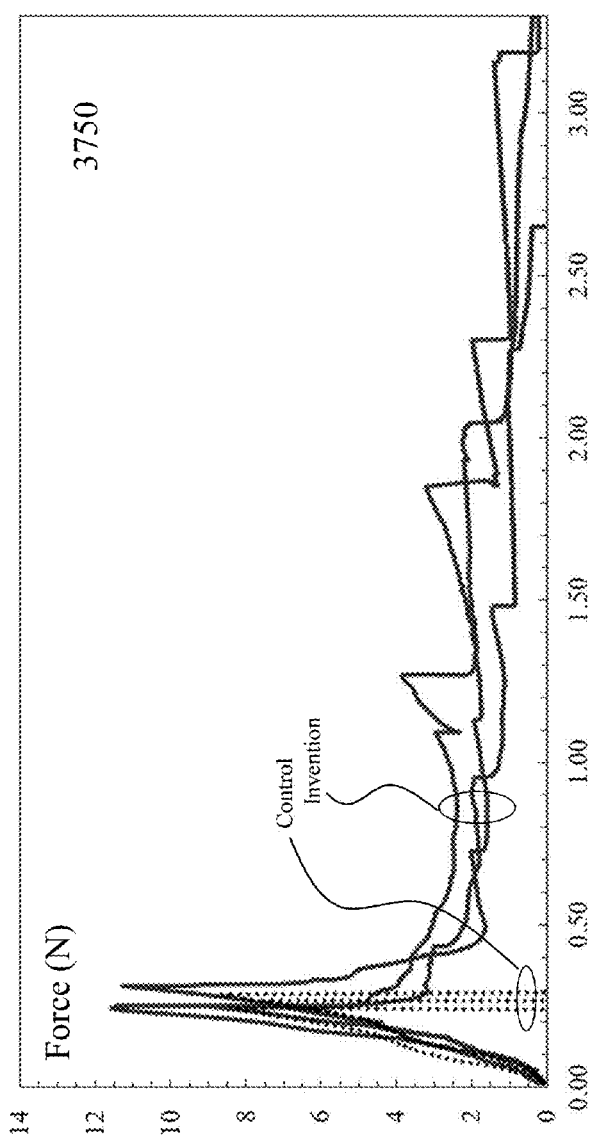
FIGS. 37A and 37B depict an image of a fracture test sample exploiting 2 mm line spaced weakened interfaces according to an embodiment of the invention at the start of the test together with the fracture force versus displacement curves for embodiments of the invention and standard untreated glass.
Figure 37B:
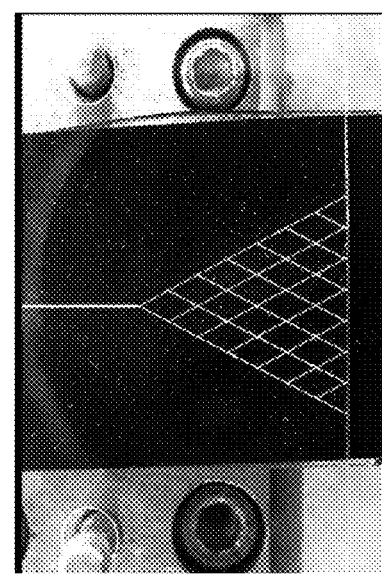
Figures 38A, 38B:
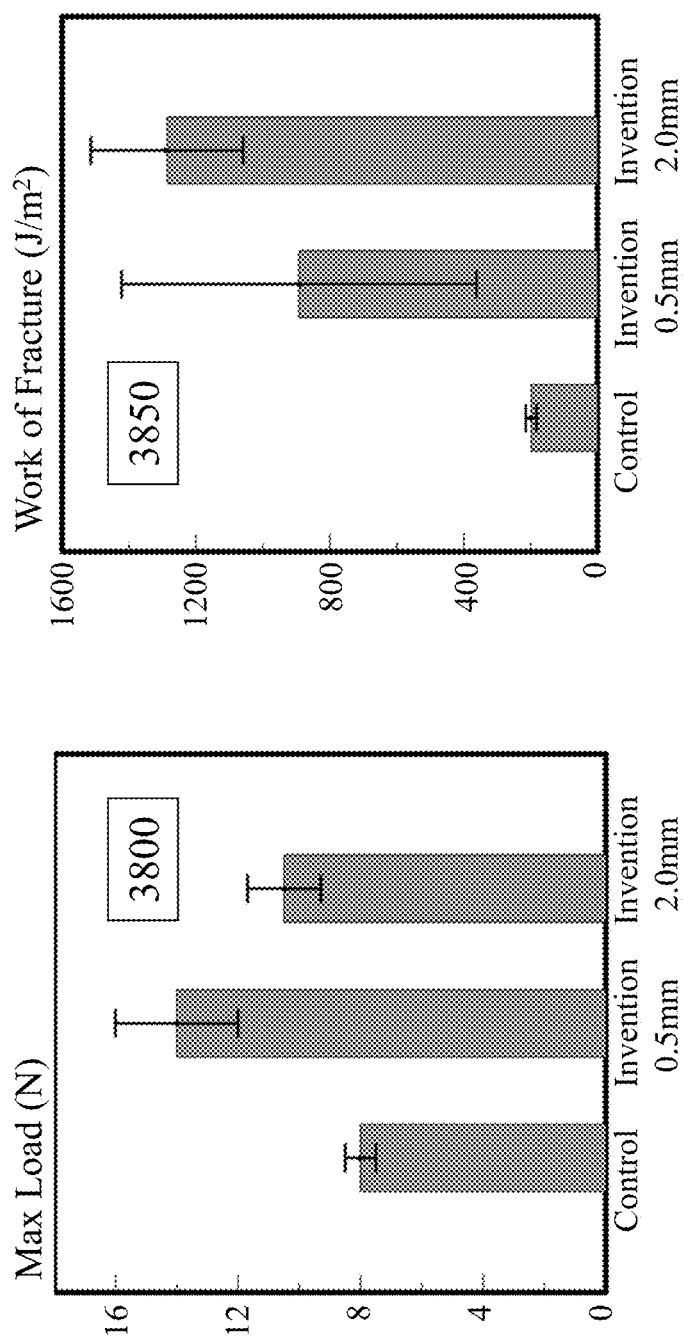
FIGS. 38A and 38B depict the comparisons of the maximum load and the work of fracture between samples exploiting 500 µm and 2 mm line spaced weakened interfaces according to embodiments of the invention and the control samples of standard untreated glass.

Referring to FIG. 36B with first and second images 3600A and 3600B, the failure is depicted for bioinspired and control sample, respectively. In the control sample, the crack propagates straight across the slide, whereas within the biomimetic sample the crack propagates in a zig-zag manner. Graph 3650 in FIG. 36A depicts the force versus displacement curves for control samples versus the bioinspired samples with 500 µm spacing, wherein the failure displacements and force are higher than the control samples and it is evident that in many samples large displacements are accommodated without complete failure. In FIG. 37B, a bioinspired sample with 2 mm spacing is depicted in first image 3700 prior to testing whilst in graph 3750 in FIG. 37A the experimental results are depicted, wherein, similar to the 500 µm spacing, the samples support large displacement without catastrophic failure but without quite as significant improvements in maximum force accommodated. Referring to FIGS. 38A and 38B there are depicted first and second graphs 3800 and 3850 depict the maximum load and the work of fracture for the bioinspired materials versus the control. It is evident from these that the bioinspired structures have higher maximum loads and significantly different work of fracture values.

7. Biomimetic Nacre Glass

As discussed supra, despite significant efforts, no bottom up fabrication method within the prior art matches biological materials in terms of microstructural organization and mechanical performance. Accordingly, the inventors have presented a "top down" strategy which consists in carving weak interfaces within a brittle material using a laser engraving technique. Within this section the fabrication and testing of borosilicate glasses containing nacre-like microstructures infiltrated with polyurethane are presented.

7.1 Fabrication of Biomimetic Nacre Glass

The patterns we engraved consisted of two dimensional nacre-like interfaces engraved through the thickness of the glass slides using a laser power of 105±5 mW and a spacing of 2 µm (horizontal interfaces) and 2.5 µm (vertical junctions). These parameters produced very weak interfaces through the thickness of the glass slides, in addition to ~75 micron deep trenches on the surface. Once these patterns were engraved, the interfaces were infiltrated with a polymeric adhesive. Experiments with different adhesives demonstrated their mechanical behavior to be important to the performance of the nacre-like glass. In order to obtain a nacre-like mechanical behavior, the properties of the polymers must reflect, as close as possible, the behavior of the biopolymers present at the interfaces of natural nacre: (i) strong adhesion to the tablets (ii) large deformations in shear, (iii) shear strength high enough to promote high strength of the composite, yet sufficiently low to promote tablet sliding over tablet fracture and (iv) a viscous mechanism to absorb mechanical energy and generate toughness.

These criteria excluded cyanoacrylates which are strong but too brittle. Epoxy adhesives were more deformable but their strength was too high, resulting in fracture of the tablets. On the other end of the spectrum of properties, we found that polydimethylsiloxane (PDMS) was too weak and resulted in overall low material strength. For the experiments reported here, polyurethane (PU) was selected as the best choice for the interfaces. This type of PU has high adhesion to glass, and it fails at large strains by formation of ligaments, in a way similar to the failure of natural proteins in nacre. The PU adhesive also provided an elastomeric response with a strain stiffening mechanism at the interfaces which delayed localization, spreading the deformation through the material. Finally, the PU we selected has a low viscosity prior to curing, which enabled deep infiltration within the engraved glass.

The first type of nacre-like material we fabricated had straight interfaces, with geometry characterized by two parameters: the thickness of the tablets, t, and their aspect ratio, $\rho=L/t$, where L is the length of the tablets. The resulting materials were composed of 93 vol. % glass and 7 vol. % PU.

7.2 Biomimetic Nacre Glass—Tensile Performance

Figure 39B:
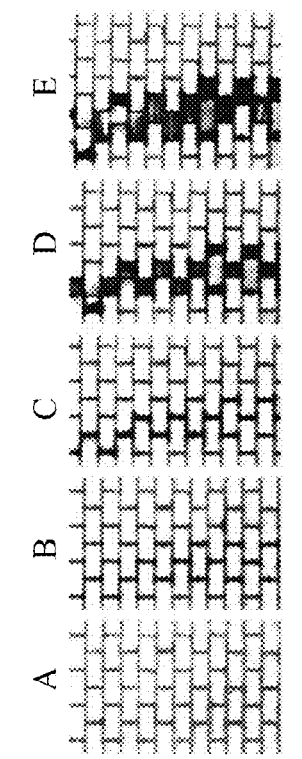
FIGS. 39A to 39D depict performance of nacre-glass for biomimetic materials according to embodiments of the invention.
Figure 39A:
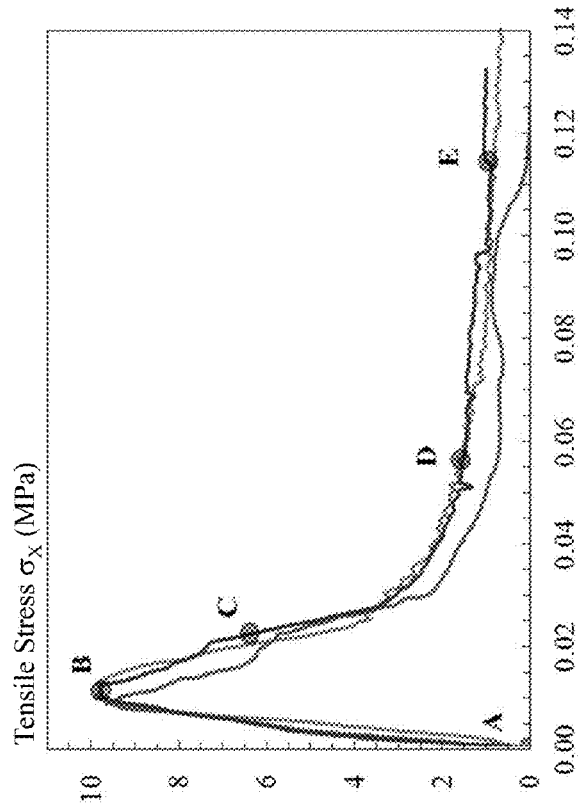

The nacre-like pattern above was engraved into a tensile dog-bone glass sample (FIG. 39A) which contained four columns of tablets along the longitudinal direction and eighteen layers of tablets in transverse direction. After infiltration with PU, the samples were tested in tension at a displacement rate of 5 $\mu m \cdot s^{-1}$ on a miniature loading machine placed under an upright optical microscope. In-situ imaging of the material enabled accurate determination of the strains by Digital Image Correlation (DIC) using the commercial software VIC-2D, and also enabled the monitoring of the deformation and failure modes.

Figure 39C:
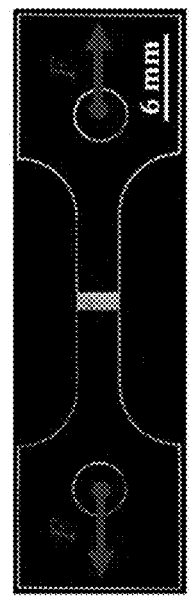
Figure 39D:
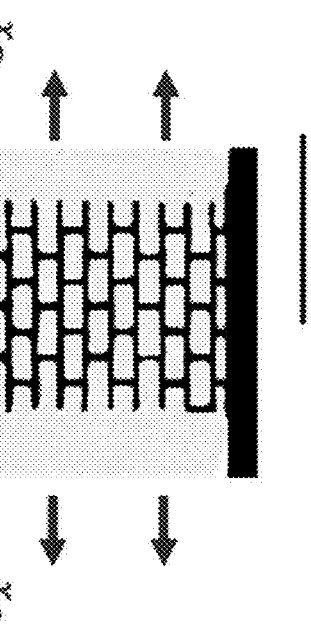

Direct observation showed that the deformation was uniform across the sample, which was confirmed by digital image correlation. The initial stiffness of the nacre-like samples with $\rho=2$ and t=150 µm was about 1 GPa. The tensile stress increased almost linearly until a maximum of 10 MPa (point B in FIG. 39B), which occurred at a tensile strain of about 0.01. At this point, the material entered a softening region and in-situ imaging showed that the deformation localized along one band across the tensile direction (point C in FIG. 39B). From that point and until complete failure of the sample, all the deformation concentrated in this region while the rest of the material relaxed as the stress decreased (points D, E in FIG. 39B). Imaging revealed PU ligaments across the localization, which progressively failed as the material softened as depicted in FIGS. 39C and 39D. These ligaments maintained cohesion up to average specimen tensile strains exceeding 0.2.

Figures 40A, 40B, 40C:
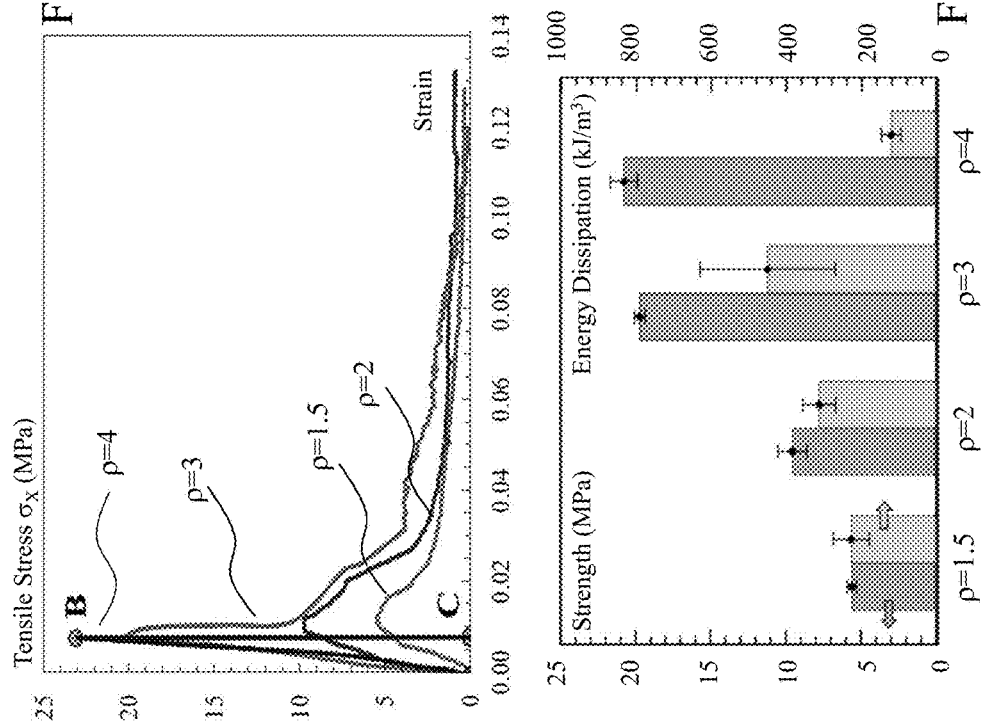
FIGS. 40A to 40C depict the performance of nacre-glass with varying aspect ratio for biomimetic materials according to embodiments of the invention.

Our first objective was to make the tablets (i.e. the spacing between the engraved interfaces) as thin as possible. For very thin tablets, the microcracks forming the interfaces coalesced across the tablets resulting in decreased overall strength. The smallest workable distance between the lines (i.e. thickness of the tablets) was 150 µm, which is small compared to the nacre-like materials obtained by prior art rapid prototyping (t=2 mm). With the thickness fixed at t=150 µm, four aspect ratios ρ=1.5, 2, 3, 4 were explored and tested in tension (FIG. 40A). The elastic modulus, strength and energy dissipation (area under the stress-strain curve) increased by increasing the aspect ratio from 1.5 to 3, because of the increased overlap area and increased transfer of shear stress between the tablets. At low aspect ratios (ρ≤2), tablet pull-out was the dominant mode of failure. At ρ=3, the inventors observed a mixed-mode tablet pull out and tablet fracture which resulted in a large variation in the energy dissipation depending on the number of tablets which broke during the test. At higher aspect ratios (ρ=4), tablet fracture was the dominant failure mode (FIG. 40C), points A-C in FIG. 40A and as a result energy dissipation decreased significantly. The overall properties as a function of aspect ratio are shown on FIG. 40B. For this system, the aspect ratio of 3 produced the best combination of strength and energy absorption, despite a few tablets fracturing upon loading of the material in tension. The transition from tablet fracture to tablet pullout is consistent with the existing models for the design of staggered composites.

First, the shear strength of the interface can be estimated using Equation (30) where $\sigma_C$ is the tensile strength of the composite, $\phi$ is the volume fraction of tablets, $\rho$ is the aspect ratio of the tablets and $\tau_i$ is the shear strength of the interfaces. Using $\phi=0.93$ and the strength data of $\sigma_C \approx 10$ MPa for $\rho=2$, the shear strength of the interface can be estimated at $\tau_i \approx 10$ MPa. The maximum aspect ratio which prevents the fracture of the tablet is, assuming a uniform shear transfer at the interfaces, given by Equation (31) where $f_0$ is a geometrical factor for an edge crack in a strip of finite width, $K_{IC}$ is the fracture toughness of the tablets, a is the size of microdefects on the surface of the tablets and t is the thickness of the tablets.

$$\sigma_C = \frac{1}{2}\phi\rho\tau_i \quad (30)$$

$$\rho_{MAX} = \frac{1}{f_0}\frac{K_{IC}}{\tau_i\sqrt{\pi a}} - 4.7\left[\left(\frac{a}{t}\right)^{-0.15} - 1.12\right] \quad (31)$$

Using $f_0 \approx 1.12$, $K_{IC} \approx 0.4$ MPa·m$^{1/2}$ for glass, $\tau_i$ 10 MPa, a≈25 µm, and t=150 µm gives $\rho_{MAX} \approx 3$. The experiments presented here showed a failure mode transition from tablet pulling to tablet fracture when the aspect ratio is increased from ρ=2 to ρ=4. The experiments and the prediction from the model therefore agree very well.

7.2 Biomimetic Nacre Glass—Inducing Geometric Hardening with Bowtie Tablets

While natural proteins provide cohesion over large distances, energy absorption and the formation of ligaments in natural nacre, they are not sufficient to produce hardening required to delay localization and spread deformations over large volumes. In natural nacre, the waviness of the tablets generates progressive locking as the tablets glide on one another. This geometrical locking largely contributes to the material resistance to deformation and prevents the localization of the strains. To duplicate this geometric hardening, the inventors fabricated another family of nacre-like materials with wavy tablets, in the form of bowties (FIG. 41A). These microstructures were characterized by the thickness t (which was fixed at t=150 µm), the aspect ratio ρ=L/t, and the bowtie angle θ. The bowtie features provided an additional resistance to pull-out by progressive locking, generating geometric hardening and delaying localization. FIG. 41B shows the entire engraved area of a sample with bowtie tablets. The geometry of the dog-bone tensile test specimens, the number of tablets along the longitudinal and transverse directions, and the test conditions were the same as for the materials composed of flat tablets. Typical tensile stress-strain curves of the material composed of bowtie tablets with t=150 µm, ρ=2, and θ=5° are shown on FIG. 41C.

As for flat tablets, the first portion of the stress-strain curve was quasi linear up to a maximum stress of about 10 MPa (FIG. 41C, points A-B). Following the peak stress, the stress continuously decreased, but at a slow rate compared to flat tablets. In-situ imaging of the samples (FIG. 41C, points C-E) shows that in the softening region the deformations initially localized but rapidly spread over the entire sample. The material eventually failed at about 20% tensile strain, a huge amount of deformation for a material mostly composed of glass. Our nacre-like glass therefore duplicates the most important deformation and fracture mechanisms of nacre. Progressive tablet sliding and pull-out occurred from the combined hardening of the PU layer and the geometric hardening from the bowtie shape of the tablets.

The observation of continuous spreading of the deformation despite a continuous decrease in applied stress could be an indication that strain rate hardening is operating at the interface, in addition to stiffening and geometric hardening. Because nonlinear deformation spread over the entire material, the measured strain and energy absorption can be considered representative of large materials made with the same microstructure. For this case, the stiffness and strength of the material are ≈9 GPa and ≈10 MPa, and the material dissipates over 800 kJ/m³ of strain energy (the area under the stress-strain curve). For comparison, the stiffness, strength, and energy dissipation of the bulk glass material, obtained from four-point bending tests, are ≈65 GPa, ≈80 MPa, and ≈80 kJ/m³ respectively. For the case of bulk glass, much of the energy however is dissipated through dynamic effects and other propagations to connective components while only a small portion is actually consumed for the formation and propagation of cracks. Therefore, strength and stiffness are sacrificed in our nacre-like glasses in order to obtain a significantly higher toughness. These properties can be fine-tuned by adjusting the bowtie angle and aspect ratio of the tablets.

Figure 42A:
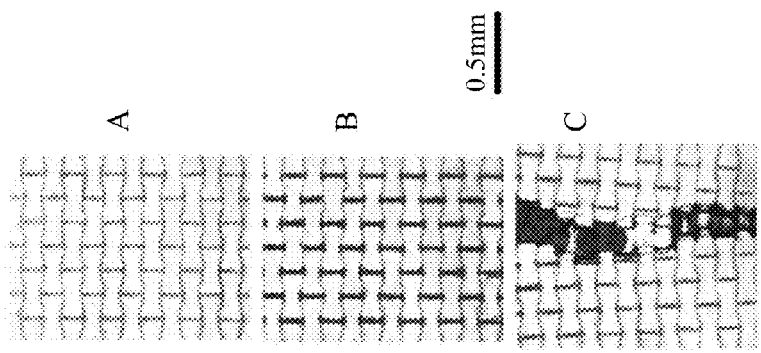
Figure 42B:
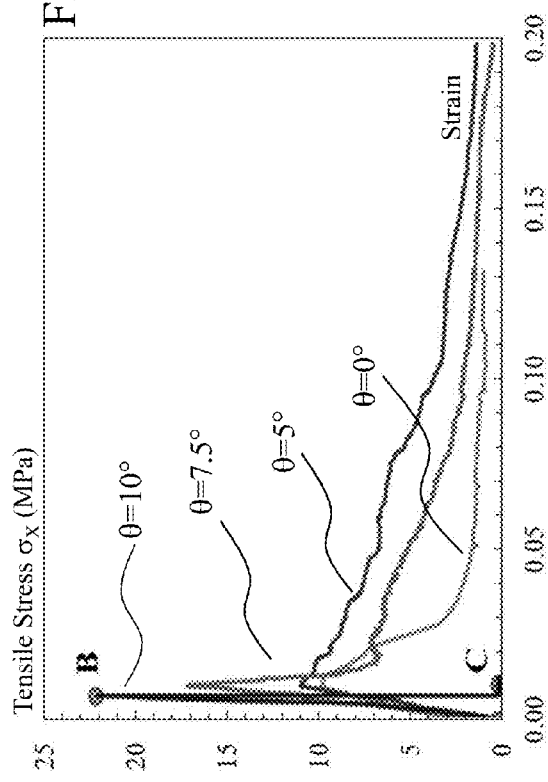
Figure 42C:
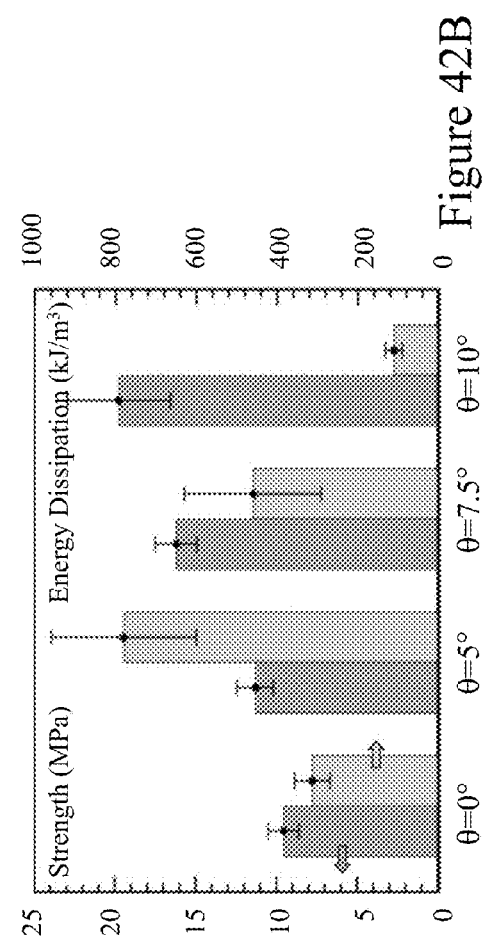

Here, the thickness of the tablets was fixed to t=150 µm and materials with different combinations of bowtie angles and aspect ratios were fabricated and tested. The aspect ratio was first fixed at ρ=2, and materials with different bowtie angles θ=0°, 5°, 7.5°, 10° were explored (FIG. 42A). Bowtie angle θ=0° is identical to flat tablets, discussed in the previous section. For bowtie angles lower than (θ=≤5°), tablet pull-out was the dominant mode of failure whereas for higher bowtie angles (θ>5°), tablet fracture was dominant (FIG. 42C, points A-C in FIG. 42A) resulting in a large decrease in energy dissipation (FIG. 42B). The strength of the material however increased with bowtie angle to values ≈20 MPa where almost all the tablets broke (θ=10°). The inventors also examined the effect of the tablet aspect ratio on the tensile behavior of the material. The bowtie angle was fixed to θ=5° and materials with different aspect ratios ρ=1.5, 2, 3, 4 were fabricated and tested (FIG. 43A).

Figures 43A, 43B, 43C:
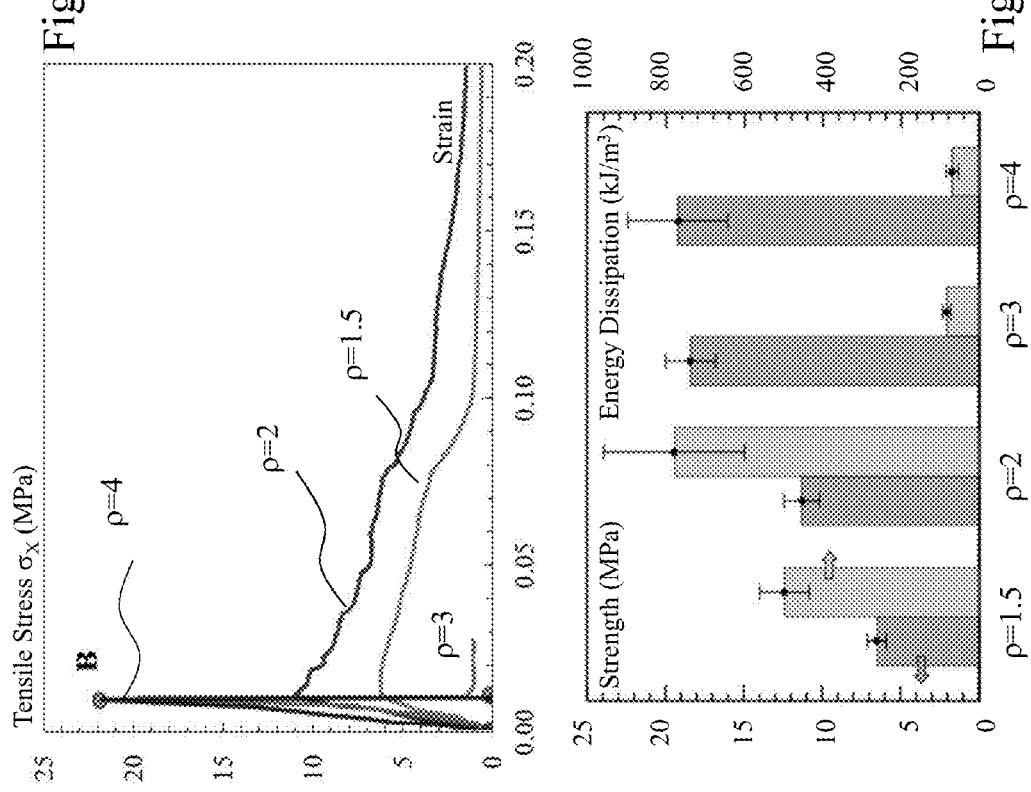
FIGS. 43A to 43C depict the performance of nacre-glass with varying aspect ratio for bowtie nacre-glass for biomimetic materials according to embodiments of the invention.

For materials with tablet aspect ratios lower than ρ≤2, the tablet pullout and for higher aspect ratios (ρ≥3), the tablet failure was the dominant mode of failure (FIG. 43C, points A-C in FIG. 43A). The strength and the energy dissipation of the material increased with aspect ratio till the tablets started to break ($\rho \geq 3$), resulting in a poor energy dissipation and no improvement in the strength (FIG. 43B). We found that for the set of materials and the adhesive used in this study, $t=150$ μm, $\theta=5°$ and $\rho=2$ result in an optimum microstructure when toughness is preferred over strength.

Figures 44A, 44B:
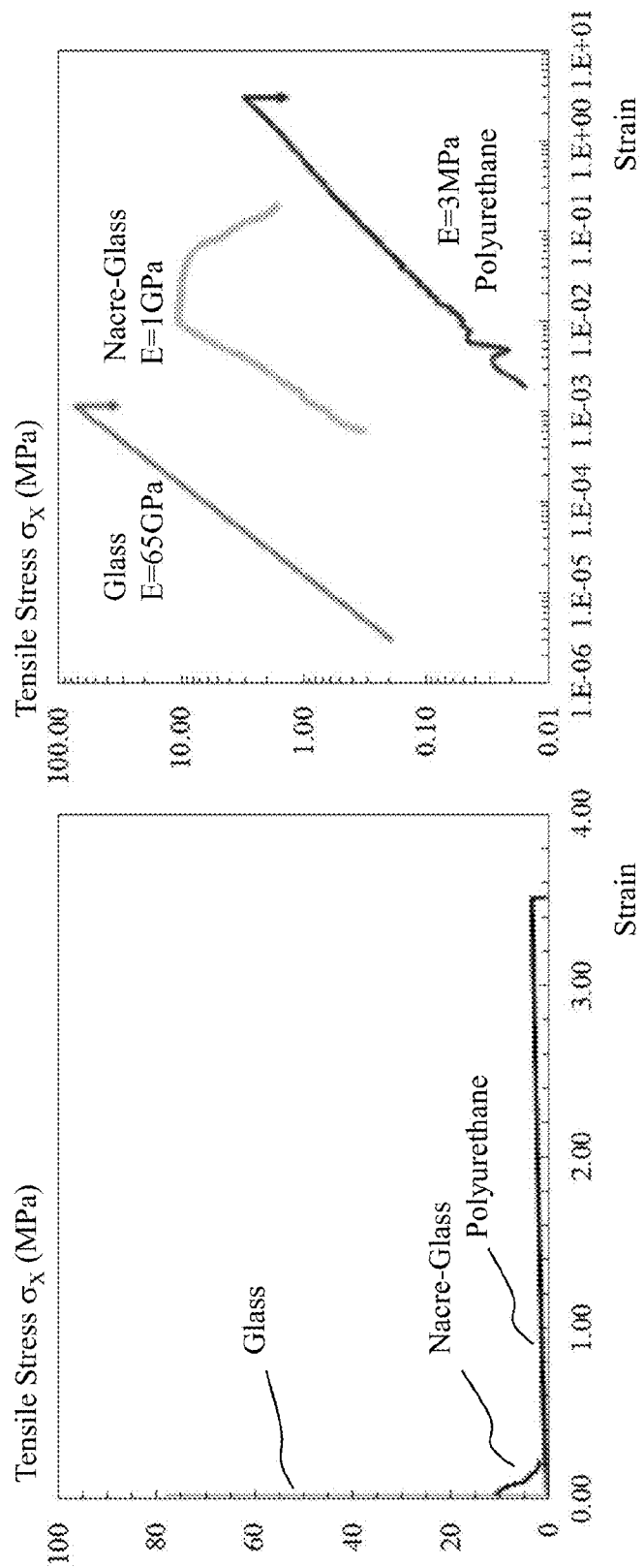

Accordingly it is evident that bio-inspired glass according to embodiments of the invention displays properties which are very distinct from glass and polyurethane. To compare these properties, we tested the pure polyurethane (PU) in tension. Free standing PU films were prepared and cured for one week. Dog-bone samples with cross-section of 2×0.4 mm and gage length of 5 mm, were then cut from the film using laser cutting. The samples were then tested in tension at a displacement rate of $5 \mu m \cdot s^{-1}$. The modulus and strength of the borosilicate glass we used in this work were measured using a three-point bending configuration. FIG. 44A shows typical tensile stress-strain curve of the nacre-like glass (tablet thickness $t=150$ μm, aspect ratio $\rho=2$, and bowtie angle $\rho=5°$), intact glass and pure PU. The contrast of mechanical behavior between these materials is extreme, and to facilitate the comparison the stress-strain curves are re-plotted on a log-log scale on FIG. 44B. The initial slope of these curves is about 1, which indicates that stress varies linearly with strain in the initial stage of deformation. The "height" of these curves reflects the modulus, which is indicated on FIG. 44B. In terms of modulus, strength and deformation, the nacre-like glass lies between pure PU and pure glass. The nacre-like structure is 65 times softer than pure glass and 8 times weaker in strength, but it is 200 times more deformable in tension. Note that these properties are all in the in-plane direction. The surface hardness of glass is maintained in the glass-like glass, which can be attractive in cases where surface hardness and in-plane toughness must be combined. Compared to PU, the nacre-like glass is 330 times stiffer and three times stronger. PU is however about 15 times more deformable.

Whilst the experimental demonstrations of embodiments of the invention exploiting the principles established by the inventors for biomimetic structures have focused on millimeter- and sub-millimeter-sized features to demonstrate the key mechanisms, the fabrication methods and principles can also be scaled down to the micrometer and nanometer length scales. For example, 3D laser engraving may exploit femtosecond lasers. The size reduction of the structures enables higher overall strength, following the scaling principles observed in nature. Further, as discussed supra, more complex 3D structures may be implemented either mimicking natural structures or non-natural structures.

3D laser engraving, whilst particularly attractive for transparent materials, may not be possible for other materials due to the absorption/transparency windows of these materials and the availability of fast, typically nanosecond, to ultrafast lasers, picosecond to femtosecond. In other instances, defects may be introduced within materials during their initial manufacturing such as through the introduction of "defect generating sites" within depositions, micro-porous regions, laminating defective materials with defect-free materials, etc. Through adjustment of defect size, defect pattern, defect operation, etc., a material may be architectured using biomimetic concepts according to embodiments of the invention to obtain desirable combinations of strength and toughness. In other embodiments of the invention, defects may be introduced within the material asymmetrically, e.g., from one side of the material, or symmetrically, e.g., with alternating defects projected from alternate sides of the material or a defect formed by introducing structures from either side of the material at the same location. Alternate manufacturing processes may include, but are not limited to, thermal processing, molding, stamping, etching, depositing, machining, and drilling.

The foregoing disclosure of the exemplary embodiments of the present invention has been presented for the purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and the scope of the present invention.

What is claimed is:

1. A method of forming a glass material, the method comprising:
    engraving a predefined path into a portion of the glass material, the predefined path having a wavy shape forming interlocking features, the interlocking features configured to introduce weak interfaces into the glass material; and
    adding an elasto-plastic material or an elastic material to the path engraved into the glass material, wherein the interlocking features contribute to increasing a predetermined property through at least one of friction and forming of ligaments.

2. The method according to claim 1, wherein
    the elastic material forms the ligaments when the glass material is subjected to tensile extension, the ligaments increasing at least one of a roughness and a ductility of the glass material.

3. The method according to claim 1, wherein
    the weak interfaces are formed by at least one of:
    providing a three-dimensional pattern comprising a plurality of defects formed within a body of the glass material; and
    providing at least a two-dimensional pattern upon at least a surface of the glass material, the two-dimensional pattern including surface modifications.

4. The method according to claim 1, wherein
    the interlocking features comprise a tab on one side of the interlocking feature and a socket on the other side of the feature such that increased force is required to separate the interlocking features.

5. The method according to claim 1, wherein
    the predetermined property is at least one of toughness and ductility, and the weak interfaces allow fracture propagation by at least one of progressive sliding, crack bridging, crack deflection, and branching.

* * * * *